US008813337B2

(12) United States Patent
Briese et al.

(10) Patent No.: US 8,813,337 B2
(45) Date of Patent: Aug. 26, 2014

(54) EFFICIENT ASSEMBLY OF INSULATING GLASS WINDOWS

(75) Inventors: William A. Briese, Hinckley, OH (US); John Grismer, Cuyahoga Falls, OH (US); Timothy B. McGlinchy, Twinsburg, OH (US)

(73) Assignee: GED Integrated Solutions, Inc., Twinsburg, OH (US)

( * ) Notice: Subject to any disclaimer, the term of this patent is extended or adjusted under 35 U.S.C. 154(b) by 183 days.

(21) Appl. No.: 13/292,473

(22) Filed: Nov. 9, 2011

(65) Prior Publication Data

US 2012/0047708 A1    Mar. 1, 2012

Related U.S. Application Data

(63) Continuation-in-part of application No. 12/765,064, filed on Apr. 22, 2010.

(60) Provisional application No. 61/177,368, filed on May 12, 2009.

(51) Int. Cl.
*B23P 11/00* (2006.01)
*C03C 27/00* (2006.01)

(52) U.S. Cl.
USPC ............... 29/430; 29/469; 29/458; 29/429; 156/109; 156/349

(58) Field of Classification Search
USPC ........... 29/430, 469, 458, 429; 156/109, 349, 156/538–539, 556
See application file for complete search history.

(56) References Cited

U.S. PATENT DOCUMENTS

| | | | |
|---|---|---|---|
| 3,876,489 A * | 4/1975 | Chenel | 156/566 |
| 4,780,164 A | 10/1988 | Rueckheim et al. | |
| 5,313,761 A | 5/1994 | Leopold | |
| 5,573,618 A | 11/1996 | Rueckheim | |
| 5,678,377 A | 10/1997 | Leopold | |
| 6,553,653 B2 | 4/2003 | Hulings et al. | |
| 6,868,884 B2 | 3/2005 | Briese | |
| 6,889,416 B2 | 5/2005 | McGlinchy | |
| 6,898,833 B2 | 5/2005 | Ashton | |
| 7,445,682 B2 | 11/2008 | James et al. | |

(Continued)

OTHER PUBLICATIONS

International Search Report and Written Opinion, 21 pages, dated Apr. 24, 2012 for International Application No. PCT/US2011/066055.

*Primary Examiner* — Minh Trinh
(74) *Attorney, Agent, or Firm* — Tarolli, Sundheim, Covell & Tummino LLP

(57) ABSTRACT

An insulating glass unit (IGU) assembly line capable of interleaving double and triple pane IGUs in accordance with an IGU production schedule. Visual indicators or prompts instruct operators at the assembly line in configuring a sequence of IGUs. Triple pane IGUs are assembled with minimal contamination of a center glass lite. A non-contact Bernoulli pad is used to lift a glass lite off from a horizontal or vertical support that conveys it from a glass washer to an assembly station. Each of multiple pads has a capacity to lift approximately seven to ten pounds. Use of multiple pads per glass sheet or lite allows lites having dimensions up to 70 by 100 inches (assuming glass thickness of one quarter inch) to be assembled.

17 Claims, 41 Drawing Sheets

(56) References Cited

U.S. PATENT DOCUMENTS

| | | |
|---|---|---|
| 8,381,382 B2 * | 2/2013 | Wunnicke et al. ............ 29/430 |
| 2002/0020054 A1 | 2/2002 | Hulings et al. |
| 2003/0146066 A1 | 8/2003 | Ashton |
| 2006/0037688 A1 | 2/2006 | Briese et al. |
| 2006/0042315 A1 | 3/2006 | Chang et al. |
| 2007/0175733 A1 | 8/2007 | Lenhardt |
| 2010/0052345 A1 | 3/2010 | Chang et al. |
| 2010/0287756 A1 | 11/2010 | Briese et al. |

* cited by examiner

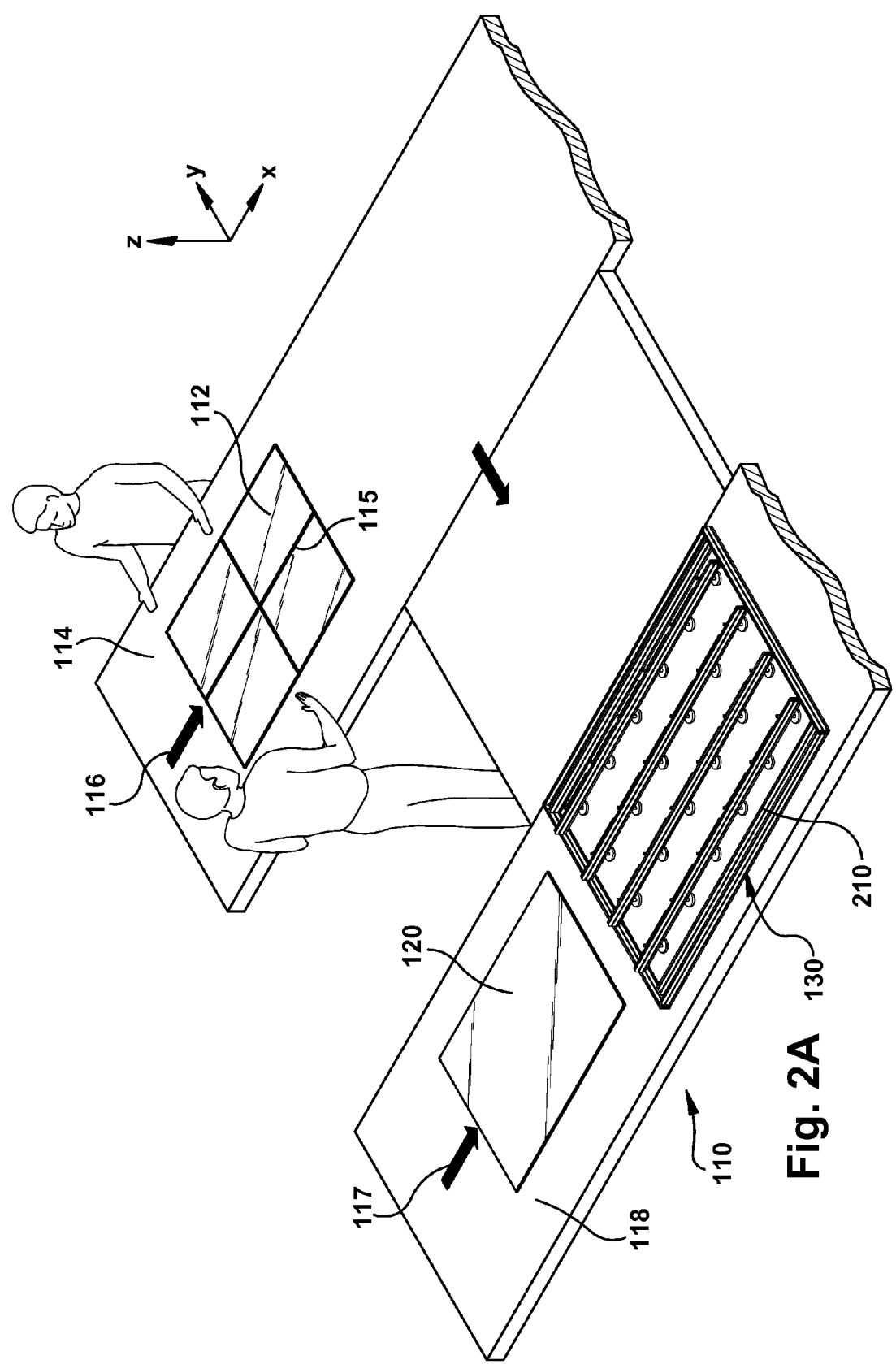

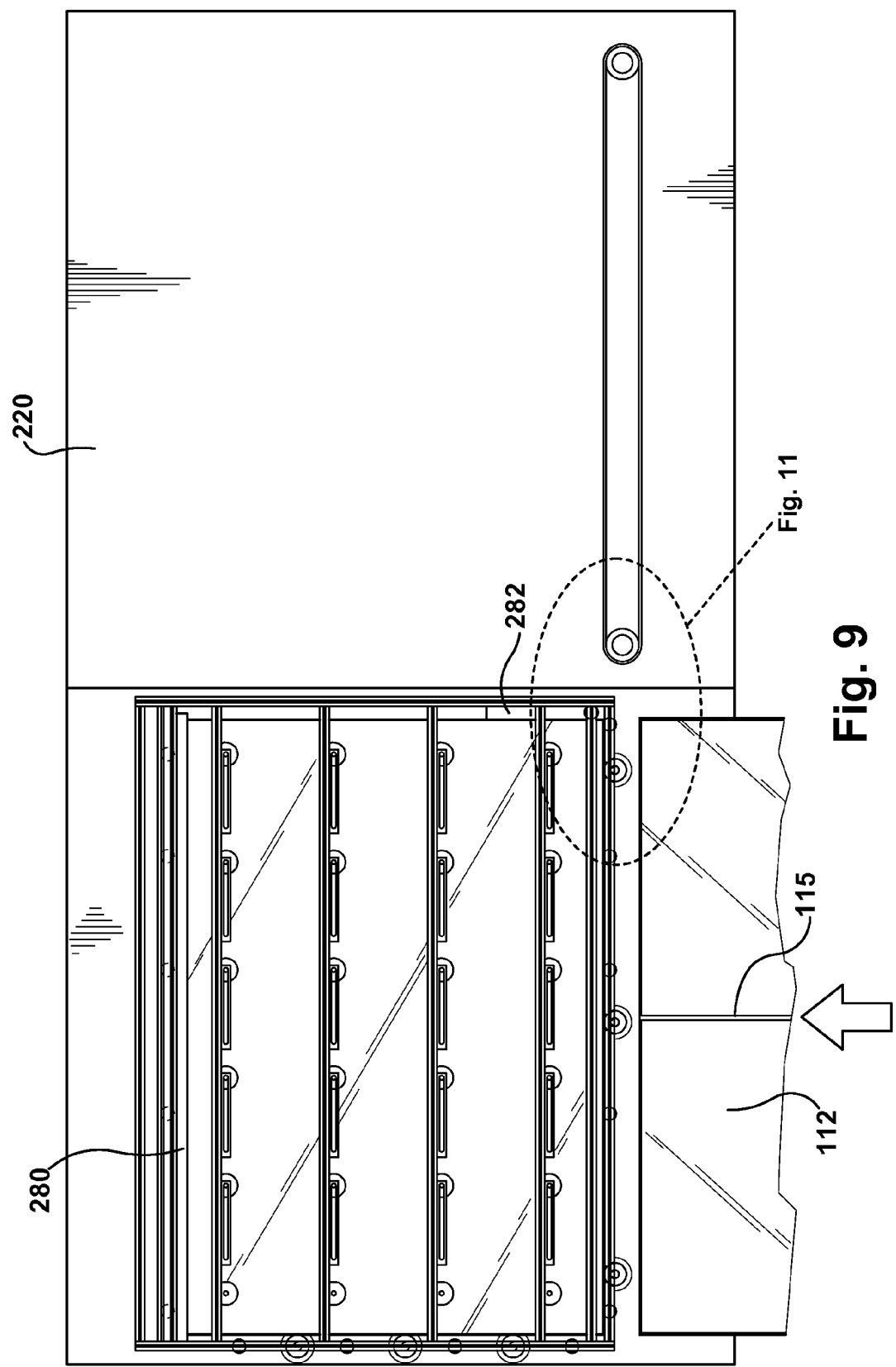

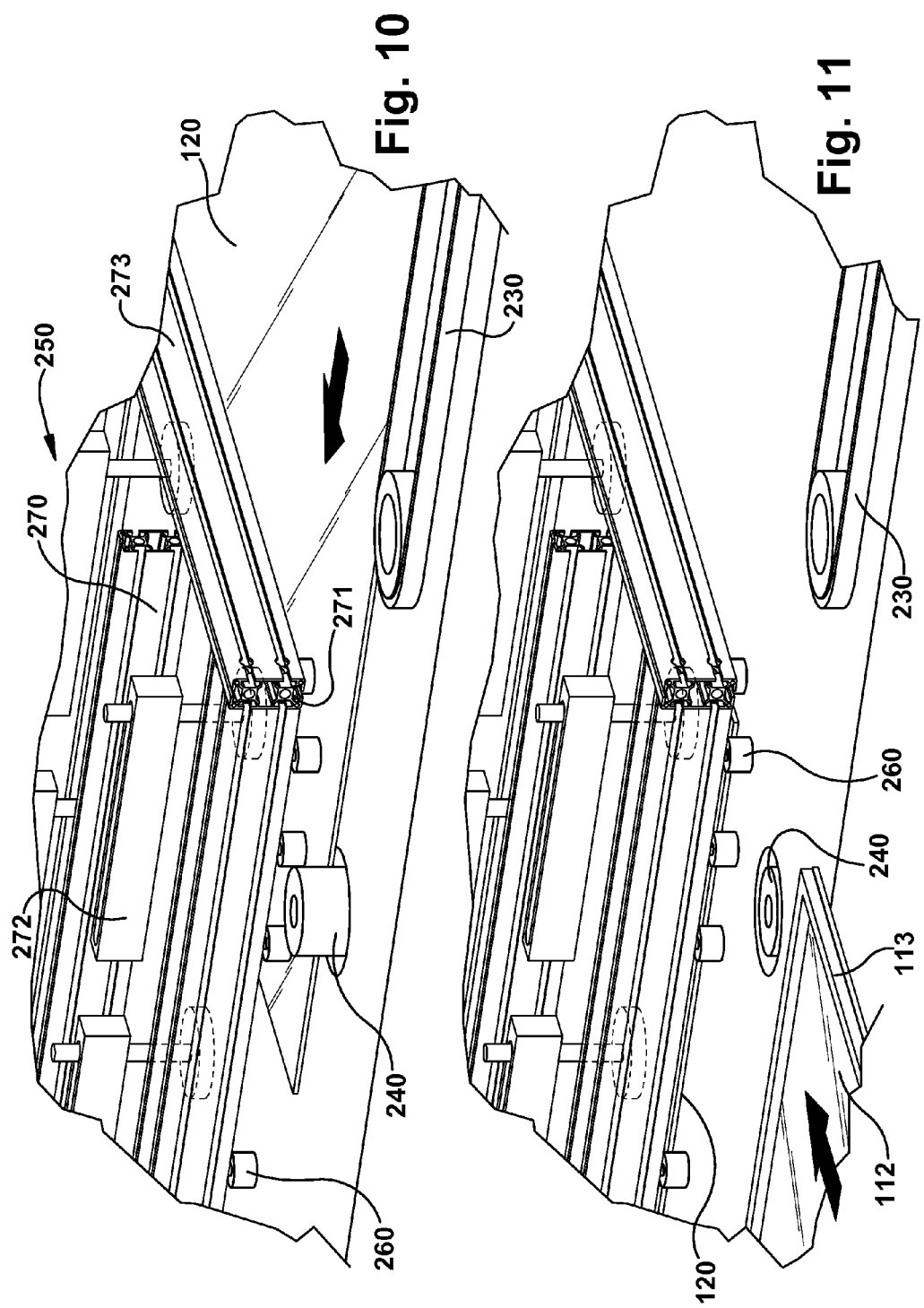

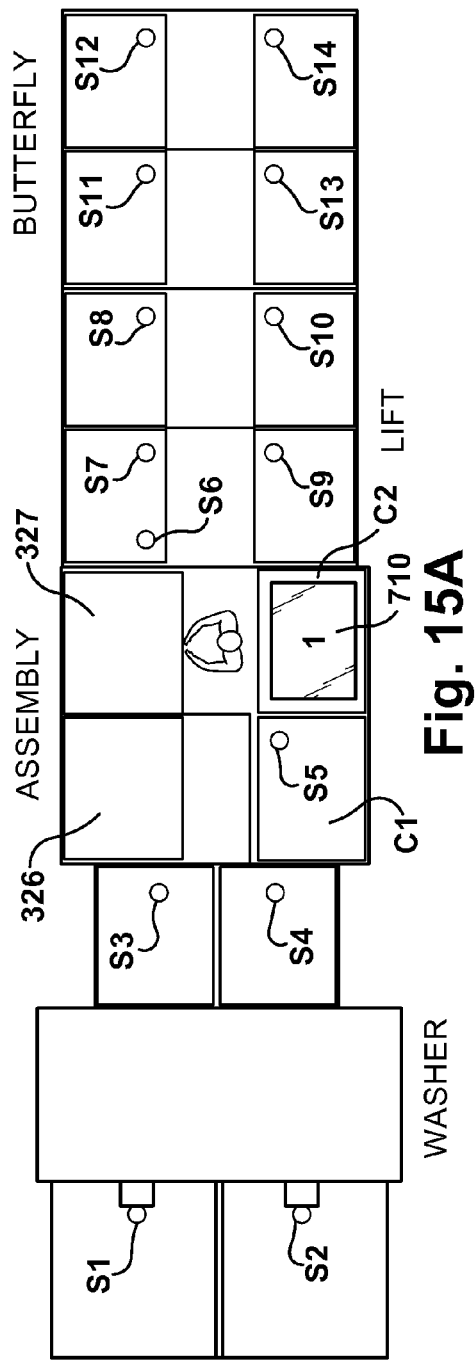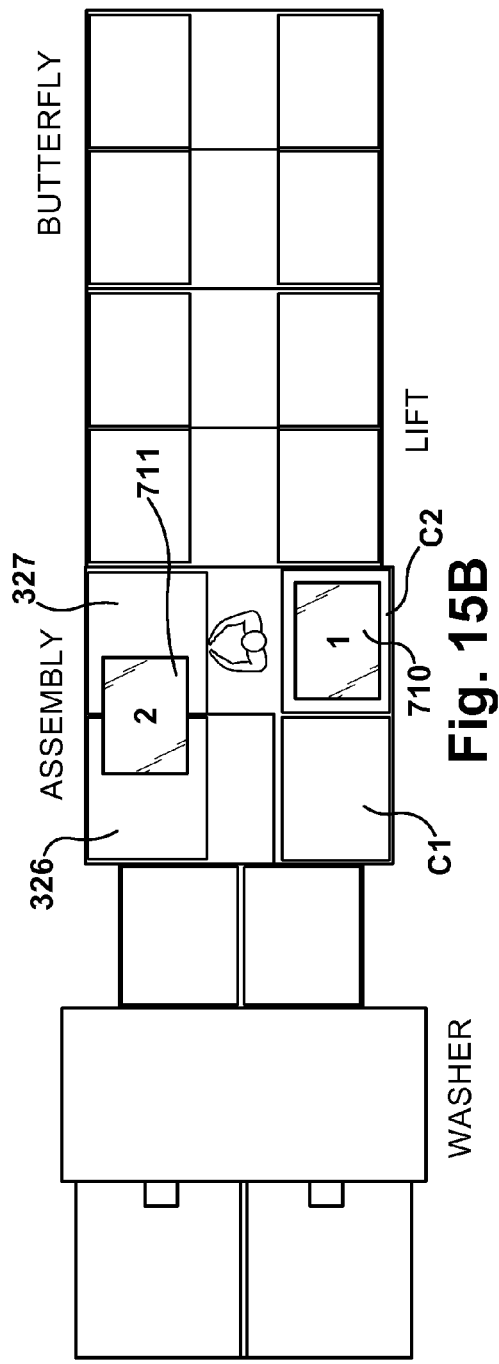

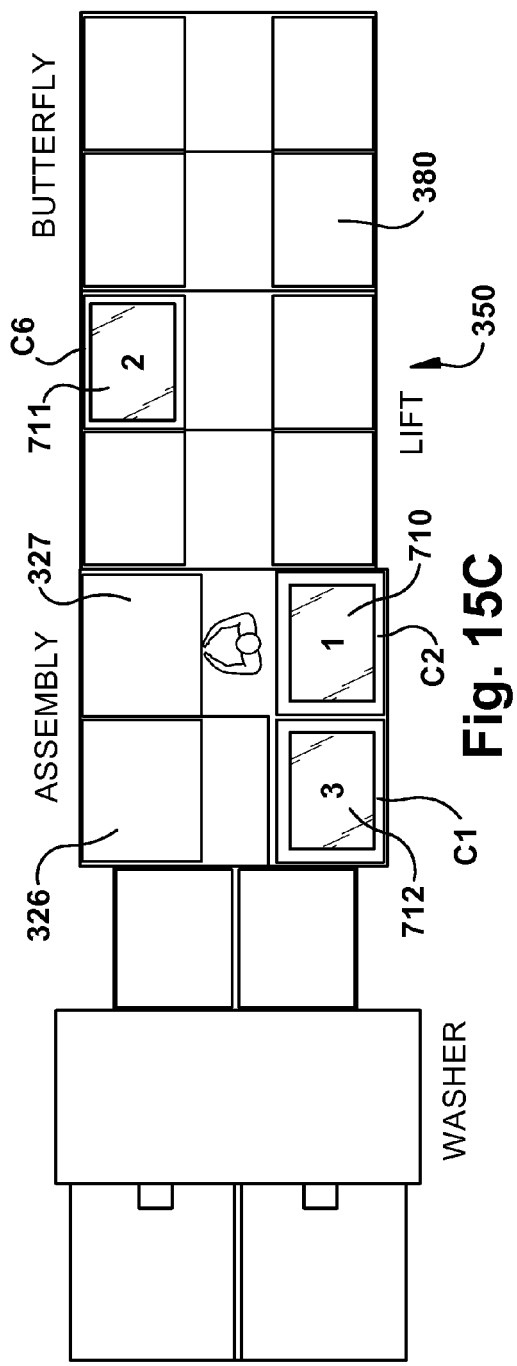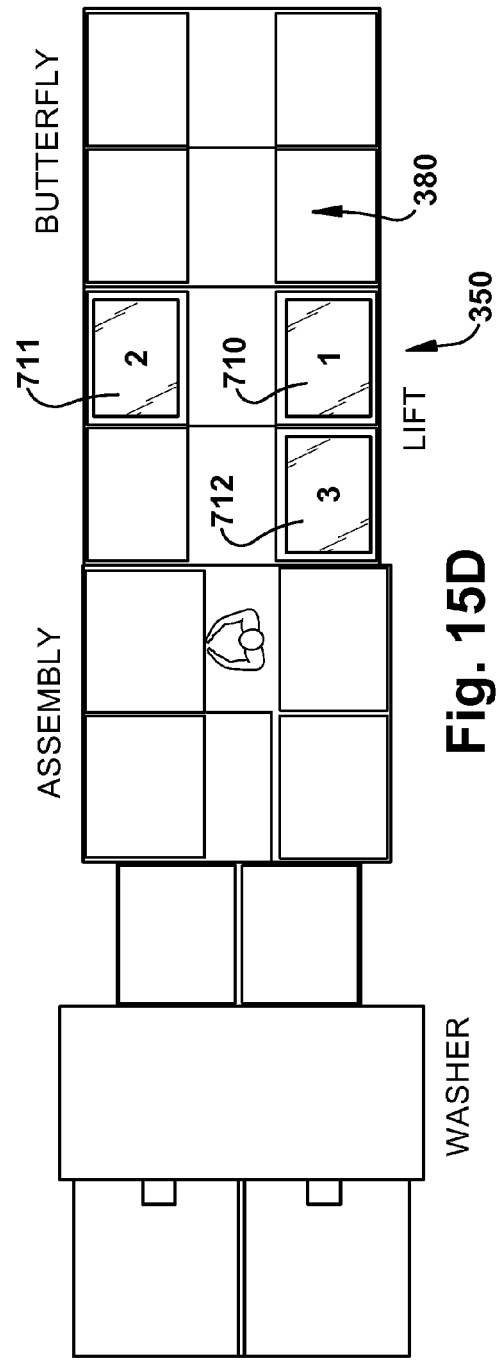

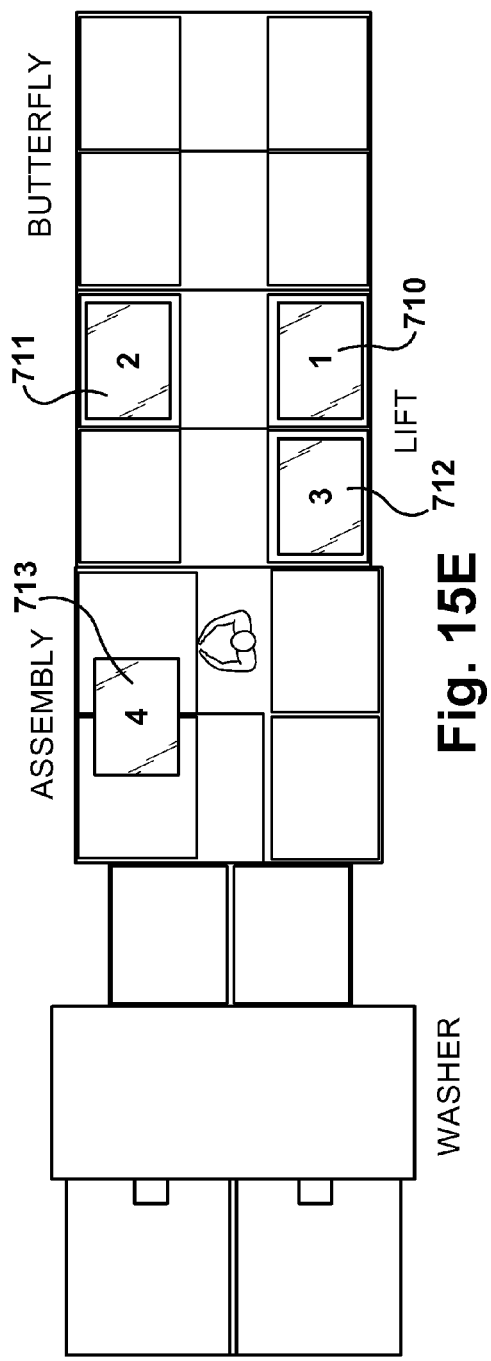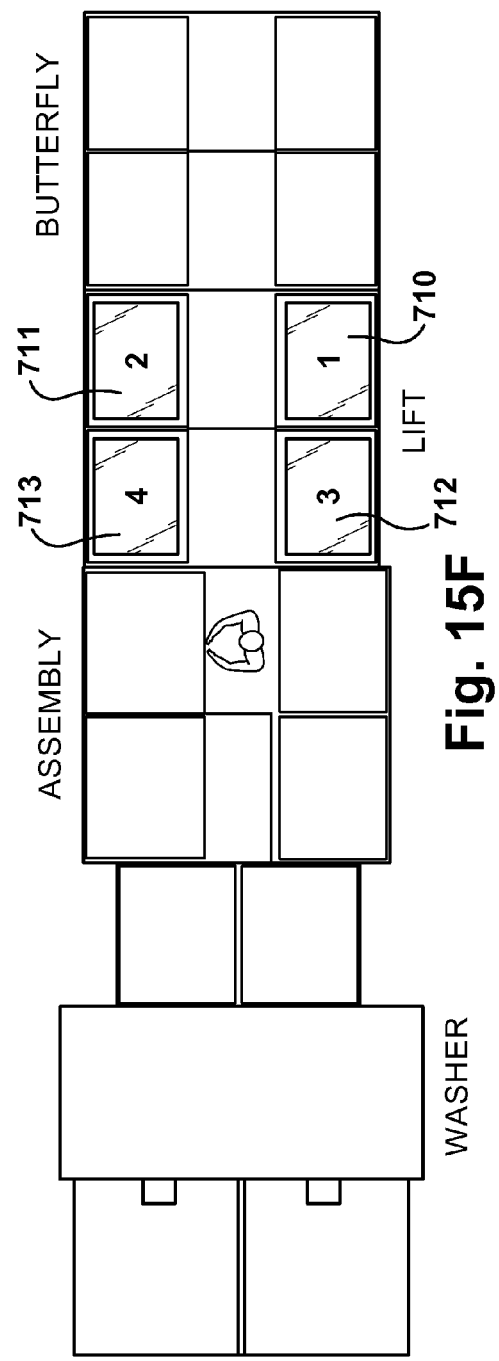

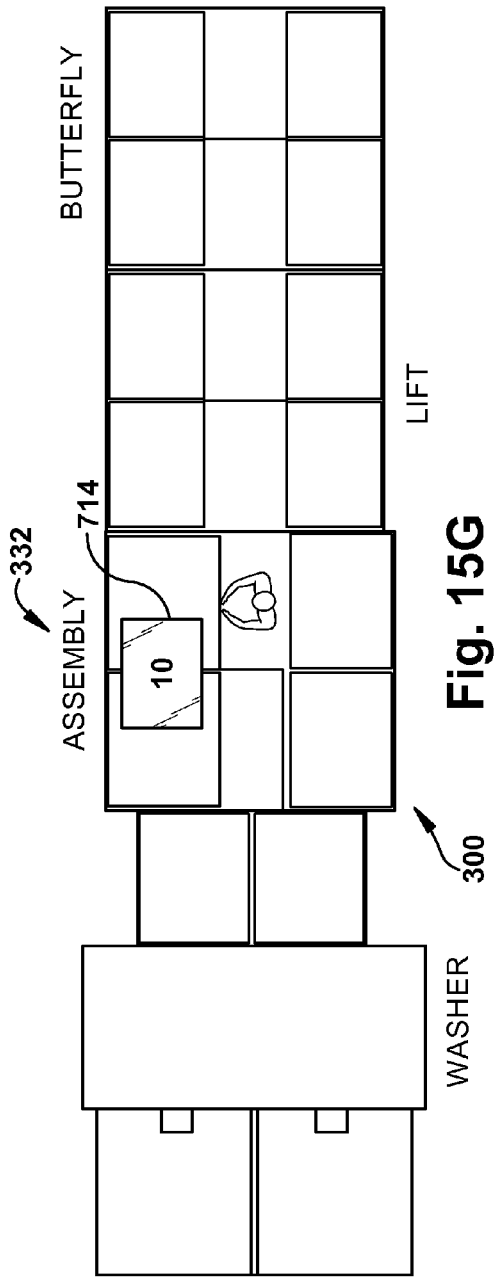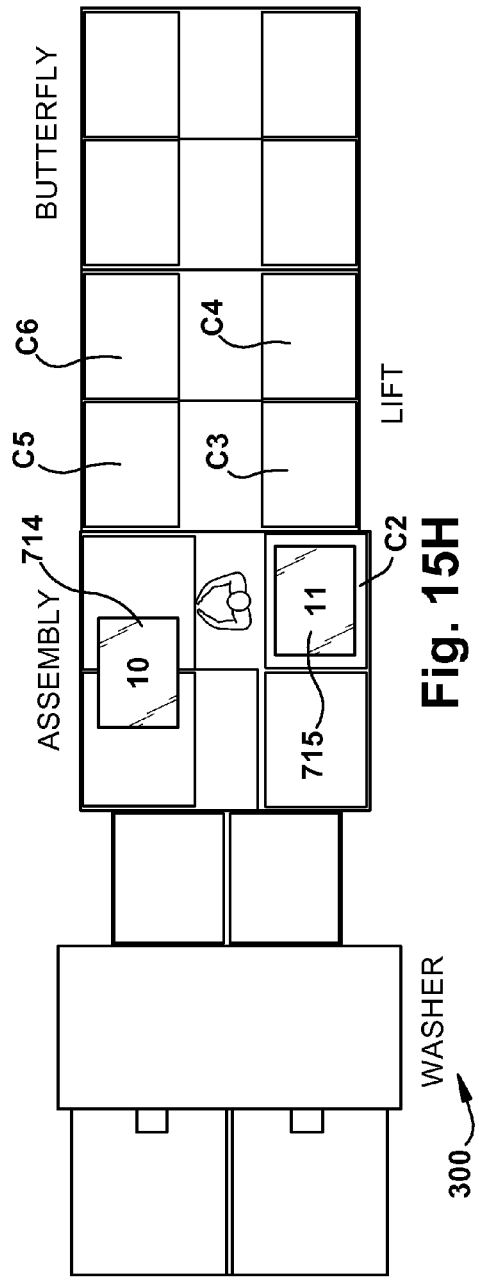

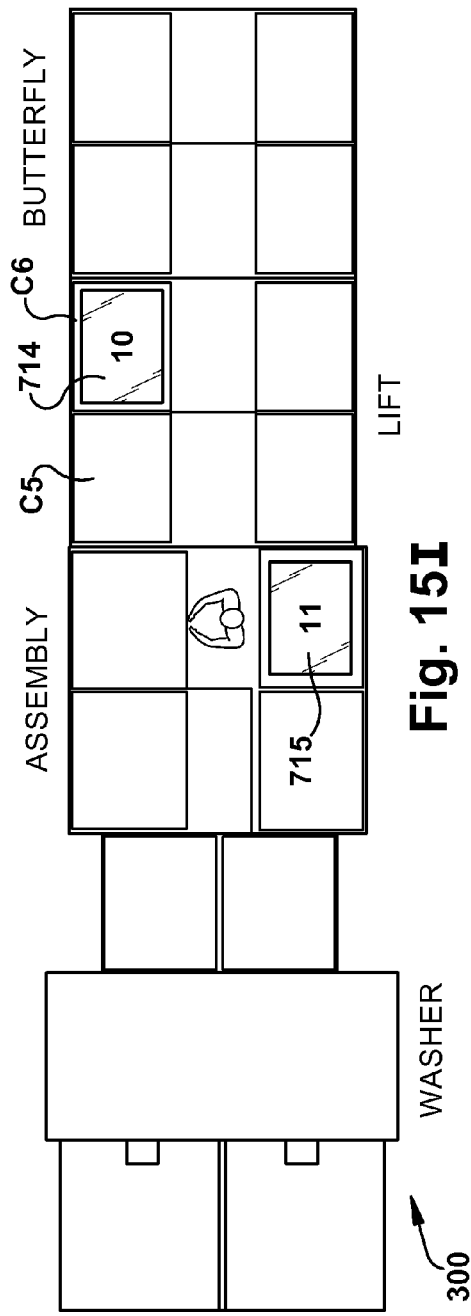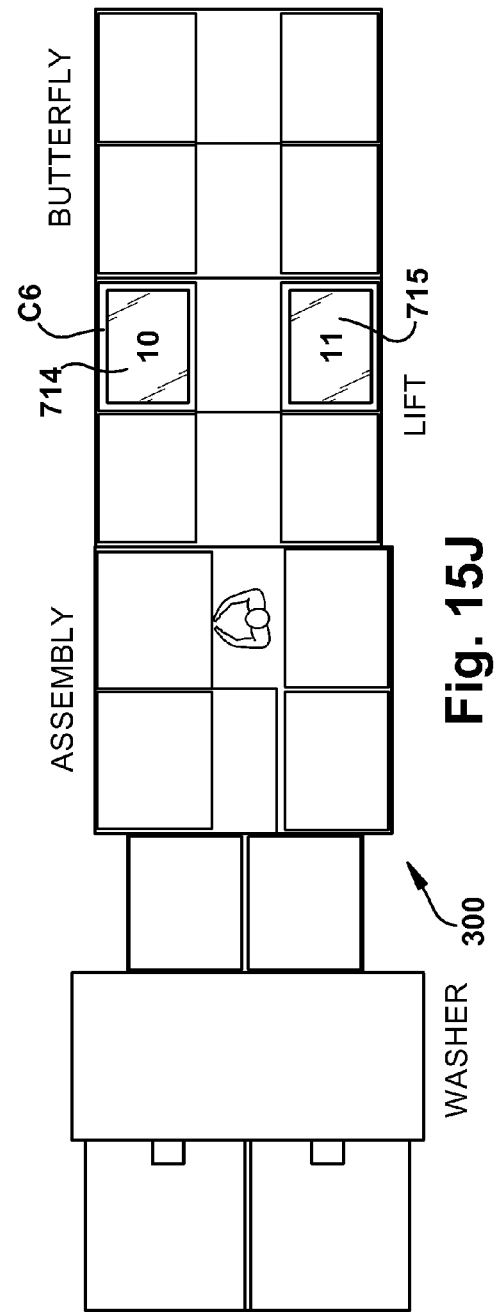

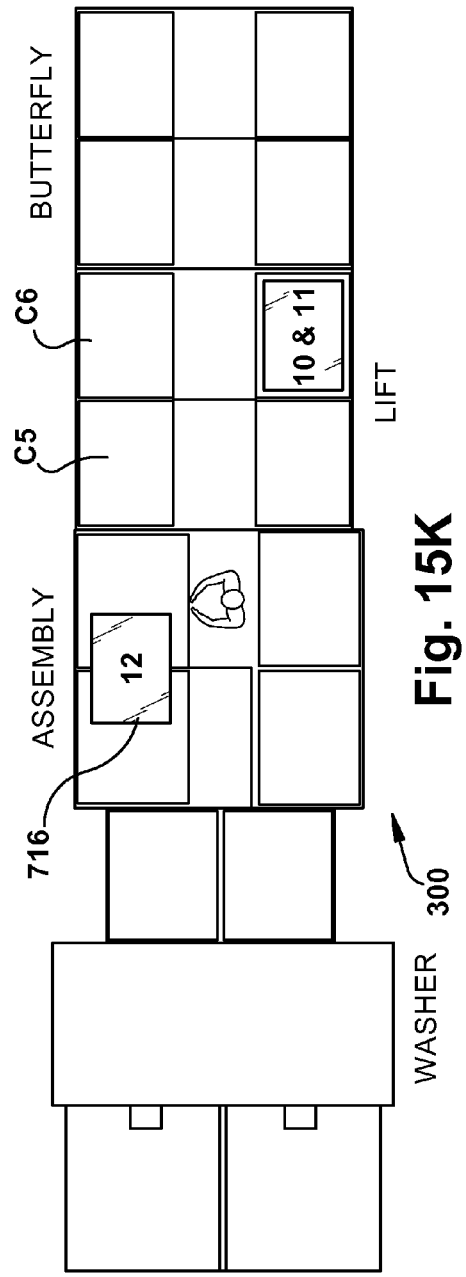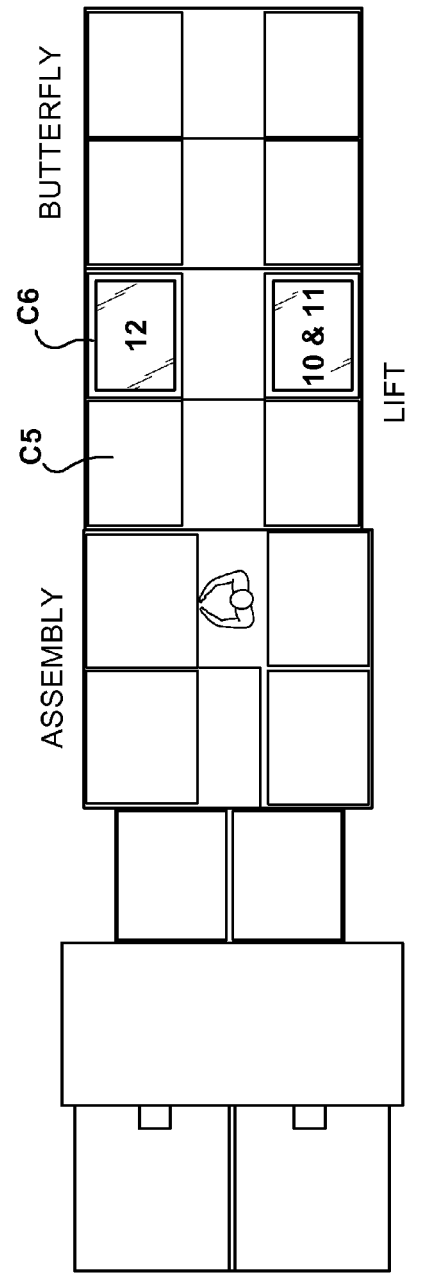

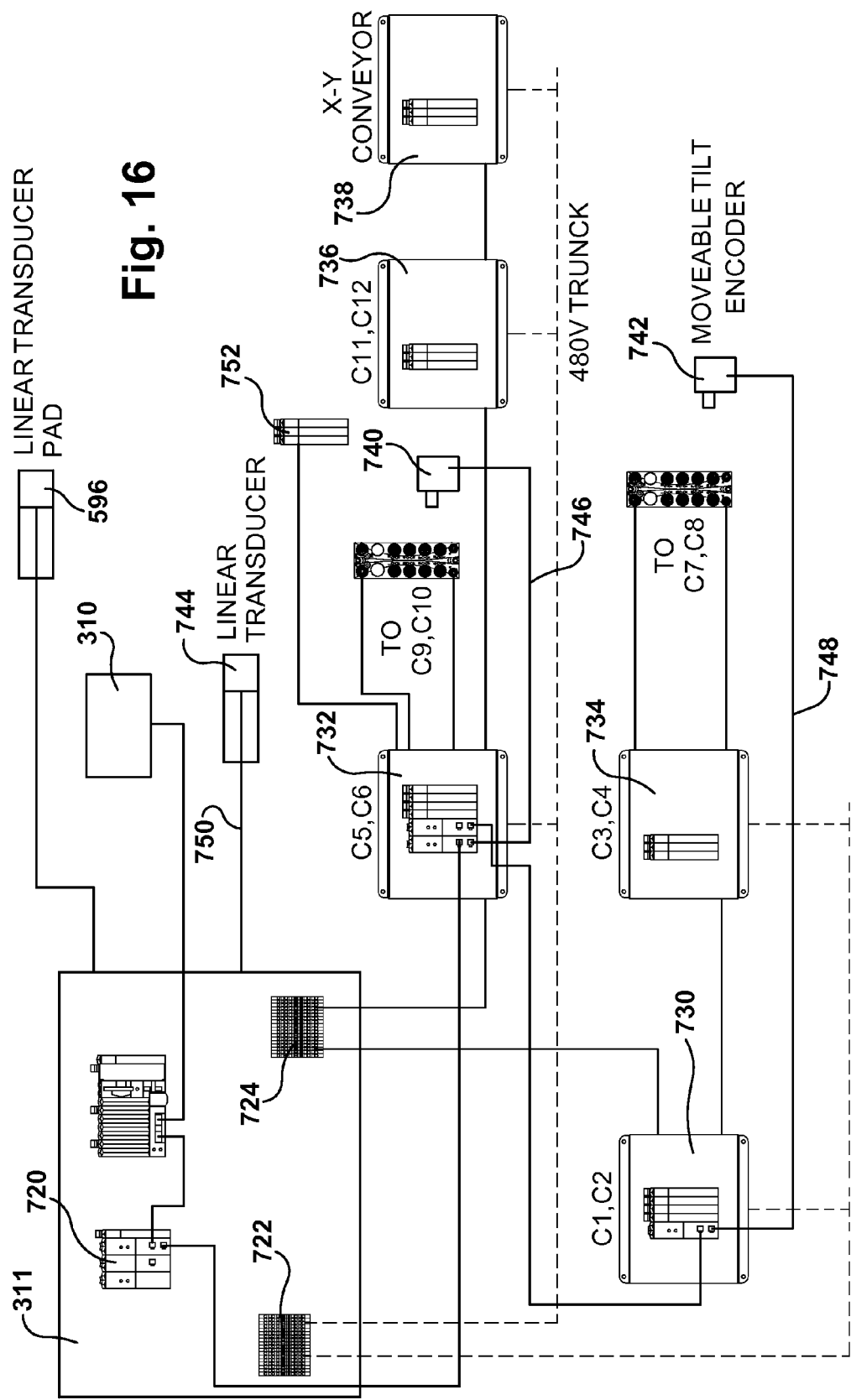

EFFICIENT ASSEMBLY OF INSULATING GLASS WINDOWS

CROSS REFERENCE TO RELATED APPLICATIONS

The present application claims priority from and is a continuation in part of pending U.S. patent application Ser. No. 12/765,064, filed Apr. 22, 2010 which in turn claims priority from provisional U.S. Patent application Ser. No. 61/177,368 filed May 12, 2009. Both applications are incorporated herein by reference in their entireties.

GOVERNMENT INTEREST

This invention was made with Government support under DE-NT000167 awarded by DOE. The Government has certain rights in this invention.

FIELD OF THE DISCLOSURE

The present disclosure relates to efficient assembly of triple pane windows that avoids contamination of the center pane during assembly.

BACKGROUND

One construction of insulating glass units (IGU's) involves forming a spacer frame by roll-forming a flat metal strip, into an elongated hollow rectangular tube or "U" shaped channel. A desiccant material is placed within the rectangular tube or channel, and some provisions are made for the desiccant to come into fluid communication with or otherwise affect the interior space of the insulated glass unit. The elongated tube or channel is notched to allow the channel to be formed into a rectangular frame having a connecting tab at one corner. A sealant is applied to the outer sides of the spacer frame in order to bond two glass panes or lites to opposite side of the spacer frame. Existing heated sealants include hot melts and dual seal equivalents (DSE). This system is not limited to these spacer frame types; other spacer frame technologies that are generally known in the industry can also be used with this system. The pair of glass panes is positioned on the spacer frame to form a pre-pressed insulating glass unit. Generally, the pre-pressed insulating glass unit is passed through an IGU oven to melt or activate the sealant. The pre-pressed insulating glass unit is then passed through a press that applies pressure to the glass and sealant and compresses the IGU to a selected pressed unit thickness. The completed IGU is used to fabricate a window or door.

It is known to construct triple pane IGUs having three panes or lites. Two outer panes contact spacer frames which separate the outer panes from a center or inner pane. When assembling an IG unit, it is important that the glass surfaces that are on the inside airspace remain uncontaminated for two reasons (1) preventing visual defects that cannot be cleaned and (2) preventing contamination of the perimeter of the glass which needs to remain clean or else the adhesive bond between the spacer seal and glass can be compromised ultimately leading to a seal failure.

GED, assignee of the present patent application, currently manufactures an assembly system which conveys two lites of glass parallel to each other horizontally through a glass washer. One lite gets a spacer applied and the other passes through untouched. The two pieces of glass are conveyed and aligned onto a pair of vertical pivoting tables that bring the two pieces of glass together. The advantage to this system is that the glass surfaces that are on the inside of the IG are never touched by the conveyance system after the glass has left a glass washer, thus assuring the inside glass remains clean and contaminant free. This arrangement works very well for conventional dual glazed IG, but is not conducive for fabricating triple IG's. A current difficulty with assembling triple IG units is keeping all inside glass surfaces (Surfaces 2, 3, 4 & 5 on FIG. 4) contaminant free. With the current arrangement it is typical that the inner glass surfaces will make substantial contact with the glass handling system which presents a high risk of contamination of these surfaces.

Process Flow for Conventional (Dual) IG Units; FIGS. 1 & 3:

1. Lite A leaves a washer and is conveyed by conveyors 10, 12 to a spacer assembly station 20 where a spacer 22 gets applied to the sheet A.
2. Lite B leaves the washer and is conveyed down conveyors 30, 32, 34, 36 and waits for lite A.
3. When both lites are staged, conveyors move the corresponding lites to butterfly conveyors 40, 42.
4. The butterfly tables 50, 52 (FIGS. 13 and 14) pivot to vertical.
5. Glass or lite B on the conveyor 42 is pushed onto conveyor 40 against the lite having the spacer.
6. The butterfly tables pivot back to horizontal.
7. The assembled dual IG unit is conveyed out of conveyors 60, 62 and to an oven for downstream processing.

This process flow is well established. Note that each conveyor set (i.e. two adjacent conveyors) is split into separate drive zones. This facilitates the ability to simultaneously process smaller IG's. If a sensor detects an IG over a certain length, in this case over 49", only one IG is processed at a time.

SUMMARY

The disclosure describes a process flow and method and a system for assembling triple IG units (IGU's) without contaminating a center glass lite. A non-contact attraction pad is used to lift a glass lite off from a support that conveys it from a glass washer to an assembly station.

One exemplary system uses the non-contact process to assemble multi-pane insulating glass units (IGUs) from a manufacturing schedule that includes both double pane insulating glass units and triple pane insulating glass units. Conveyors of an assembly line move glass lites or panes along controlled travel paths to at least two different registration stations where lites are brought into registration with each other.

If the manufacturing schedule calls for a triple pane insulating glass unit, a first outer glass lite and a first spacer that has been registered with the first outer glass lite are moved as a unit on a conveyor to a first registration station. At the first registration station, a middle lite is placed into registration with the first spacer frame to form an intermediate IGU layer. The intermediate IGU layer is then moved to a different registration station. At the different registration station a second, outer lite and second spacer frame are moved into registration with the middle lite of the intermediate IGU layer and pressed together to form a triple pane insulating glass unit.

If the manufacturing schedule calls for a double pane insulating glass unit, a first outer glass lite and attached first spacer frame are moved as a unit to a selected one of the two registration stations where a second outer lite is brought into registration with the first spacer frame to form a double pane insulating glass unit.

These and other objects, advantages and features are described in conjunction with the accompanying drawings.

BRIEF DESCRIPTION OF THE DRAWINGS

FIGS. 2A and 2B are perspective views of a triple pane assembly process;

FIG. 9 shows a combined lite and spacer frame moving together into position beneath a lite hovering beneath the non-contact lift assembly;

FIGS. 10 and 11 are perspective views of first and lite and then a combined lite and spacer frame moving into registration with each other;

FIGS. 15A-15L are schematic depictions of a sequence of steps in fabricating double and triple pane IGUs;

FIG. 16 is a schematic of control components for directing operation of conveyors, display monitors, sensors and pneumatic components of the FIG. 14 assembly line;

DETAILED DESCRIPTION OF AN EXAMPLE EMBODIMENT

Figure 1:
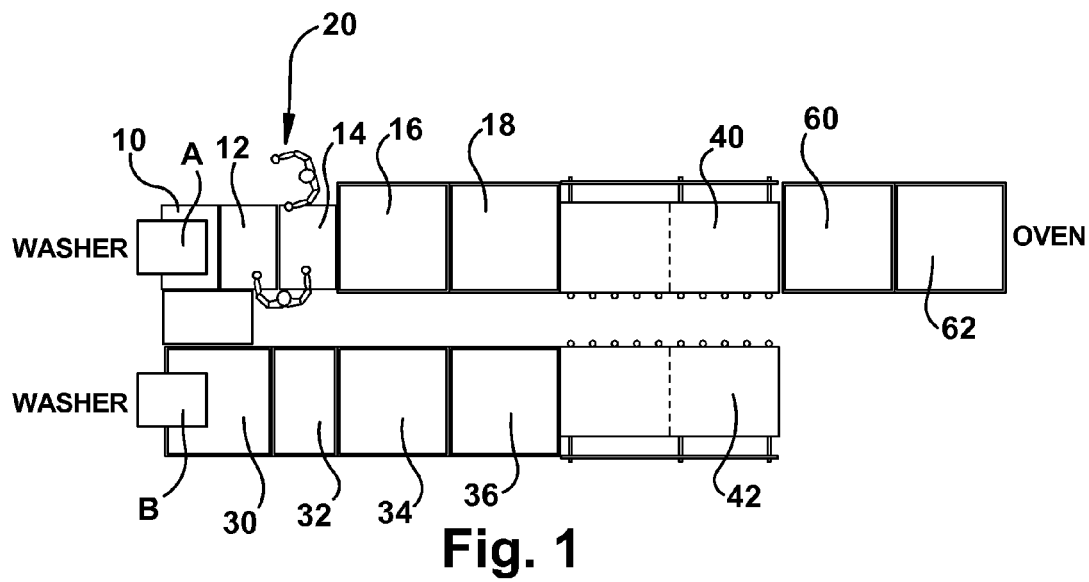
FIG. 1 is a schematic view of a conventional two pane assembly process.

The figures illustrate an assembly station 110 for assembling triple pane insulating glass units (IGUs). An overhead conveyor (not shown) delivers IGU spacer frames. U.S. Pat. No. 5,313,761, incorporated herein by reference for all purposes has a more complete description of an IGU. Sealant is applied to opposite sides of the frames for constructing triple pane insulating glass units. At the assembly station 110, glass lites of a specified size that have been washed are moved to the assembly station 110. FIG. 2A illustrates one lite 112 that has been manually brought into registration with and attached to a first spacer frame 113 for movement on a generally flat surface 114 in the direction of the arrow 116. The combination of the one lite 112, a first spacer frame 113 and a muntin grid 115 that is attached to the spacer frame move along a travel path indicated by the arrow 116 away from the location they are assembled by placing the frame 113 onto the top of the glass lite. The frame 113 extends around an outer perimeter of the lite 112 and when a muntin grid 115 is included the grid fastens to the frame at certain locations defined by cutouts in the spacer frame.

A second glass lite 120 moves in the direction of an arrow 117 along a flat surface 118 out of the washer to a registration station 30 wherein the lite 120 is caused to hover over a generally flat surface. The first lite 112 and its associated spacer frame (and as depicted in FIG. 2A, muntin grid) is then moved into registration beneath the hovering glass lite 120. The second lite 120 is then lowered into contact with sealant on the spacer frame to which the first glass lite 112 is attached.

Figure 2B:
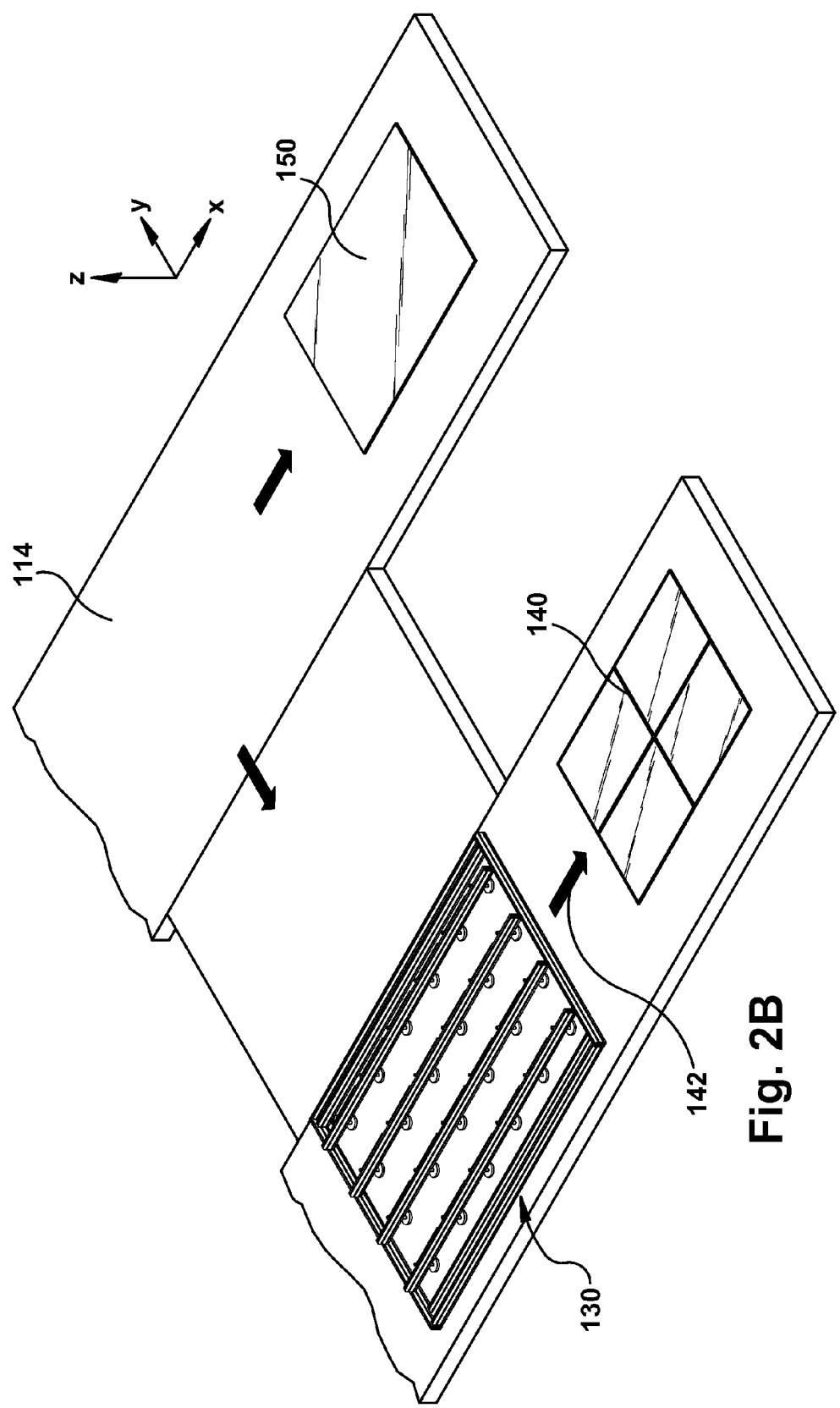
Figure 3:
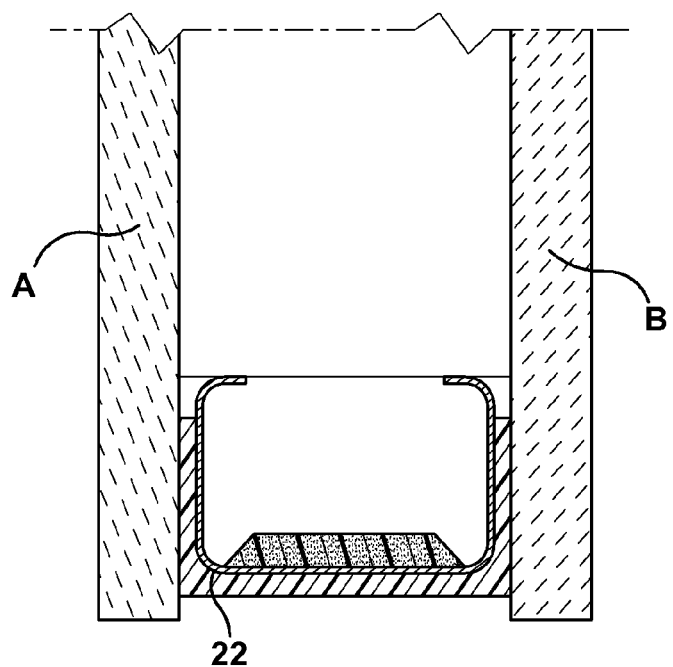
FIG. 3 is a section view of a two pane IGU.

The first and second lites as well as a spacer frame sandwiched between the first and second lites forms a combination 140 (FIG. 2B) similar to the two pane IGU shown in FIG. 3. The combination 140 is moved away from the registration station 130 in the direction of the arrow 142 to a downstream workstation. At the downstream workstation, a second spacer frame 144 (FIG. 4, note no muntin grid) and third glass lite 150 attached to the second spacer frame are brought into registration with the combination 140 of the first and second glass lites by pressing an exposed surface of the second lite 120 (which was previously caused to hover at the registration station) into engagement with sealant on the second spacer frame to configure a triple pane insulating glass unit. Registration of the glass lites means that for the IGU, edges of the three lites align along all four sides within acceptable tolerances. After the triple pane IGU is configured, the IGU is routed through an oven wherein sealant holding the panes to the frames of the triple pane insulating glass unit is cured.

Figure 2:
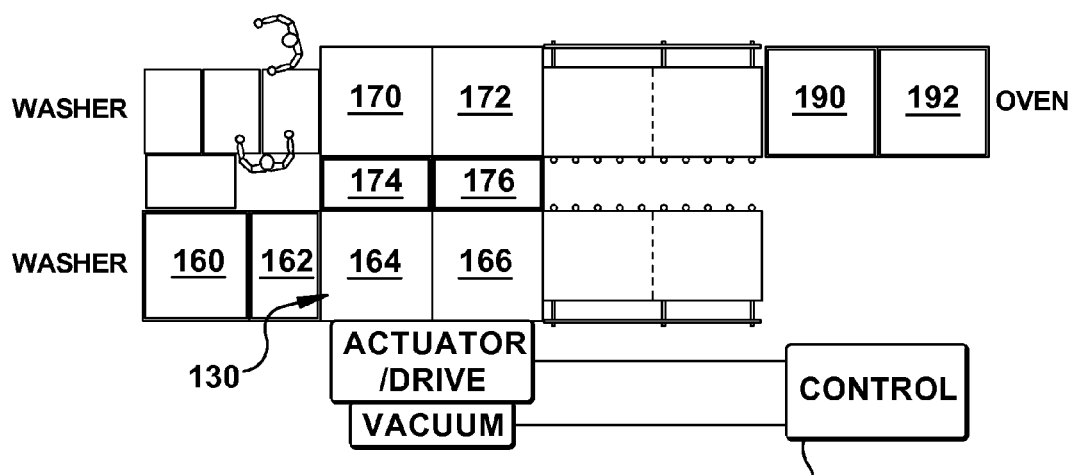
FIG. 2 is a schematic view of a new and improved triple pane assembly processes.
Figure 4:
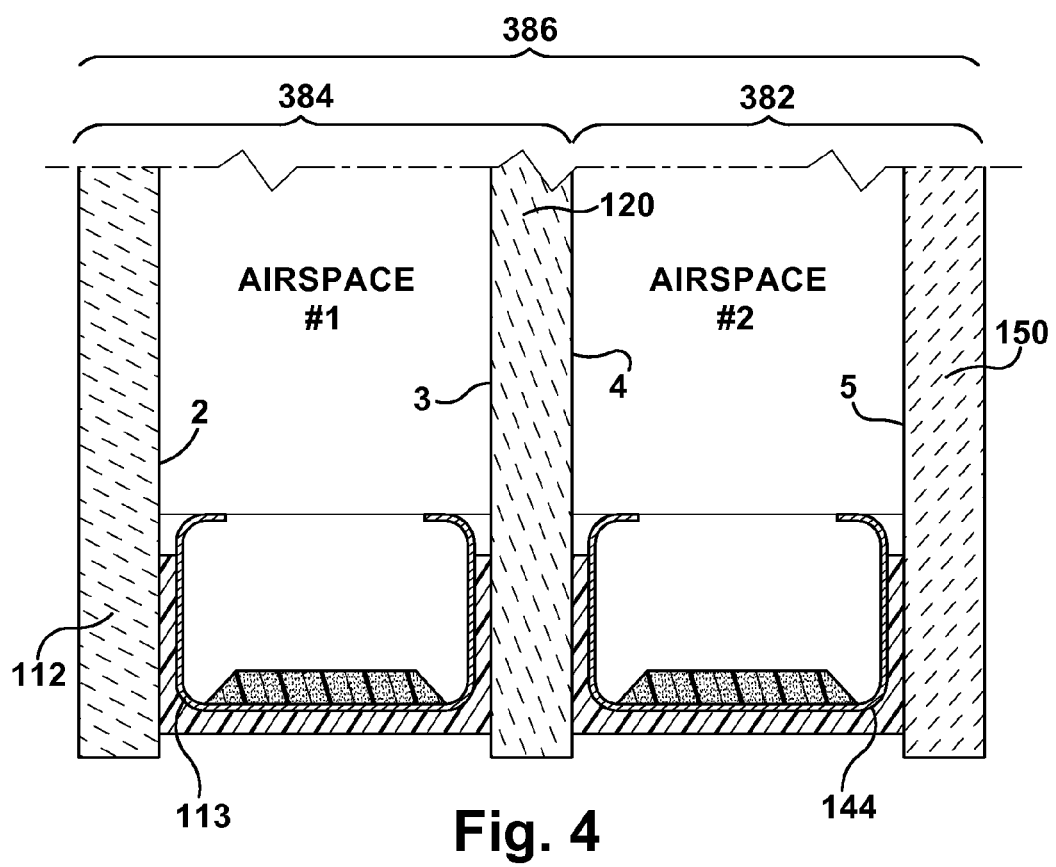
FIG. 4 is a section view of a three pane IGU.

A Process flow for triple IG units is depicted in FIGS. 2 & 4 and summarized with the following sequence of steps:

1. Lite 112 is conveyed to the spacer assembly station & the spacer 113 is applied
2. Simultaneously, lite 120 is conveyed on conveyors 160, 162, 164, 166 (FIG. 2);
3. Lite 120 is registered at conveyor 166;
4. Lite 120 is lifted by "No-Touch" lift system 210 and remains suspended
5. Lite 112 is conveyed to conveyor 172 and is x-y transferred by a conveyor 176;
6. Lite 112 is conveyed to conveyor 166 and registered underneath lite 120;
7. Simultaneously, lite 150 is getting a spacer applied;
8. Lite 120 is lowered onto lite 112 (which has a spacer);
9. Sub-assembled lites 112, 120 are conveyed to a butterfly assembly position
10. Simultaneously, lite 150 (which has a spacer 144) is conveyed to the butterfly assembly position; and
11. Butterfly tables 50, 52 cycle normally and a finished triple IGU exits to conveyor 190, 192

Note that Conveyors 160, 162, 164, 166 are an air flotation system which reduces the risk of the conveyor system marking the lite 120 during transportation. With this process flow configuration, the order of the glass feed can be altered to suit placement of the low-e glass or muntins in the desired arrangement. Also, with the assembly flow depicted in FIG. 2, it is possible to run conventional (dual) IG units normally such as depicted in FIG. 1.

A lift system 210 is located above conveyors 164, 166 and has lifting pads that are unique in design. They generate a lifting force for the lite 120 without making physical contact with the glass surface. This is important for the system's ability to not mark the glass during handling and assembly. One such non-contact lifting pad is made by SMC, called a "Cyclone Pad". A 100 mm diameter pad has the capacity to vertically lift 7-10 lbs per lifting pad. To lift a 70"×100"×¼" thick piece of glass, the lift system needs an array of pads spaced 18" apart. For this maximum glass size, it is estimated that 20 "Cyclone Pads" are required. Twenty four pads in a six by four array are shown in FIG. 2B. Similar products that may employ different technologies are available from other manufacturers such as New Way and Bosch, but these products achieve the same end result—non-contact lifting of the glass. Since the vacuum lifting system does not touch the glass, the glass has the ability to skate or move laterally. Therefore the glass needs to be registered and clamped on the edges to prevent lateral movement.

Non-Contact Glass Transport, Squaring and Lift System Description

As described above, it is important that during manufacture of an IGU that does not marks, residual dirt or smudges are not left on the glass caused by operators or the conveyance system, and it is especially difficult to accomplish this for a triple IGU. The following more detail of the sequence summarized above for assembling the center lite 120 of a triple IG without making physical contact with the inner or outer flat surfaces of the lite.

Figure 6:
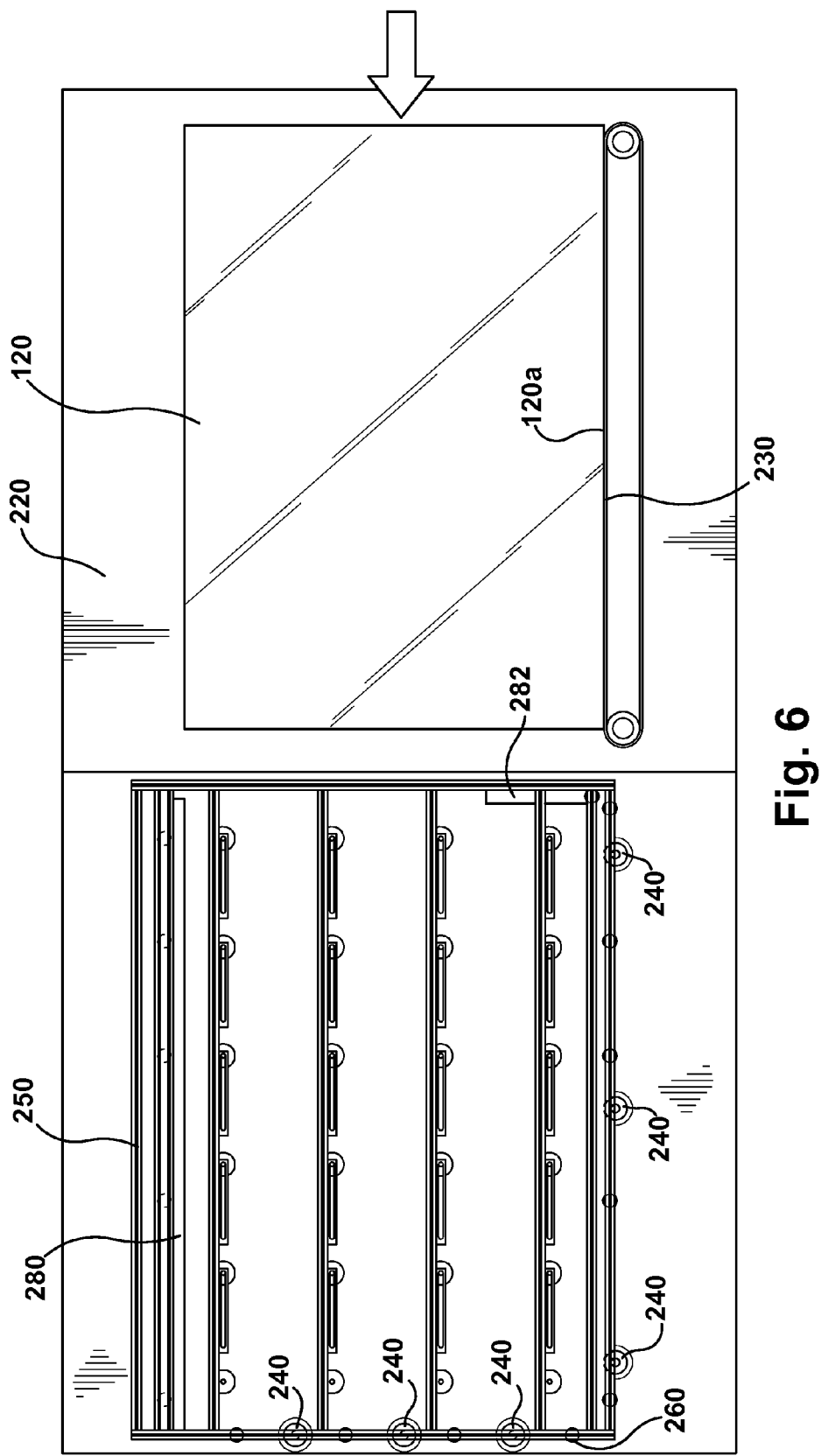
FIG. 6 is a plan view of a lite transfer station constructed in accordance with the invention.
Figure 7:
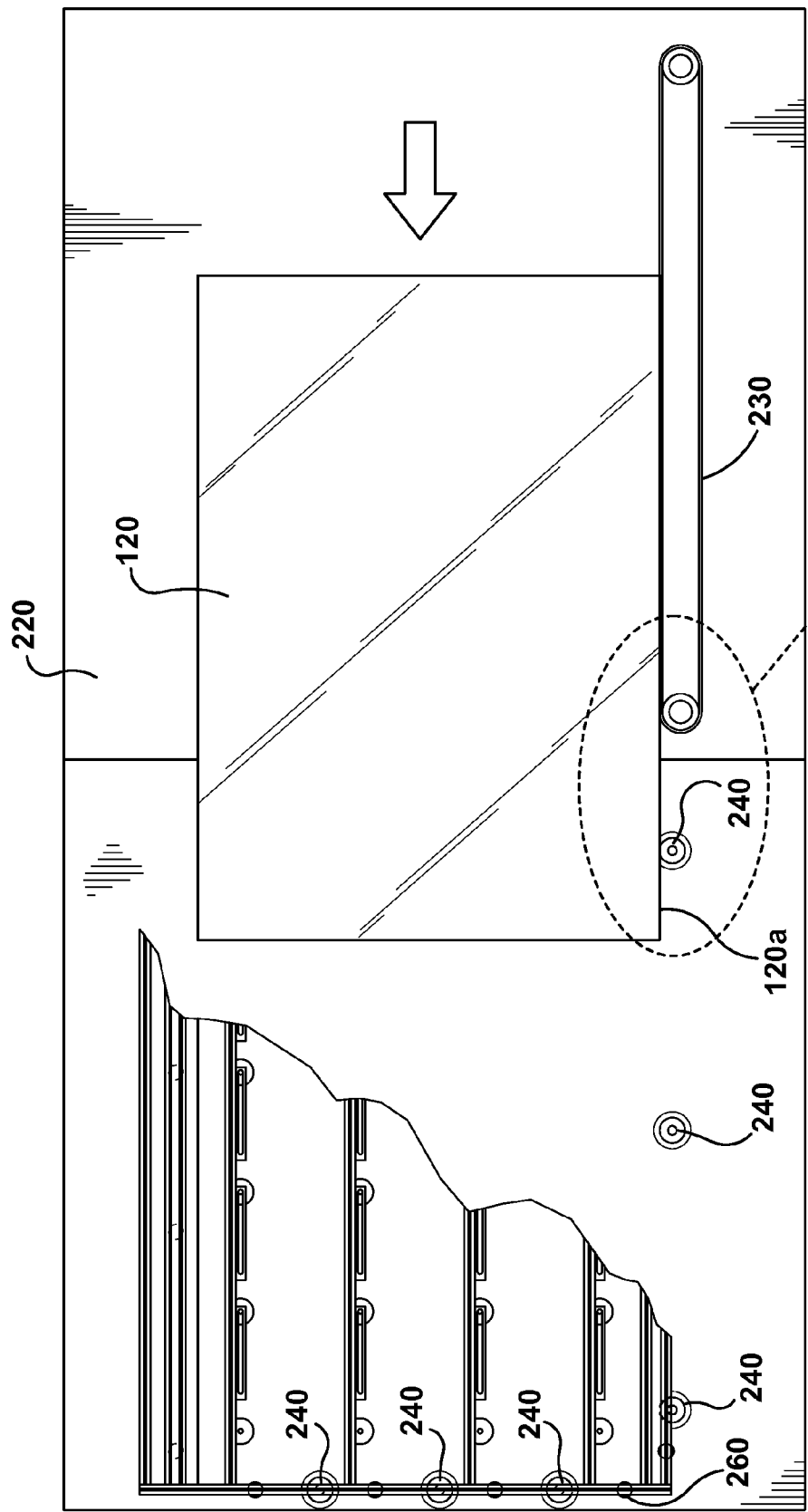
FIG. 7 shows a glass lite on a pivoting table as it is delivered to a registration position.
Figure 8:
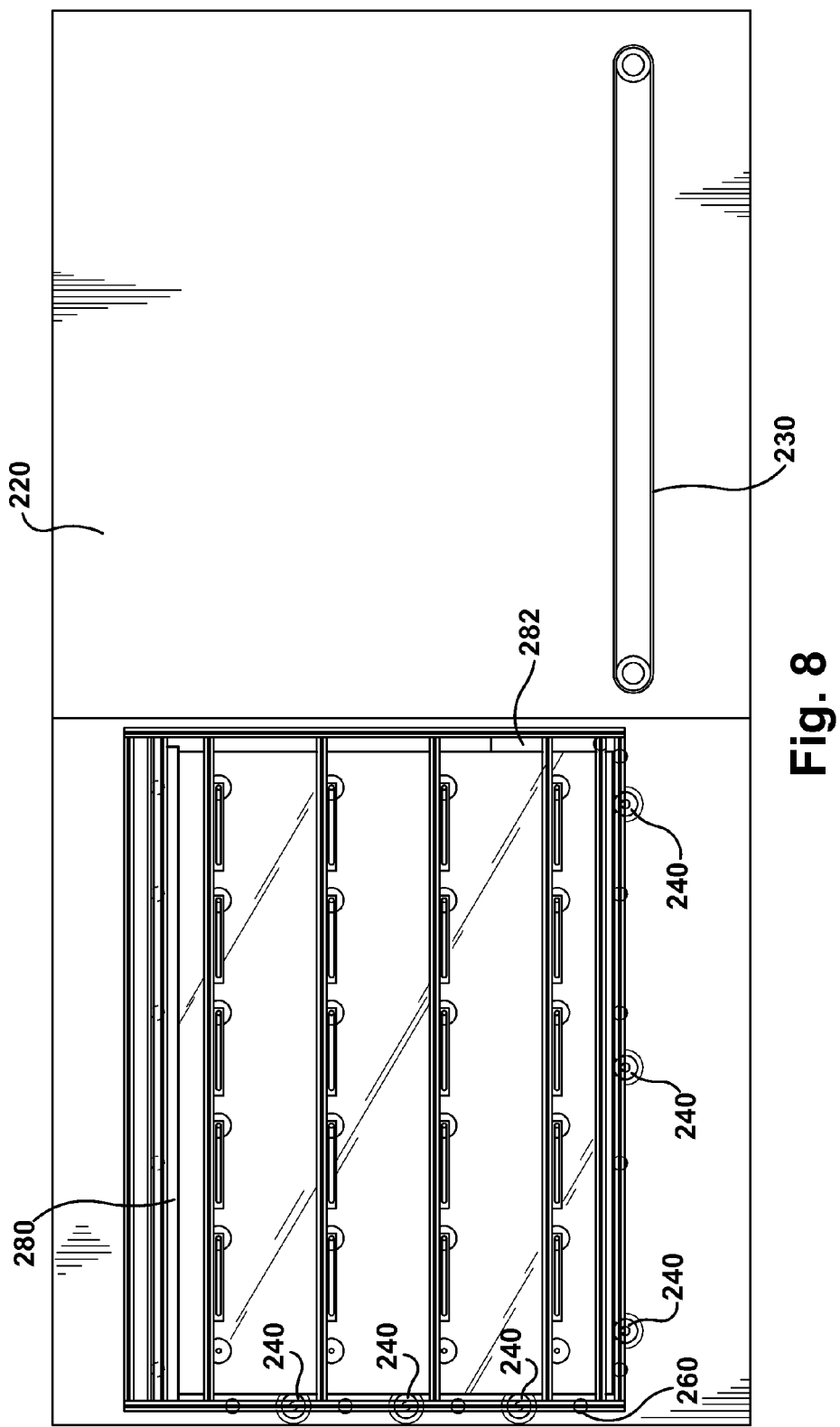
FIG. 8 is a schematic of the lite of FIG. 7 in registered position beneath a non-contact lift assembly.

Step 1: (FIG. 6) An air flotation table 220 on which the glass lite floats tilts or rotates about a rotation axis along an edge of the table (about 10 degrees) so that an edge of the center lite 120 rests against a drive belt 230. This will register one edge 120a of the glass and also provide a means to move the glass lite 120 from the edge using the drive belt. Another method of indexing the glass to the next station would be to leave the tabletop horizontal and have push bars actuate until the glass is pressed firmly against the drive belt.

Step 2: Drive the center lite 120 into the registration/lift area at the registration station 130 in a region of conveyors 164, 166. The belt 230 is driven by a motor, and the gravity from tilting the table provides sufficient edge friction to drive the glass. Increasing the tilt angle will increase the drive friction which may be needed to stabilize the glass.

Step 3: Register the center lite 120. Pop up cylindrical stops 240 (FIG. 6) run parallel with the belt. These stops are also driven and will finish driving the glass lite into a corner of the registration station 130. A controller 200 turns on the air lift system and returns the table beneath a vacuum frame assembly 250 to a flat orientation. At this point the entire lift frame assembly 250 lowers. The array of lift pads 252 are in close proximity to the glass because of an air bearing characteristic of the lift pad. The pads are spring mounted to a pivoting assembly to ensure that the edge of the pad does not contact or scratch the glass. The lift frame assembly 250 has a set of registration rollers 260 on two sides that are essentially in-line with the lower rollers 240. These rollers pivot slightly inward to push the glass away from the lower rollers. The glass is pushed from the other two sides against these stops by either an air cylinder or a belt. The center lite 120 is clamped by the lift frame assembly 250 and registered.

Step 4: Lift the center lite from the flotation tabletop. The FIG. 11 depiction shows an air cylinder lifting the entire lift frame assembly 250 with the glass lite 120 firmly clamped. A ballscrew or acme screw arrangement is used to lift the vacuum frame assembly 250. The center lite at this time is suspended above the tabletop.

Step 5: The lower lite 112 has a spacer frame 113 (and possibly attached muntin grid) and is now conveyed laterally across conveyor 176 (or depending on size of lite, conveyors 176, 174). This conveyor does not need to include a flotation table since an inner glass surface 2 (FIG. 4) does not touch this conveyor. The pop up stops 240 that border between conveyors 164 & 174, and between 166 & 176 are retracted under the tabletop and the lower lite 112 with the spacer is conveyed onto conveyor 166, and for larger lites (>49") onto conveyor 164 & 166. The pop-up stops 240 are raised up by pneumatic actuators and the glass lite 112 is registered against these stops by motor driven push bars 280, 280 possibly with gravity assistance from the tilting conveyor. This registers the lower lite 112 with respect to the center lite 120.

Step 6: The center lite is lowered onto the lower lite until contact (or near contact) is made with the spacer. At this time the lift pads release the attraction to the center lite and the center lite now engages the spacer that is already attached to the lower lite. A mechanism may also be used to "tack" the edges of the glass to the spacer to prevent shifting or a misassembly condition caused by gravity when the lower/center lite are brought to a vertical orientation by the downstream butterfly table. The tacking process can be achieved by either lowering edge clamps to a predetermined size, using a sensor to determine press position, or using a motor load routine to determine adequate pressing.

The glass lite 120 is corner registered by controlled movement of two push bars 280, 282 forming a part of the lift frame assembly 250. These push bars register the lite 120 against the pop up end stops 240 that engage two sides of the glass lite 120. One push bar 280 extends along one side of the vacuum frame assembly 250 in the 'X' direction and a second push bar 282 extends a shorter distance along a generally perpendicular direction to the first. To accommodate small glass sizes, the push bars 280, 282 must clear (pass beneath) the vacuum pads 252 as the bars move inward and outward.

In the exemplary embodiment, the lift pads are oriented in an array as shown and are mounted to cross members 270

Figure 5:
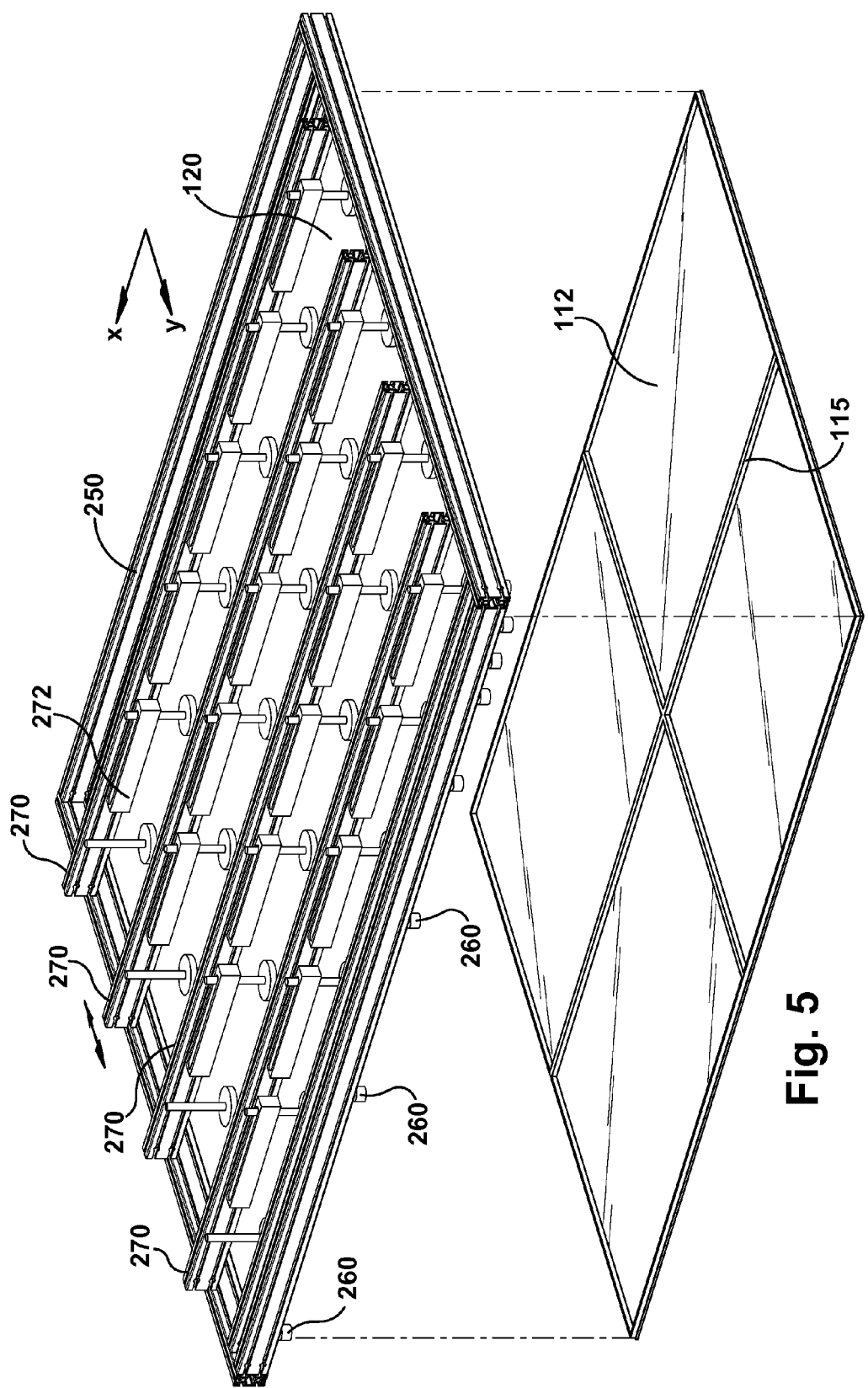
FIG. 5 is a perspective view of a portion of an assembly station for raising glass lites above a surface during assembly of the triple pane insulating glass unit.

(FIG. 5) that extend generally parallel to a direction of glass movement in the 'X' direction. These cross members 270 are coupled to a linear bearing 271 supported by a frame 273 for movement back and forth in the 'Y' direction. In the exemplary embodiment each cross member 270 supports six pads 252 and five of the six pads can be moved relative to the cross members along guides 272 attached to a respective one of the cross members 270. As the push bar 282 moves inward to register the lite 120 in a corner of the vacuum assembly, it contacts outer circumferences of one or more pads supported by a first cross member and moves the nearest set of vacuum pads and accompanying cross member. When the vacuum pads coupled to a given cross member reach an end of travel limit near an adjacent row or set of vacuum pads, the push bar 282 stops and the pads are lifted up and over the push bar so the push bar can continue to move toward the stops 240 and register the glass lite 120. During this process one or more additional rows of vacuum pads may be repositioned by the push bar 282.

After the pads raise up out of the way so the push bar can pass beneath, the vacuum pads return to their original position. On a return trip by the push bar, the vacuum pads are again contacted (on the opposite side) by the push bar and moved to their original positions shown in the Figures to await receipt of a next subsequent glass lite at the registration station. Movement of the push bars is accomplished with a suitable drive such as a servo motor coupled through a suitable transmission (not shown). Up and down movement of the pads and pop up stops is accomplished by suitable pneumatic actuators. Both the servo motors and pneumatic actuators along with a vacuum pump operate under control of a controller which in the exemplary embodiment is a programmable controller 200.

Butterfly Table, Adaptive Machine Cycling Routine

Figure 12:
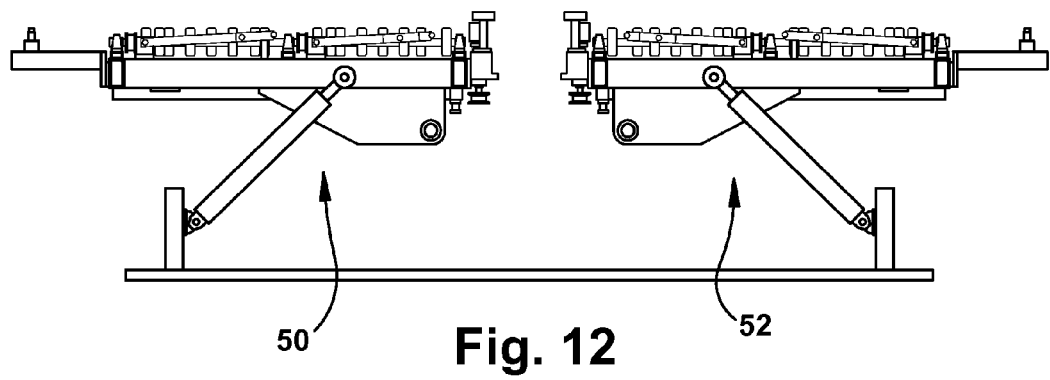
FIGS. 12 and 13 are elevation views of different states of a butterfly table for assembling IGUs.
Figure 13:
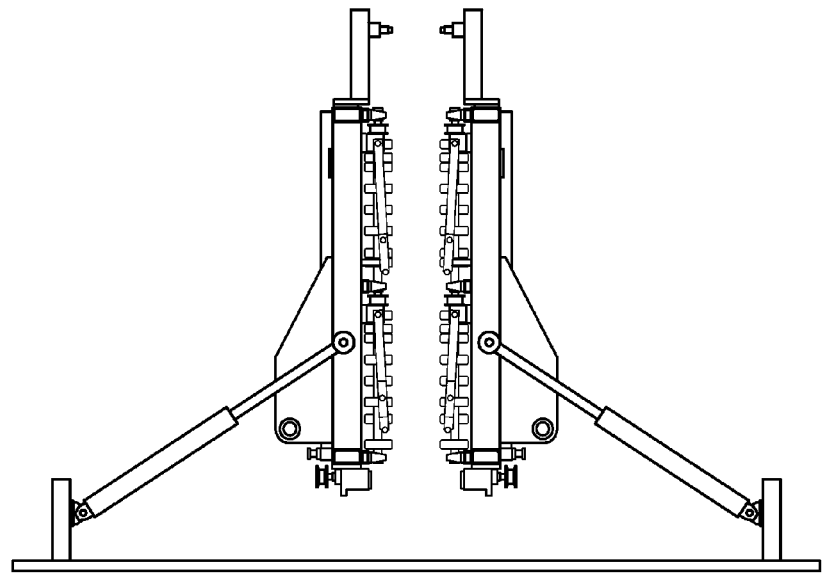

Currently the butterfly tables 50, 52 (FIGS. 12 and 13) are raised and lowered by hydraulic cylinders. See also U.S. Pat. No. 6,553,653, which is incorporated herein by reference. During the pivoting up and down, mechanical limit switches are used to shift the hydraulic cylinders between high and low speeds. This is done so that during the transition from horizontal to vertical, the momentum of the table does not make the glass tip over center when it is near vertical.

The invention senses the glass size and adapts the butterfly sequence according to a predetermined motion profile. Larger lites need to run slower than smaller lites, especially as the butterfly table approaches vertical. Having adaptive motion technology in the butterfly table can increase throughputs, since it is not necessary to run lites at speeds slower than possible.

To do this, the butterfly table has a servo-controlled system. A servo motor is used in place of the hydraulic system. An electro-pneumatic (proportional air regulator) servo system can also be used, or a ball screw system could be used. There are many ways to accomplish the end goal of coupling the machine's motion profile with a particular glass size. Recipes, or ranges of glass sizes, can be assigned to one motion profile and another range of glass sizes assigned to another profile, etc. . . . . These recipes would be stored in a computer or controller, and they can be recalled either manually or assigned to a specific input by a sensor array.

Figure 14:
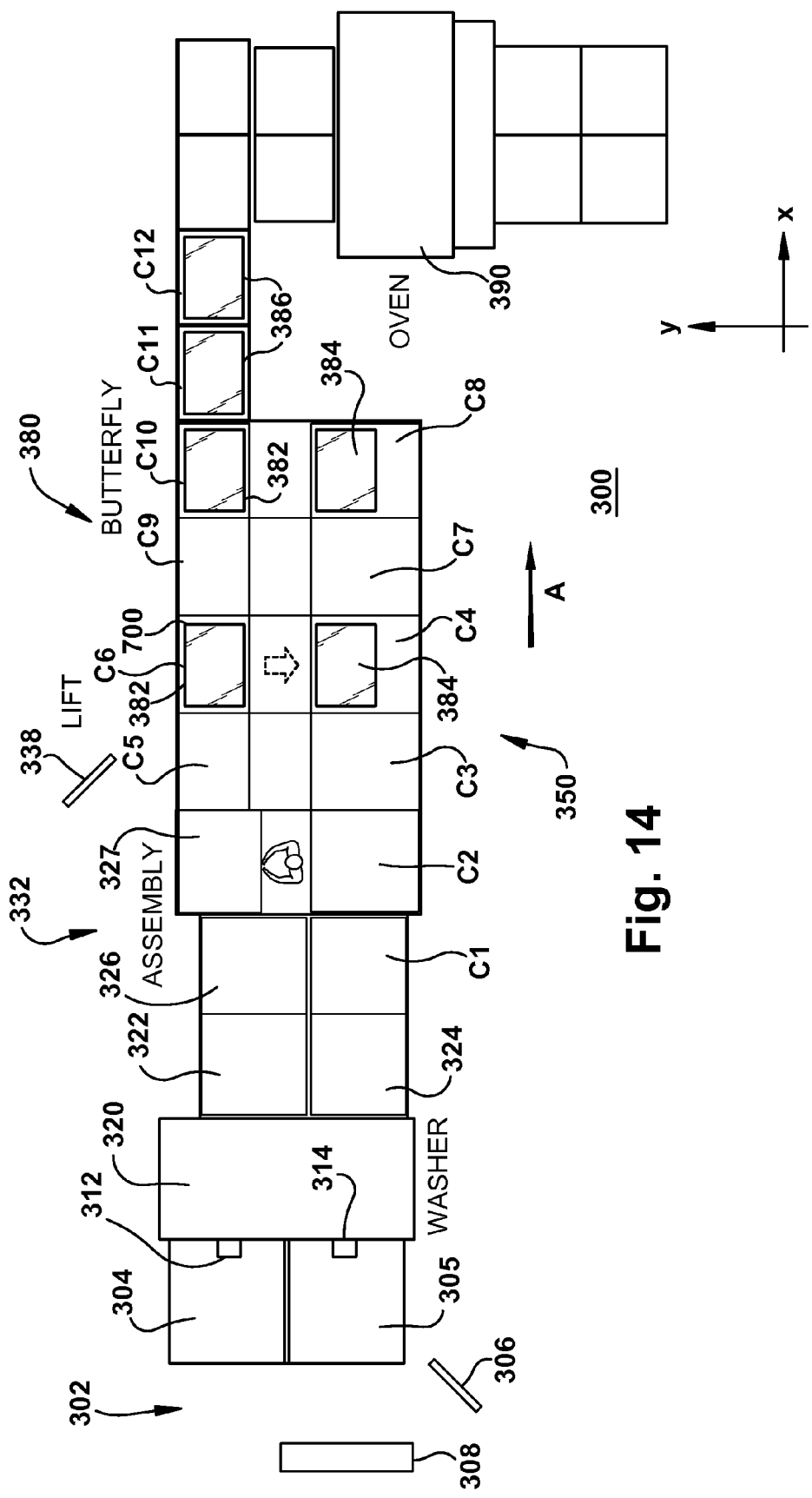
FIG. 14 is a schematic depiction of an alternate assembly line for interleaving double pane and triple pane IGUs.

FIG. 14 illustrates an alternate example embodiment of an assembly line 300 for assembling interleaved double and triple pane insulating glass units (IGUs). While the illustrated example embodiment of FIG. 14-36 operates primarily with the transport of the IGUs in the horizontal position, it should be appreciated by those skilled in the art that the IGUs could be transported on the IGU edges vertically without departing from the spirit and scope of the claimed disclosure. An overhead conveyor (not shown) delivers IGU spacer frames to the assembly line 300. Sealant or adhesive has been previously applied to opposite sides of the spacer frames for constructing both double and triple pane insulating glass units.

At an input station 302 of the assembly line 300, glass lites of a specified size are placed onto one or the other of two conveyors 304, 305 by a user, but larger lites that are greater than a certain width, contact both conveyors 304, 305. In one example embodiment, the assembly line is cable of receiving a lite having a width of ninety-six inches (96"). The conveyors 304, 305 move the lites to an entrance of a washer 320. A controller 310 (FIG. 16) is coupled to a display monitor 306 conveniently located so that a user can refer to the monitor as he or she loads glass lites onto the conveyors 304, 305. A display screen (FIG. 31) depicts lites that make up a then current IGU and one or more next subsequent IGUs. The lites for different IGUs are displayed in different colors. The user is specifically prompted as to which lite of multiple number of lites on the display 306 should be moved from a cart 308 containing many glass lites. As one way of simplifying the task of unloading the cart 308 the lites (2 or 3) that make up a particular IGU have been bundled together at a cutting station where lites are cut to size upstream in the IGU fabrication process. A physical mark (not shown) is also typically placed on the washer entrance to aid the operator in properly aligning an edge of the lite as it is placed on the input conveyor.

Coupled to an input side of the washer are two visual indicators 312, 314 (in one embodiment these are light emitting lamps), which are illuminated by outputs conveyed from a PLC controller 311 to a driver circuit (not shown) coupled to the controller 311. Each indicator is capable of emitting a green or 'go' signal and a red or 'stop' signal. When a next lite should be placed on one of the two conveyors 304, 305 feeding the washer, a green indicator is illuminated over a particular one of the two conveyors 304, 305.

After washing, lites that entered the washer 320 on the conveyor 304, 305 are moved away from the washer by means of two conveyors 322, 324 having rollers. Lites moving on the conveyor 322 are manually brought into registration with and attached to a spacer frame at an assembly station 332. The assembly station includes two tables 326, 327 having non-driven rollers that allow the user to slide the lites to a desired position and orientation. The combination of lite and spacer frame is then moved away from the assembly station 332 (lite facing down) on generally flat conveyors C5, C6. At the assembly station 332 a video monitor 338 prompts the users at the station 332 (typically two people). It is important that the users at the station 332 follow instructions displayed on the monitor 338 since the monitor indicates specific information for each combination of lite and spacer frame assembled at the station 332. As an example, the monitor will indicate if the user is to add a muntin grid to the spacer frame in addition to attaching the spacer frame to the lite. Spacer frames built in accordance with U.S. Pat. Nos. 5,678,377 and 5,313,761 to Leopold and assigned to the assignee of the present application have a connecting tab at one corner. These two patents are incorporated herein by reference in their entireties. In the illustrated embodiment, this corner tab must be oriented in a specific way as the lite and spacer frame are pressed together. As an example, the glass lite coming from the washer 320 is laid on a table and the frame placed on top of the lite with the tab on the lower right corner as seen from the position of the washer. It is important that the assembled window made from the IGU has the tab at the top portion of the window and also important that for triple pane windows, the tabs on the two spacers are in the same location when mated together at the downstream butterfly table.

Figure 36:
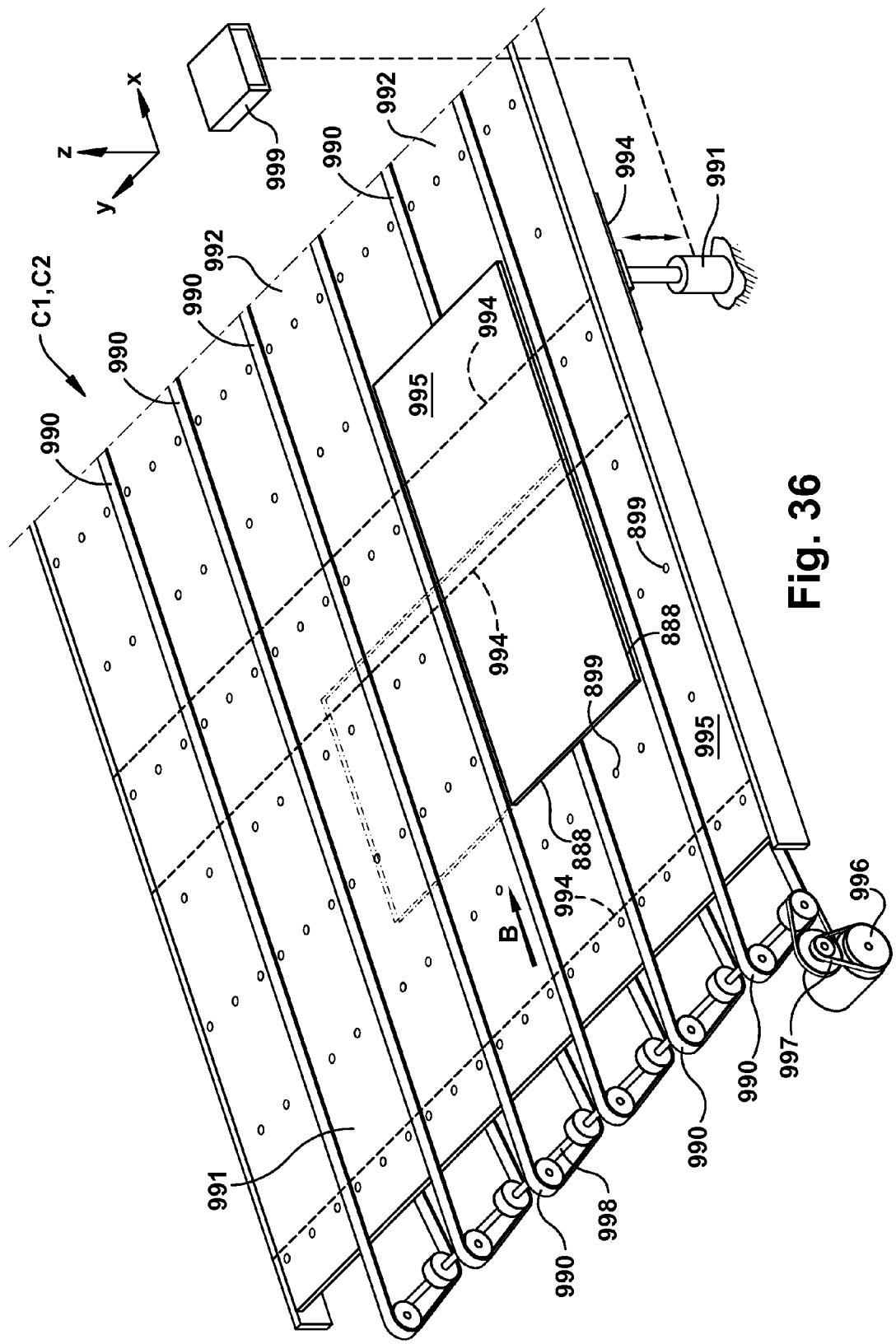
FIG. 36 illustrates air lift conveyors C1 and C2 with a belt transfer system in accordance with one example embodiment of the present disclosure.

Lites placed on the conveyor 305 on the input side of the washer 320 leave the washer on the conveyor 324. If the lite is less in size than one-half the width of a washer opening, the lite continues automatically without user intervention directly from the conveyor 324 to air lift/belt conveyors C1 and C2 (at a uniform speed to avoid scuffing) onto belt drives 990 extending from first and second ends 992, 993 of the conveyors. As seen in FIG. 36, selectively actuatable lift cylinders 991 are connected to support rails 994 that raise a plurality of air lift arrangements 995 above the surface and between the belt drives 990. The belts operate to move the lites in the direction of the x-axis, as illustrated in FIGS. 14 and 36.

The belt drives 990 are coupled to a motor 996 through gear chain 997 and axle 998, turning the belt drives in harmony with each other in direction of arrow B. If the lite is greater in size than one-half the width of the washer 320 opening, a user manually transfers a lite exiting the left side of the washer centerline using the air lift arrangements 995. The operator utilizes the air lift arrangements 995 by raising the arrangements via lift cylinders 991 above the belts 990 by actuating a switch 999 coupled to the cylinders. In one example embodiment, a sensor detects a large lit (>½ the washer width) and automatically lifts the air lift arrangement. The switch 999 is a foot petal coupled to pneumatic cylinders 991 which the operator uses to also lower the air lift arrangement after the lite is shifted.

With the air lift arrangements 995 located above the belt drives 990, the operator manually rotates the lite by its edge surfaces through ninety degrees, skirting or floating the lite along an air curtain above the conveyors C1 and C2. Operators touch only edges 888 of the lite as it is rotated from position 1 (shown in phantom) to position 2 (shown in solid) on air lift arrangements 995, as illustrated in FIG. 36. The air lift arrangements 995 include a plurality of air apertures 899 that allow for the flow of air for the rotational floating of the lite. The air passing through the air apertures 899 is provided from an air supply line or common manifold (not shown) of 80-100 psi.

The two in line conveyors C1, C2 move lites in a direction toward a first registration or lift station 350 that includes two conveyors C3, C4. As explained in more detail below, the conveyors C3, C4 include belts that are movable with respect to a plane at which the lites enter the first registration station 350 and more particularly the belts drop down under the command of the PLC controller 311 (FIG. 16) at certain phases of the registration process performed at the station 350.

The alternate embodiment shown in FIG. 14 is capable of processing two double pane IGUs at once and to accomplish this performance enhancement, separate lites (and attached spacer frames) are supported on conveyor pairs along the assembly line 300.

When a triple pane IGU is assembled (see FIG. 4), one preferred sequence dictates that a first glass lite 112 is placed on the conveyor 304, passes through the washer and moves along a flat surface of the conveyor 322 to the assembly station 332 where it is mated with a spacer frame 113. A second lite 120 is placed on the conveyor 305, moves through the washer and exits along the conveyor 340 and into the registration station 350. This second lite 120 is to be a middle lite of the triple pane IGU and is caused to hover over a generally flat surface of the registration station 350 and then corner registered as described below. This allows the first lite 112 and its associated spacer frame 113 to be side shifted away from two conveyors C5, C6 for registration beneath the hovering glass lite. The middle, hovering lite 120 is then lowered into contact with the spacer frame to which the first glass lite is attached.

In an alternative example embodiment, the contact with the spacer frame 113 includes contact with a sealant or adhesive located on the spacer frame as would be appreciated by one of ordinary skill in the art. As seen in FIG. 14, lites from the washer 320 follow either a left side path or a right side path as seen from the position of the washer.

The assembly line 300 is controlled by a dedicated PLC controller 311 and a personal computer 310 running a Windows 7 operating system. A preferred PLC is commercially available as part number X20CP1485 manufactured by B&R Automation. The computer 310 executes a human/machine interface (HMI) application program that accepts schedules produced by business logic software licensed by the assignee of the present disclosure, GED Integrated Solutions, Inc. and is designated WinIG 5. An electrical block diagram of the PC 310 and PLC 311 is depicted in FIG. 16. Other GED licensed software produces glass lites, spacer frames and muntin grids for assembling a Triple or a Dual pane IG unit. The business logic software has two modes of operation. These modes regulate the flow of data for sequencing and the mating of glass lites with spacer frames.

Schedule Driven Mode

A schedule driven mode for controlling the assembly line 300 utilizes WinIG 5 schedule data as the primary control element for co-coordinating movement of product through the assembly line 300. The schedule driven mode uses glass data derived from selecting a WinIG Batch from a WinIG schedule. The glass "lite" data is then retrieved from the selected batch in the sequence specified by the batch. This mode assumes that the glass "Lite" sequence, (the sequence of the lites in the glass cart 308) is the same sequence that the spacers are produced.

The HMI software (running on the PC 310) prompts the user on the monitor 306 to load the washer queue based on the batch derived glass lite information from a selected glass batch (cart). This typically results in washer loading of lites in consecutive cart locations starting from the beginning of the cart and going to the end of the cart. The actual IG Unit lite ID (Slot ID) is displayed on the monitors 306, 338 depicting proper load sequence for the washer (left washer side, then right washer side, or right, then left etc.) and at the assembly station frame orientation, muntin grid, if present and grid configuration. The washer loading sequence on the display monitor 306 is derived from the IG Unit's layering configuration. Items like glass type, muntin properties (two tone, non symmetric grids), glass size, assembly tab orientation, and gas filling are taken into account when determining which lite of an IG Unit is sent to the operators at the assembly station 332. Spacers are assumed to be produced and loaded on the overhead "J" hook conveyor in the same sequence as specified in the selected WinIG Batch. Spacers are identified on the overhead "J" hook conveyor by a "label or identifier" that is either directly printed on the spacer or on a label attached to the spacer that contains the WinIG Schedule ID and Unit ID number or a unique tracking identifier. The label/identifiers are used for validation by the operator at the station 332 of a correct correspondence between a spacer taken from the overhead conveyor with a correct glass lite that exits the washer 320. In a region of the assembly line 300, there are reserved areas (not shown) where glass and spacers can be off loaded when the need arises to remove a glass lite or spacer frame because of breakage, or bad/missing components in the sequence.

Intercept Spacer Driven Mode

A second mode uses the spacer frame sequence, as generated by other software to dictate the assembly line order or sequence of operation. Each spacer is processed at an upstream location where spacer frames are manufactured by roll forming metal strips into a spacer frame. Typically this manufacture is controlled by a user operated switch. The production sequence of spacers (at the up stream location) determines the glass lite sequence that the washer operator must load. When in this mode, the assembly line business application software is linked to a spacer frame manufacturing computer. When the spacer frame machine (one such machine is disclosed in U.S. Pat. No. 7,610,681 to Calcei et al, assigned to the assignee of the present application and incorporated herein by reference) produces a spacer, that spacer information is sent to the assembly line business logic software executing on the computer 310. The assembly line business logic software uses the spacer information and looks up the IG Unit (IGU) information. The washer queue and washer display (on the monitor 306) are then updated with the proper lites based upon the spacer production sequence as dictated by the spacer frame manufacturing machine. As in the schedule driven mode, there are reserved areas around the assembly Line 300 where glass lites and spacer frame can be off loaded when the need arises to remove the glass or spacer because of breakage, bad/missing or out of sequence components.

PLC Data Structures:

Data structures of the PLC 311 control operation of the various conveyors of the assembly line. The business logic software of the computer 310 reads these structures as the IG Unit or IG Lite is processed through the assembly line. The data within the PLC registers is normally populated by the PLC itself but can also, when needed, be populated by the computer 310.

Viewing Monitors:

There are four monitors used to display status to different operator stations within the assembly line. These monitors depict information associated with the Washer, IG Assembly, the Oven, and overall Queue Management. Three of the monitors are touch screen sensitive and are configured to allow operator control (Washer, IG Assembly, and Oven). The fourth display is "View Only" and displays the overall flow of the IG units through the system (Queue Management). Microsoft Windows 7 allows each monitor to be defined and configured to display a specific area of the Microsoft Desktop. The default monitor definition is as follows. Washer Operation is displayed on Monitor 1, IG Assembly Operation is displayed on Monitor 2, Oven Operation is displayed on Monitor 3, and Queue Management is displayed on Monitor 4. Monitors 1 and 2 correspond to the two monitors 306, 338 of FIG. 14.

Washer Setup

The business model software running on the computer 310 uses information about the washer to notify the washer operator if a lite is too big or if it should be loaded as a single lite. Business logic implemented by the HMI software examines the IG unit layering information and determines which side of the washer to load a given lite. For cases where the IG Units shortest dimension is greater than ½ the washer's width (The exemplary washer has an entrance width of 96 inches), then the lite needs to be processed as a single. The Washer monitor 306 shows the operator which lites to load, what side of the washer to use, and the sequence that the lites should be loaded. The washer also incorporates two lamps 312, 314 positioned on the right and left entry sides of the washer. These lamps indicate to the operator which side of the washer the lite should be loaded on. A "Green" light indicates the load side. A "Red" light indicates that a lite has been loaded on the wrong side of the washer 320. Glass lites that are greater than ½ the washers width are depicted as "single lite loads", the load side indicator lamps will show the operator which washer side to load these lites. The washer 320 does not sense what lite the operator actually loads, so it's important that the operator follows the sequence dictated on the monitor and follow the washer load lamps to load the lite on a correct side of the washer.

Figure 33:
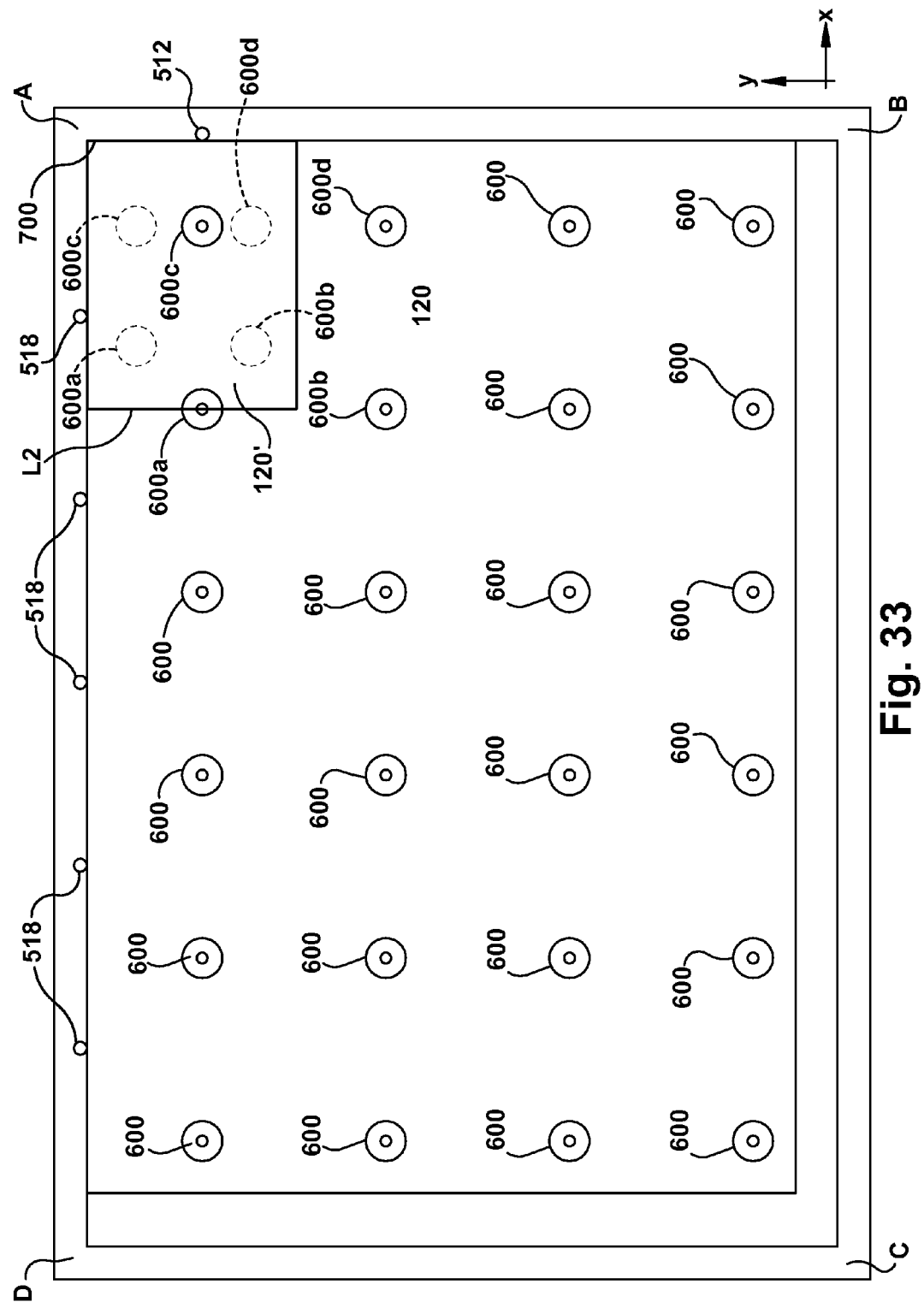

Washer Configuration:

A washer configuration screen 650, FIG. 33, allows the following parameters to be set at the touch screen monitor 306:

Washer Width (inch)—User enters a width of the washer

Minimum Length (inch)—User enters the smallest length of a lite that can be consistently transferred through the washer.

Minimum Width (inch)—User enters the smallest width of a lite that can be consistently transferred through the washer.

Maximum Length (inch)—User enters the largest length of a lite that can be transferred through the washer.

Maximum Width (inch)—User enters the largest width of a lite that can be transferred through the washer.

For enhanced visibility a different background color is assigned to each IG Unit and the lites that make up that unit. Additionally, a "Remake" color and a "Bypass Color" are also defined. The sequence colors repeat every sixth unit. To change a color during setup, a user touches a color icon and a color selector launches so that a new color can be selected.

Remake Color—Defines the background color when displaying "Remakes" units and lites.

Bypass Color—Defines the background color when displaying "Bypass or Remove" units and lites.

Sequence 1 Color—Defines the background color for "Sequence 1".

Sequence 2 Color—Defines the background color for "Sequence 2".

Sequence 3 Color—Defines the background color for "Sequence 3".

Sequence 4 Color—Defines the background color for "Sequence 4".

Sequence 5 Color—Defines the background color for "Sequence 5".

Sequence 6 Color—Defines the background color for "Sequence 6".

Middle Lite Topping

Figure 35:
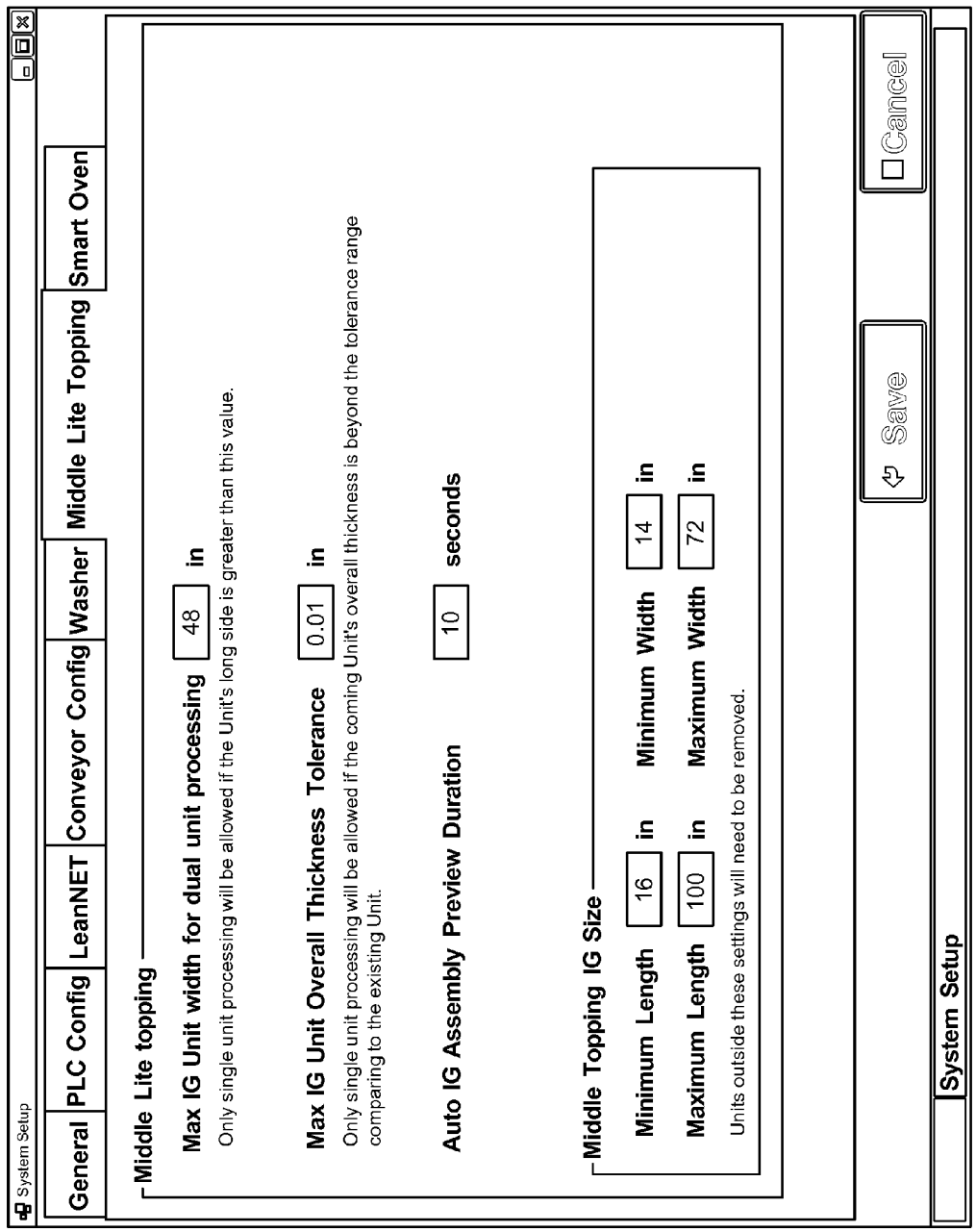
FIG. 35 is a set up screen for inputting parameters relating to a butterfly table.

A middle lite topping screen 660, FIG. 35 allows the user to set size constraints for operation of the butterfly table 380. The parameters on this screen are as follows:

Max IG Unit width for dual unit processing (inch)—This field sets the maximum width an IG unit can be for dual (pair) IG Unit processing in the "Butterfly" table 380. IG Units that have a width greater than this value will be processed as single units through the "Butterfly" station.

Max IG Unit Overall Thickness Tolerance (inch)—This field sets the width tolerance for processing IG Units as duals (pairs) through the "Butterfly" station. IG Unit pairs whose thicknesses differ by more than this tolerance band will be processed as single units through the "Butterfly" station.

Auto IG Assembly Preview Duration (sec)—This field sets the time duration that a zoom dialog (FIG. 17) is displayed on the monitor 338 at the assembly station.

Middle Topping IG Size: Minimum and Maximum IG Unit size settings for center lite topping and butterfly operation. IG units that have dimensions outside the following range setting will be mark for "Bypass" operation.

Minimum Length (inch)—Set the minimum length an IG unit can be for butterfly operation.

Minimum Width (inch)—Sets the minimum width and IG unit can be for butterfly operation.

Maximum Length (inch)—Sets the maximum length and IG unit can be for butterfly operation.

Maximum Width (inch)—Sets the maximum width and IG can be for butterfly operation.

Process Flow

As an illustrative example, an operator at the "IG Assembly" station 332 selects a WinIG Batch that is to be processed. This operation can also be changed to allow a different station operator such as a "Washer" operator to perform these steps. A Schedule Selection screen (not shown) provides a number of ways of selecting a proper schedule of IGUs for processing through the assembly line. Schedule selection is presently accomplished by:

Search: This option allows an operator to type in or scan in a schedule description or a customer specific tracking number. Upon pressing an enter key, the computer 310 searches through all the imported schedules in its database and finds the schedule or schedules that match the search string.

Pressing the "Reset" button clears the search string field and lists all schedules.

By entering the letter "w", for example, the computer 310 displays all schedules with the letter "w" in their description. A search string of "ab" will return all schedules that have consecutive letters of "ab" in their description. This search is a "mid string" search.

Schedule List: Four options help the operator efficiently populate the schedule list (All, Not Started, Finished, and Partially Completed)

"All"—Shows all the schedules in a folder along with their status indicator

"Not Started"—These schedules have not been processed.

"Partially Complete"—These schedules have some of their IG units completed but not all of them.

"Finished"—These schedules have had all of their units completed.

The user can refresh a list, select a highlighted schedule from the "Schedule List" area, to launch a "Batch/Unit" selection dialog or cancel the Schedule Selection process. "Batch/Unit" Start point selection. A beginning point within a schedule can be selected by either specifying a "Starting Batch" number or by specifying the "Starting Unit" number. An operator can enter a Start Batch Number or Start Unit Number, or they may use a "Prey"/"Next" option to increment these items. Other Filtering options allow the operator to select "Load unprocessed units only" or "Load All Units". A Reset option allows the operator to reset the Start Batch and Start Unit field back to 1. A Cancel option closes the Schedule and Batch Selection process. An OK option retrieves a selected schedule and staring point and returns this information to the monitor.

Washer Station:

The Washer station monitor 306 indicates (FIG. 17, 31) to the operator what lites to load and how to orient them for entry into the washer. The monitor identifies to the operator the proper lite orientation, size, glass description and glass cart slot location. All lites loaded into the washer must be loaded with the short side first. There is a short side indicator "<" 701 on each lite depicted on the monitor 306. The monitor displays the IG Slot "Lite" information from the IG Batch. A "Lite Load" indicator (Hand pointer 702) specifies which lite to load and which washer side to use. The operator at the washer has two ways of validating the lite load.

He or she can touch the screen monitor to launch a selection dialog 704 (FIG. 17) and the operator selects a "Load Glass" option 706 to validate and trigger the graphical movement of the lite from a "Virtual Washer Staging Queue" into a washer queue, this action also transfers data to the "Washer" PLC data structure of the PLC 311 from the computer 310.

A second option available to the operation is to actuate "Left and Right" foot switches (not shown) at the entry of the washer that communicate a signal to the PLC. The operator presses a foot switch that corresponds to the washer load indicator (flashing Hand Icon) to validate the "Lite" load process.

A PLC "Washer" data structure is loaded with the necessary information for the washer PLC operation when the operator uses one of the two above methods to validate a lite load. The "Virtual Washer Staging Queue" is populated by the computer's business logic. Depending upon which mode of operation is selected the Virtual Washer Queue is loaded based upon the IG Unit sequence and the IG layer configuration. Items like glass type, muntin configuration determine if an inner lite or outer lite will be sent to the assembly station 332 for a given double pane IGU.

Washer Lite Loading

Loading of the washer 320 is linked with the IG Assembly station 332. A "Virtual Washer Queue" is maintained by the computer 310 and contains all the lites for an IG Batch. The Virtual Washer Queue has a visual portion 708 (FIG. 31) that is displayed on the "Washer" display monitor 306. The visual portion of the washer virtual queue (FIG. 31) is made up of 6 lite cells, 3 lites for the left virtual washer queue, and 3 lites for the right virtual washer queue. The visual portion (FIG. 31) of the Virtual Washer Queue displays the upcoming 6 lites of the IG Batch (3 dual IG units, or 2 triple IG units).

Figure 31:
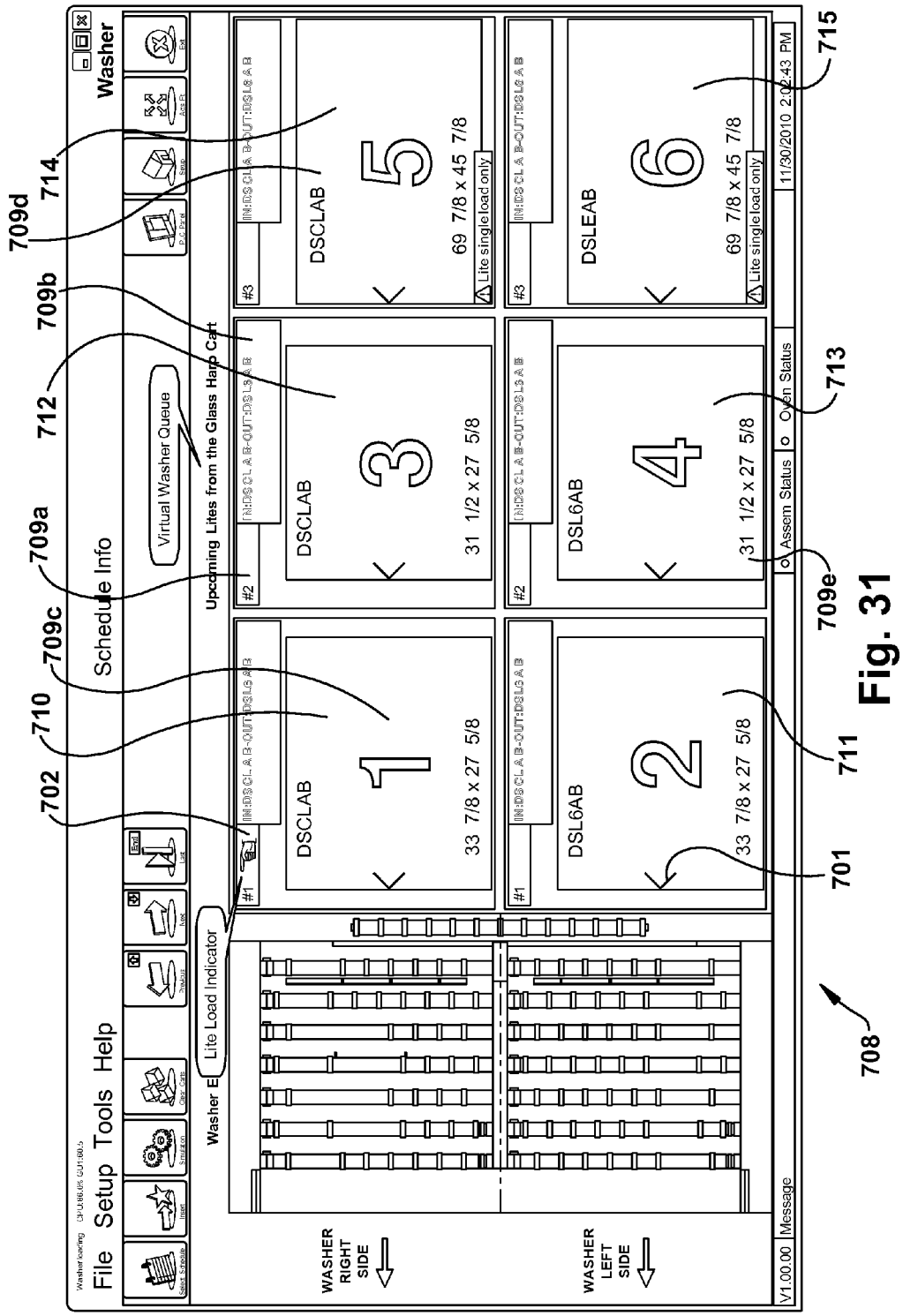
FIG. 31 is a schematic depiction of a virtual washer queue that is presented on a viewing monitor near a washer input.

Referring to FIG. 31, the following information about a lite is depicted on the viewing monitor for lites currently part of the visual portion 708 of the virtual washer queue. In the upper left portion of the display for a given lite, the monitor displays an indication 709a of the lite's batch unit. On the upper right is an alphanumeric descriptor 709b of that unit. In the center of the lite is a cart position indicator 709c telling the operator where in the then current cart that lite is located. Immediately above the cart position is a designator 709d indicating the type of glass. Immediately below the cart position is an indication 709e for the width and height dimension of the glass as listed on the schedule. Finally a short side indicator 701 indicates the short side of the glass lite that is to be placed first into the washer.

The "Virtual Washer Queue" 708 is loaded by the washer business logic software after a Schedule/Batch is selected, or by the spacer frame operator sequence depending upon which mode is in use. The PC 310, running a washer business logic checks the IG Unit layering configuration and size of the IG units. The washer business logic then populates the "Virtual Washer Queue" (both left and right sides) with the lites from the IG Units. The left and right sides of the "Virtual Washer Queue" are correctly populated with the proper lites for that IG unit based upon IG Unit Layering information. The inner or outers lites are not always placed on the same side of the Virtual Washer Queue. Lite placement is determined by the IG Units layer configuration properties such as glass type, glass width and height, spacer tab orientation etc. FIG. 31 depicts a typical queue after a WinIG schedule has been initially loaded (Starting at Unit 1). The first three units in the queue, having lites 710-715, from cart positions 1-6 are dual IGs.

Normally the glass lites are unloaded from the cart 308 in sequential ascending order (left to right), but this is not guaranteed for all triple configurations, because of the IG layering makeup. The following are some of the items that the business unit software takes into account when determining which lite to load through the washer:

Dual or Triple IG
  Is the width greater than the height?
  Does the IG Unit contain non-symmetrical muntin grid components?
  Does the IG Unit contain two tone muntins and what lite surface does the muntin face?
  Low emissions surface coating on the lite.

As noted, the screen depicted in FIG. 31 represents three dual pane IGUs. The two lites that make up a given IG Unit are represented (one above the other) in a different background color for easy visual separation. A lite load indicator will flash (Hand icon 702 with index finger) indicating to the operator that this is the next lite to be loaded into the washer. Single load lites incorporate a process alert icon (yellow triangle with exclamation mark) with a message "Lite single load only" attached to the lite image.

The presently implemented business logic software has Lite Loading Rules Summarized below. When Assembly Tab is configured as "Height First".

For Dual IG Units who's width>height:
    The outer lite is loaded on the left side of the washer.
    The inner lite is loaded on the right side of the washer.
  For Dual IG Units who's width<height:
    The inner lite is loaded on the left side of the washer.
    The outer lite is loaded on the right side of the washer.
  For Triple IG Units who's width>height:
    The inner lite is loaded on the left side of the washer.
    The center lite is loaded on the right side of the washer.
    The outer lite is loaded on the left side of the washer.
    No lite is loaded on the right side of the washer.
  For Triple IG Units who's width<height:
    The outer lite is loaded on the left side of the washer.
    The center lite is loaded on the right side of the washer.
    The inner lite is loaded on the left side of the washer.
    No lite is loaded on the right side of the washer.

Lite Removal

The washer station software identifies lites that are too small or too large to be processed through the assembly line 300. These lites are cut at the cutting station and are loaded into the carts, but they need to be removed from the sequence and manually processed. The software determines the lite information from a database maintained by the PC 310 and checks setup information to determine if the lite meets the necessary standards to be processed through the assembly line.

Removing and Rejecting IG Units

When a lite is identified for removal or selected to be rejected, other lites associated with the IG Unit are marked with a removal or rejected status. These lites either need to remain in the glass cart 308 or physically be moved to transfer cart, whatever process is best suited for the user.

Figure 17:
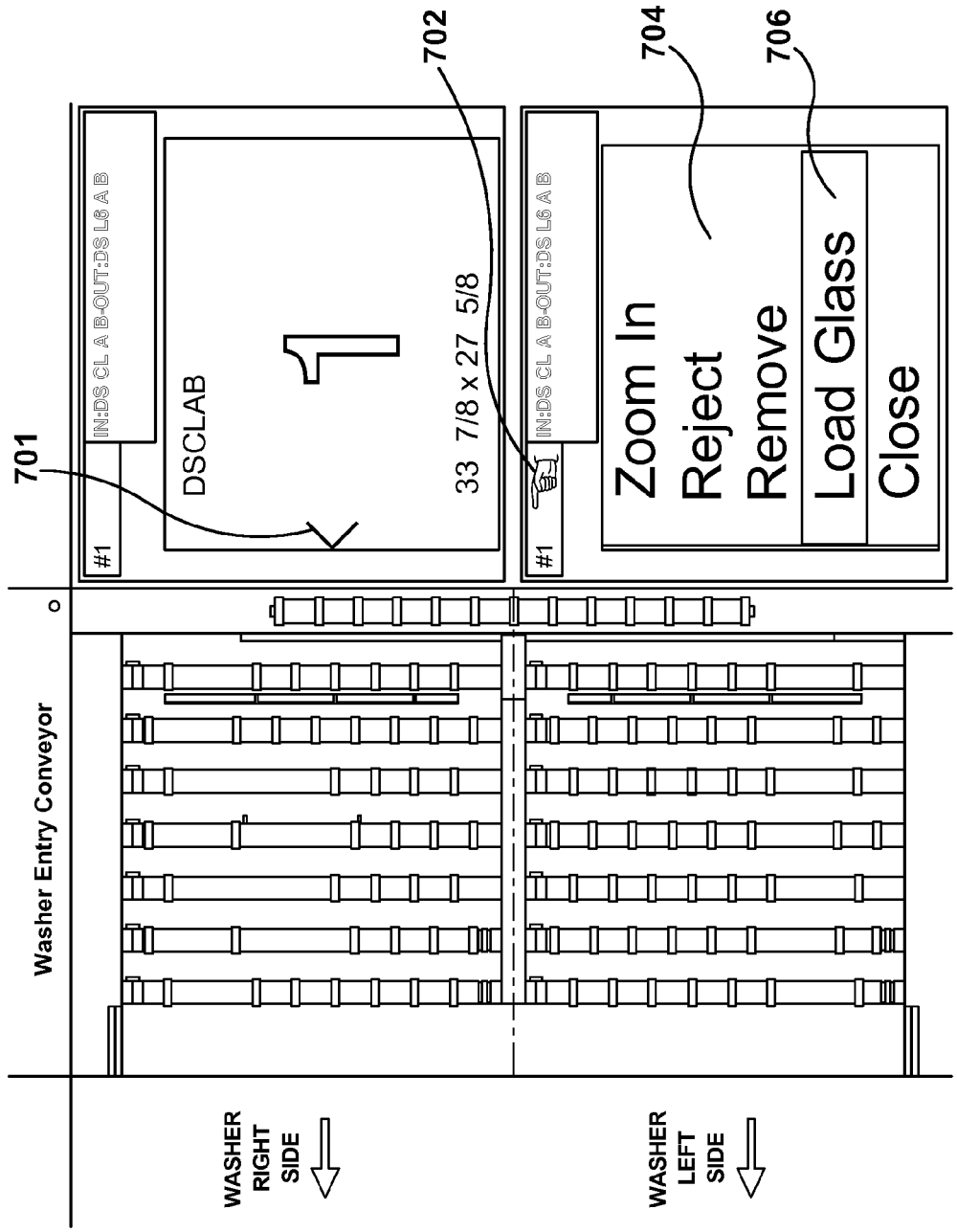
FIG. 17 is a depiction of a prompt screen at a washer input to the FIG. 14 assembly line.

Removing a lite is performed by touching the lite's depiction on the monitor, see FIG. 17 and selecting "Remove" from a dialog 704 that is displayed. The removed IG Unit is then added to the "Remove List".

Remove List:

A "Remove List" maintained by the PC 310 contains IG Units that have been removed from the production sequence because they are outside the limits of the Assembly Line 310. The IG Units listed in the "Remove List" are NOT available to be inserted back into the assembly sequence. To see the items in the "Remove List" and to perform operations on the items in the "Remove List" the user selects an option in a tools menu item on the monitor under tools designated "Remove Management".

The following is a list of operations that can be performed upon the "Remove List"
  Print a report of the items in the "Remove List"
  Print a label for each of the items in the "Remove List"
  Purge All or selected items from the "Remove List"

Rejecting a lite is also possible. The user touches a lite and then touches the "Reject" selection on the pop up dialog 704.

Reject List:

A Reject List contains IG Units that are defective in some manner, but meet the production specifications of the assembly line 300. IG Units listed in the "Reject List" are available to be inserted back into the assembly sequence.

The sequence position for an inserted unit will be the first valid position that is subsequent to the visible portion of the "Virtual Washer Queue". The visible portion of the Virtual Washer Queue contains a maximum of 6 lites and are managed by the type of IG Unit that is coming or has entered the visible portion of the Virtual Washer Queue (duals, triples, or single load duals).

To insert a rejected item back into the assembly sequence a user:
  Clicks on an "Insert" button on a main tool bar.
  Selects an IG Unit to be inserted, then clicks the "Insert" button.
  A barcode scanner can input the information To perform additional operations on the items in the "Reject List" a user selects a (Tools→Reject Management) option on the main menu.

The following options can then be performed by the operator.
  Print a report of the items in the "Reject List"
  Print a label for each of the items in the "Reject List"
  Purge All or selected items from the "Reject List"

Assembly (or Topping) Station 332

The assembly or topping station 332 is where operators bring together the IG lite coming from the washer and the spacer frame. The joining of an IG lite and spacer frame creates an "IG Layer". A standard dual glazed unit consists of one layer and one additional lite (glass, spacer, and glass); a triple glazed unit consists of two layers and one additional lite (glass, spacer, glass, spacer, and glass).

The viewing monitor 338 at the assembly station visually guides (FIG. 29) the operators in how to assemble IG Unit layers. IG Unit layers are made up using a glass component (lite), and a spacer component. The spacer component may have an additional grid component. The "Butterfly" station performs the final assembly of the IG layers into an IG Unit.

Business logic determines if a pair of IG Units can be processed together or if the IG Unit has to be processed as a single because of size constraints. Processing IG Units in pairs is a preferred way; however there are some conditions where an IG Unit must be processed through the assembly line 300 as a single IG Unit. The following rules govern when IG Units will be processed as a singles.

All IG Units that are triple pane are processed as singles.
  If the IG Unit sequence alternates between triple and dual pane units then these units are processed as singles.
  If one or both of two consecutive dual pane units exceeds the pairing size parameters (width and height) then these units are processed as singles.

Figure 34:
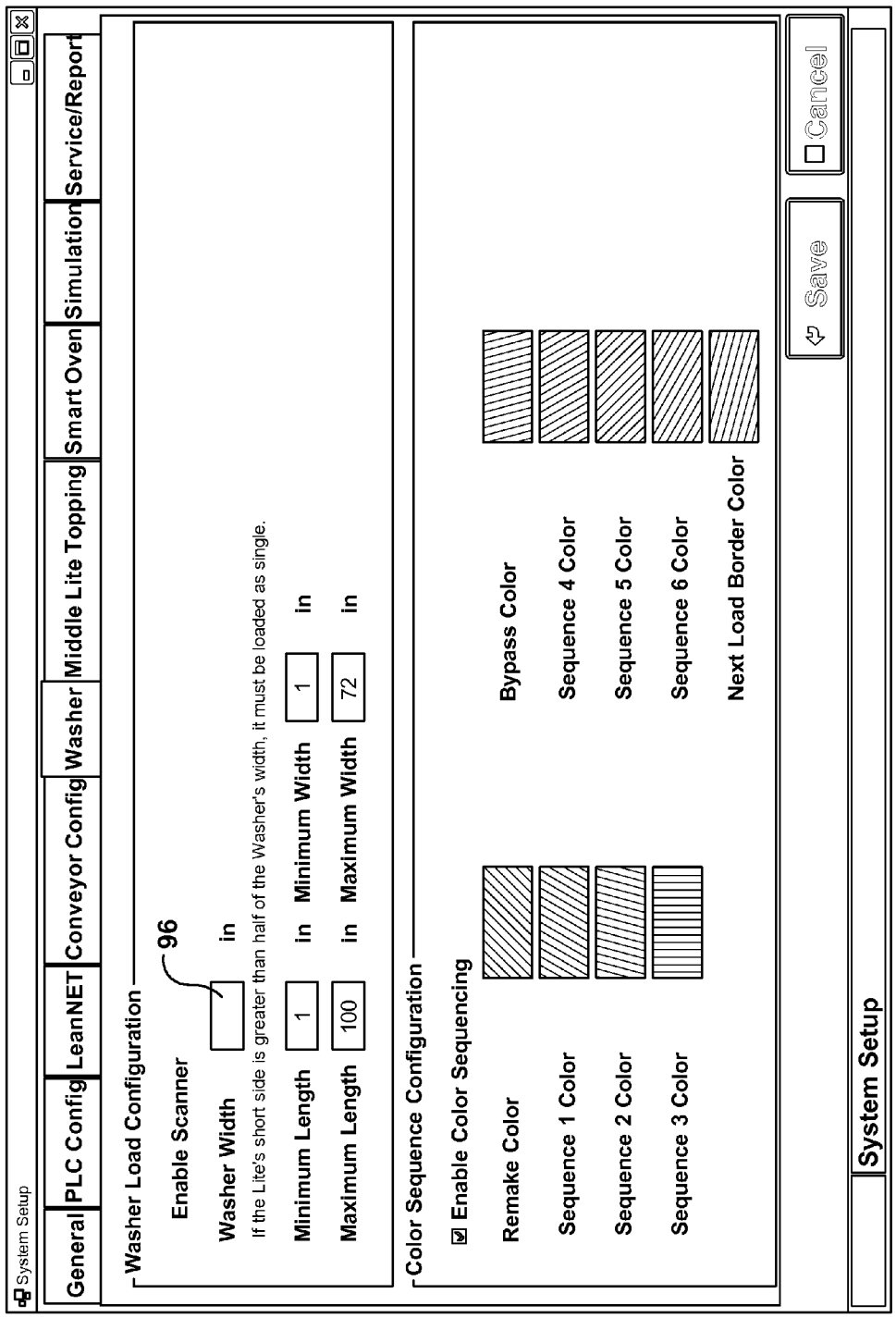
FIG. 34 is a set up screen for inputting parameters relating to a washer.

When the two IG units that are to be paired together have different overall thickness (the difference must be greater than a thickness tolerance setting, FIG. 34) then these units will be processed as singles.

The monitor screens depicted in FIGS. 31 and 15A-15F shows processing of two consecutive dual pane glazed IG Units (Glass, spacer, and Glass) that are assembled two at a time at the butterfly table station 380. FIGS. 15A-15F depict a sequence of glass lite and spacer frame positions. In a region of the assembly station 332 tables 326, 327 include skate rollers to position lites for spacer assembly. The operator manually positions the lites that comes from the washer to a position on the tables 326, 327 where they then place the spacer onto the lite. As described below, the lift station 350 includes 2 independent powered conveyors and is controlled by the PLC 311. This station 350 can process non spacer lites of a dual pane IGU received from the conveyors C1, C2 and it can also processes the center, or middle lite of triples received from the conveyors C1, C2. Downstream from the assembly station 332 are located 2 independent powered conveyors C5, C6 that are also controlled by the PLC 311. When an operator at the Spacer Topping station 332 has placed a spacer on its associated lite the operator manually skates that lite/spacer combination (layer) and the conveyor moves it away until it covers over a photo key or sensor S7 or S8. The powered conveyors C5, C6 are activated and position the lite onto one of the two conveyors C5, C6 based on outputs from the sensor S7, S8.

The registration station 350 also has 2 independent powered conveyors C3, C4 that are controlled by the PLC 311. This station 350 accepts lites from the conveyors C1, C2 and positions these lite(s) onto the conveyors C3, C4 in the station 350. The conveyors C3, C4, C5, C6 are also termed the "Butterfly" staging conveyors, because IG layers that are on these conveyors move lites or layers into the downstream "butterfly" station 380 for IG assembly.

Tandem Dual Pane IGUs

FIGS. 15 A-F depict staging of two consecutive IGUs for entry into the Butterfly Table station 380. In FIG. 15A, an operator has moved a single lite 710 from the washer as it exits on the conveyor 324 and placed it onto the conveyor C1. The lite 710 then moves to the conveyor C2. In FIG. 15B, a second lite 711 has exited the washer on the conveyor 322 and the operator(s) (typically two) place the spacer onto the lite at the assembly station 332. In FIG. 15C, a third lite 712 has exited the washer on the conveyor 324 and is placed by the operator onto the conveyor C1. Note, the lite 711 having a spacer frame already attached is moved beyond the conveyor C5 and properly located on the conveyor C6. In FIG. 15D the two lites 710, 712 are moved into the lift station. In FIG. 15E, a fourth lite 713 has exited the washer and the operator(s) place a second spacer in registration with this fourth lite 713. Finally, in FIG. 15F, all four lites and two spacer frames are aligned in configuration for movement into the butterfly station 380.

Processing of Triple Glazed IG Units:

FIGS. 15G-15 L schematically depict a typical triple pane sequence for the assembly line. In FIG. 15 G, an operator has moved a lite 714 originating in the tenth slot in a cart at the input the washer from the washer and has aligned it on the assembly table. As the operator moves the lite 714 off the washer exit conveyor 322, a photo eye or sensor S3 (one of a plurality of such sensors S1-S14 shown in FIG. 15A) causes a graphical image of this lite to be displayed at the monitor 338. The image will initially depict the lite in an enlarged, zoom mode. The duration of the zoom is based upon a setup parameter.

In FIG. 15H, a center Lite 715 from the eleventh slot of the cart 308 has been moved to the conveyor C2 and holds there until an upstream conveyor C4 at the registration station 350 is empty. The lite on the conveyor C2 cannot advance onto the conveyors C3, C4 until a previous IG (triple or double), still in process, is moved.

An operator(s) at the assembly station 332 retrieves the spacer/muntin grid combination for mating with the lite on the table from the overhead "J" hook conveyor. The operator(s) place the spacer/grid combination on the lite, with the spacer tab and muntin configuration positioned per a visual depiction (FIG. 29) on the monitor 338. This depiction indicates a connection tab position for a first of two triple layers is on the bottom right side of the IG unit, the muntin surface color wood grain is up and the muntin seams are on the right and top edges of the muntin. In this particular IG configuration where the width is less than the height, the spacer needs to be rotated 90 degrees and flipped to insure proper assembly of all the components (as how the IG Unit was ordered).

The first layer (lite 714 plus spacer) of a triple pane IGU will, at the registration station 350 go beneath the center lite 715, (120 in FIG. 4), as further described below in detail. When the operator at the assembly station 332 finishes placing the spacer/grid combination on the lite 714 and pushes the combination on to the conveyor C5. The conveyor C5 moves the lite and spacer combination to the conveyor C6 for transfer across the space between the conveyor C6 and the conveyor C4 at an appropriate time. This situation is depicted in FIG. 15I.

Figure 40:
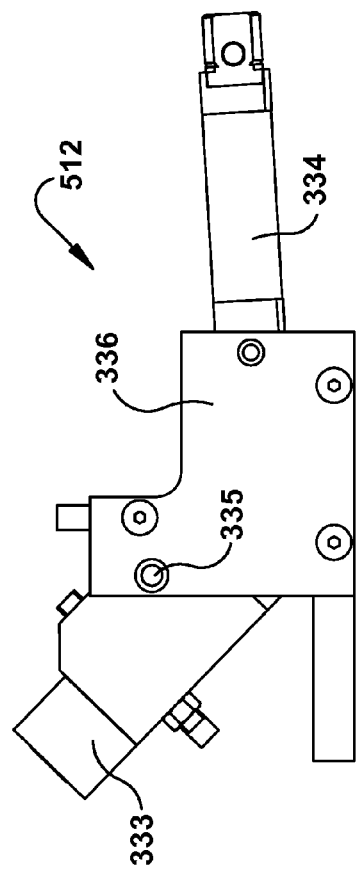
FIGS. 39-41 are pop up stops for positioning glass lites and assemblies moving on a conveyor.
Figure 41:
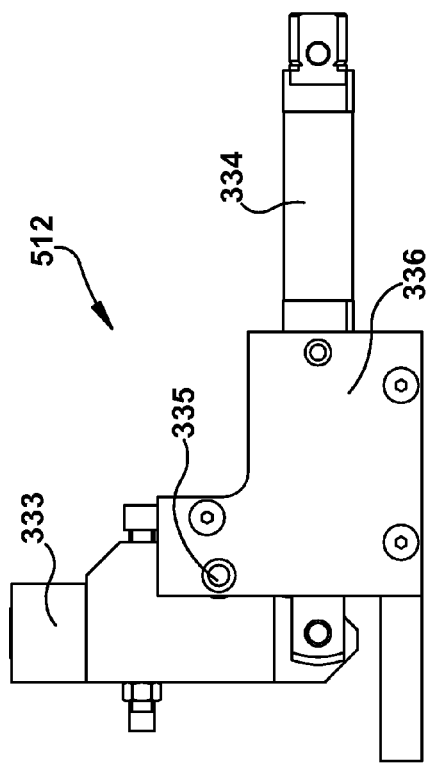
Figure 39:
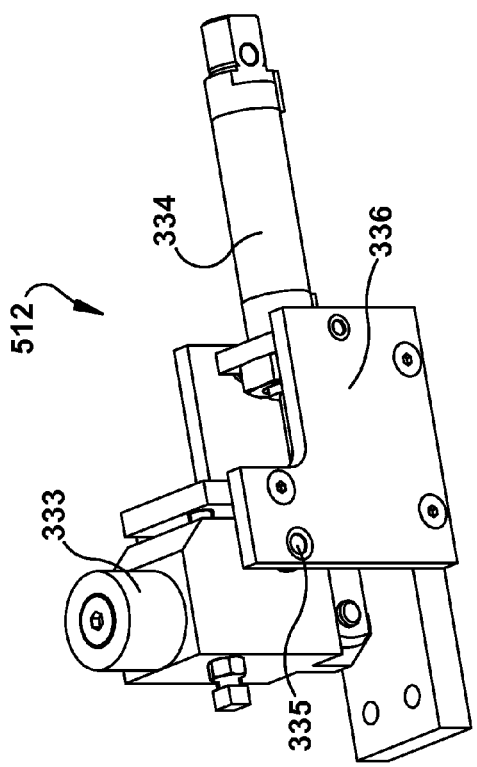

Once the registration station 350 is clear of previous IGU elements, the center lite 715 is moved into the registration station and positioned on the conveyor C4 in engagement with a one or more pop up stops 512. The conveyor C4 has several pop up stops. Multiple stops are needed to make sure a leading edge of the lite 715 stays square. As shown in FIG. 39, the stop 512 has a cylindrical roller 333 at the end of the conveyor C4 pivotally mounted to a support 336 and coupled to an actuator 334 operated by the PLC 311 for pivoting movement into and out of a path of travel of the lite about a pivot axis 335. (See FIGS. 39-41) This situation is depicted in FIG. 15J. The center lite is raised and the combination of the outer lite and spacer of the triple will be transferred into position beneath the center lite as shown in FIG. 15K. The center lite 715 will be lowered onto the lite/spacer combination. This process completes the first layering of a triple.

As the lites are registered at the station 350 a third lite 716 (from the twelfth slot in the cart) for the triple moves from the washer and is placed onto the tables for registration with a second spacer. As in the instance of the first spacer now positioned between and attached to the first two lites, the monitor 338 prompts the operator(s) regarding proper placement of the spacer with respect to the third lite. In FIG. 15L, the layer constituting the first two lites is positioned on the conveyor C4 and the combination of the third lite 716 and the second spacer (a second layer) are positioned on the conveyor C6. The operator is prompted and in response actuates a switch causing the PLC to actuate conveyors C4, C6 and these layers move together into the butterfly table 380.

Figure 29:
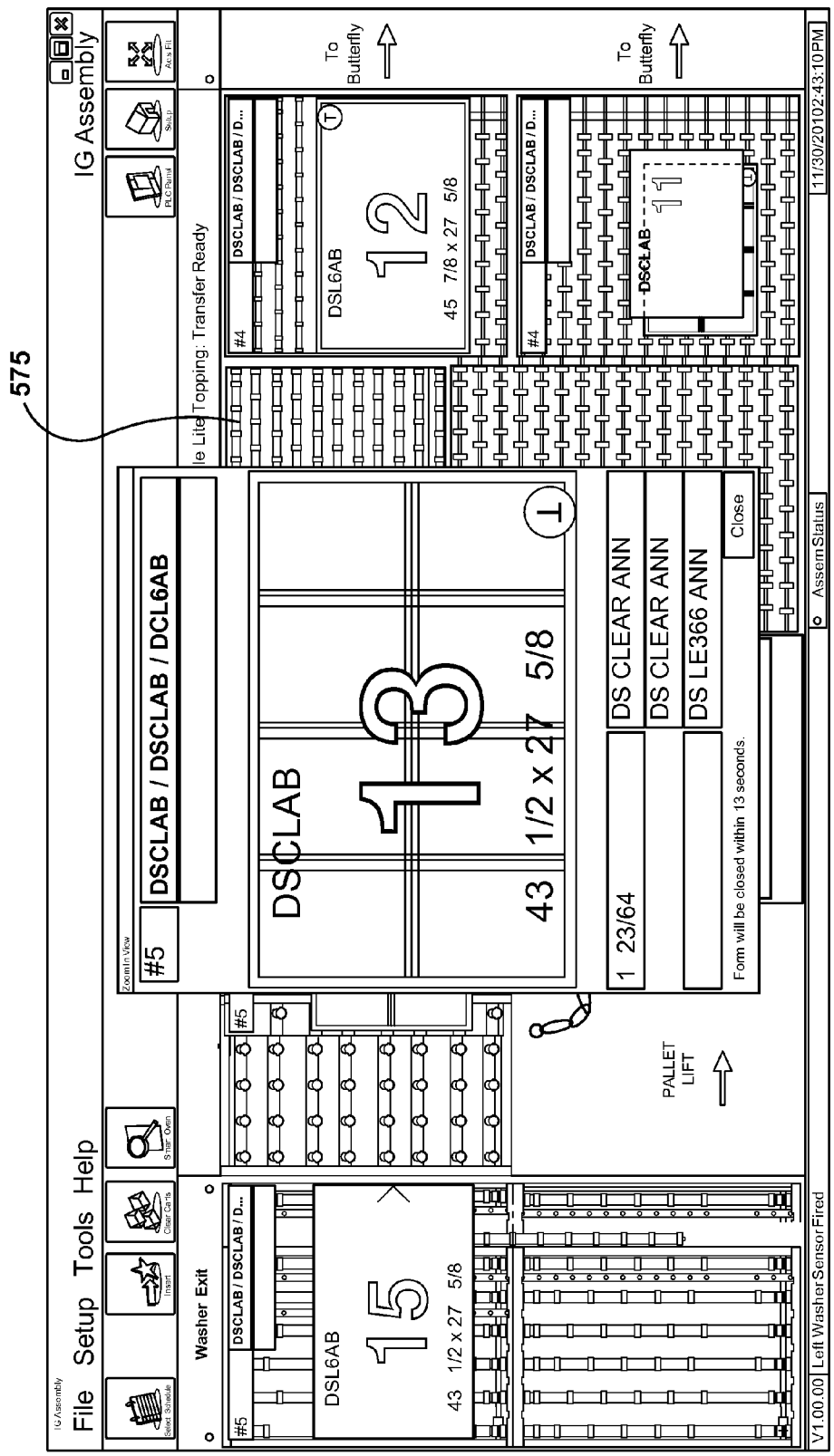
FIG. 29 is a depiction a viewing monitor at an assembly station.
Figure 30:
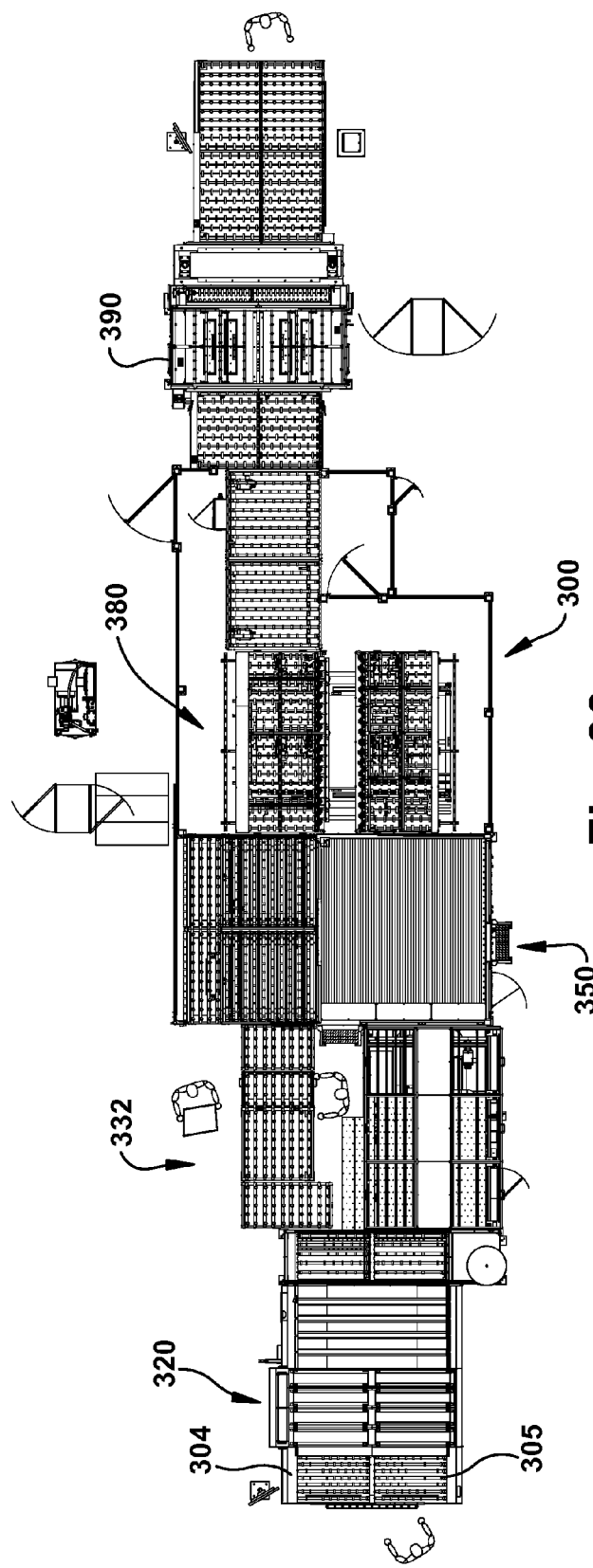
FIG. 30 is a schematic depiction of an alternate assembly line similar to the assembly line depicted in FIG. 14.

The prompt screen shown in the depiction of FIG. 29 is an example depiction of a monitor display that helps a user orient and assemble a layer that contains a lite from a next or thirteenth slot of a cart near the washer. Lites from slots 10, 11 and 12 of IG Unit 4 (the triple waiting for movement to the butterfly table) are also depicted on the monitor. The Spacer Tab orientation of the lite from the thirteenth slot is in the bottom right. This lite will be side shifted beneath a middle lite (from slot 14) so that when the butterfly table raises the first layer (containing lites from slot 13 and 14) on its edge the Spacer Assembly Tab will be correctly aligned with the second layer of the triple (unit #5 lite from slot 15). The finished second layer for unit #5, taken from slot 15 will have its spacer assembly tab located in the top right corner as seen for the lite from slot 12 that makes up unit #4 that is shown in the depiction of FIG. 29.

As the operator moves a lite/spacer combination onto the conveyor C5, the lite/spacer combination covers a photo sensor S6 on the right side of the conveyor C5 which causes a depiction on the monitor to change. The conveyor C5 carries lites over a second sensor S7 that allows the conveyors C5, C6 to properly stage the lite/spacer combination, in line with the previously staged outer lite in the x direction. Note, the lite from the thirteenth slot is depicted as requiring a grid or muntin and the prompt also depicts proper installation of this grid. PLC "Topping" Data structure is periodically updated using triggering sensors S1-S14 located along the conveyor system along with HMI business logic that responds to those sensors.

Queue" Monitoring and Updating.

The assembly Line 300 PC implements a queue monitoring and updating dialog. This graphical dialog allows the operator to visually view and alter the contents of each IGU of the assembly line queue. Currently only "Removal" of an IG Unit is supported. The operator clicks on the area of interest. A grid table is populated with the IG Unit information that is in that queue. The operator can then perform an updating function on the items in the queue.

Butterfly Table 380

The first and second lites 112, 120 of a triple pane IGU, as well as a spacer frame 113 sandwiched between the first and second lites form a first layer 384. (See FIG. 4). The two lites and spacer frame combination forming the first layer 384 are moved away from the registration lift station 350 by the conveyors C3, C4 to a downstream workstation that includes a butterfly table 380. The butterfly table 380 is shown in FIGS. 14 and 23.

A second spacer frame 144 of the triple pane IGU (which may or may not include a muntin grid) and third glass lite 150 attached to the second spacer frame collectively form a second layer 382 (FIG. 4). The second layer 382 is conveyed on conveyors C5, C6 to the downstream butterfly table 380. The butterfly table 380 includes four conveyors C7, C8, C9, C10 (see FIGS. 14 and 23). These conveyors C7-C10 (rotatable about the longitudinal or x direction) while in a first, horizontal position, advance first and second layers, 382 and 384, in the direct of Arrows A, as shown in FIG. 14 from conveyors C3-C6. The advancement of the layers 382, 384 is achieved by mechanical belt drives when on the conveyors C3-C6 and by rollers coupled to a drive 400 (FIG. 23) on the butterfly table conveyors C7-C10.

As the layers 382 and 384 are advanced on the conveyors C7-C10 (in the horizontal position), a prescribed first registration stopping is defined by pop-up stops 402 that move upward from the conveyor in the z direction on both tables 404 and 406. The first registration stopping point defined by stops 402 are aligned in the x or longitudinal direction on both tables 404 and 406, allowing for precise corner alignment between layers when the tables 404 and 406 rotate to bring the two layers 382, 384 into engagement. In one example embodiment, the stops 402 are pneumatic cylinders with a urethane sleeve, which in the retracted position are below the wheels of the conveyor and when extended to the stop position, are above the conveyor.

Figure 23:
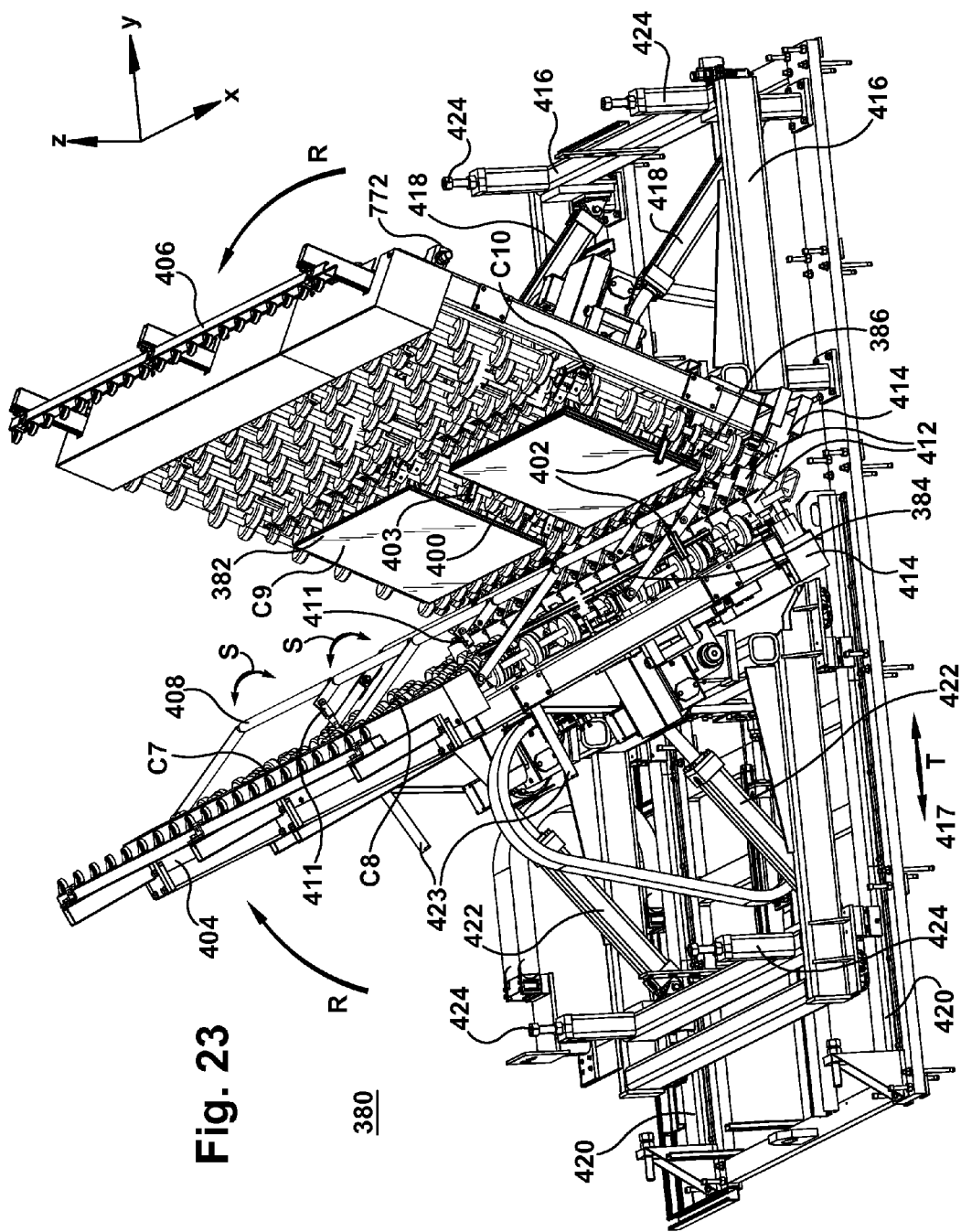
FIG. 23 illustrates a perspective view of a butterfly table constructed in accordance with another example embodiment of the present disclosure.

A second set of stops 403 are similarly positioned on both tables 404 and 406, but upstream from the first set of pop-up stops 402 as illustrated in FIG. 23. The second set of stops 403 allow the butterfly table 380 to be double tooled, that is, two dual pane IGUs are assembled at once. Although not presently implemented, two sets of the layers 382, 384 of a triple pane IGU could be moved onto the tables 404 and 406 and registered at the two sets of stops 402, 403 to assemble two triple pane IGUs at once with one rotation cycle of the table 404, 406. The distance between stops 402, 403 determines the maximum dimension that two IGUs at once can be processed. Any dimension larger than this will result in one IGU being processed per cycle.

Corner alignment is achieved between first and second layers 382, 384 once positioned by the stops 402 (also 403 if two IGUs are assembled per cycle) as the first and second tables, 404, 406, respectively are rotated about the x-axis toward each other as shown in FIG. 23. The rotation of the layers 382, 384 on the tables 404, 406 brings the layers into engagement with each other, and in particular, sealant on the second spacer frame 144 contacts the second lite 120 to configure a triple pane insulating glass unit or final layer 386. When the two tables 404, 406 are rotated about the x-axis, as shown in FIG. 23 by arrows R, the second layer 384 leaves table 404 upon reaching a substantially vertical position. At this point, the second layer moves to engage the first layer 382 through contact with the spacer frame 144 (or adhesive or sealant placed on the spacer) with the second lite 120 on the first layer.

Once the second layer 384 contacts the first layer 382, the two layers are pressed against the table 406, forming the fixedly secured final layer 386 by pusher arms 408 that move in the bi-rotational direction indicated by Arrows S in FIG. 23. The pusher arms 408 are actuated in their rotational direction by a clevis and yoke connection 411, which are coupled to one or more pneumatically actuated cylinders 423 shown in FIG. 23. The layers, 382, 384, and 386 when in the vertical position are supported by a plurality of lifting fingers 412 spaced between the driven urethane rollers extending between ends 414 of tables 404 and 406. These lifting fingers 412 are coupled to a lift cylinder 772 (FIGS. 23 and 24) coupled to a solenoid actuated valve 773 which operates under the control of the PLC 311. In the horizontal position of the tables these fingers are retraction out of the way.

The first table 406 is fixed in its lateral position along the y axis direction and supported by fixturing 416. Rotation of the table 406 about the x axis is achieved by hydraulic cylinders 418. The second table 404 is supported on a fixture 417 that translates laterally along the y axis (direction of arrow T) on slides 420. The fixture 417 is driven along the slides by a hydraulically actuated cylinder 766 shown in FIG. 24. Rotation of the table 404 about the x axis is achieved by hydraulic cylinders 422. The amount of lateral movement of table 404 and pressing with push arms 408 is a function that is controlled based on data programmed into the PLC or controller that accounts for the size (height and width) and/or weight of the various layers 382, 384, and 386 as well as their combined thickness.

Solenoid valves 762, 763 (FIG. 24) are coupled to the PLC 311 to selectively couple the hydraulic output from a pump 776 to the cylinders 418 and 422 to achieve proper speed and pressure based on the weight and/or size (thickness) of the layers. In the illustrated example embodiment, encoders 740, 742, 744 monitor pivoting of the tables 404, 406 and side to side movement of the movable table 404. These encodes allow the PLC 311 to monitor response to controlled outputs and provide closed-loop control over the position (lateral and rotation about the tables) relative to a position demand. The solenoid valves 762 and 763 are proportionally regulated by the PCL 311 to control the rotational speed, i.e. angular velocity of the tables 404 and 406 through cylinders 418 and 422. This allows for maximizing both speed (cycle time) and quality based on the type and/or glass size (height and width) of the IGU being processed by the butterfly table 380. For example, the valves 762 and 763 are provided a signal ranging 0-10 volts from the PLC 311, where 10 v provides for a fully open valve, while 0 v would be a completely closed valve. In one example embodiment, the valves 762 and 763 are manufactured by Eaton Vickers under part number KBHDG5V-7-33C130N65.

Figure 37A:
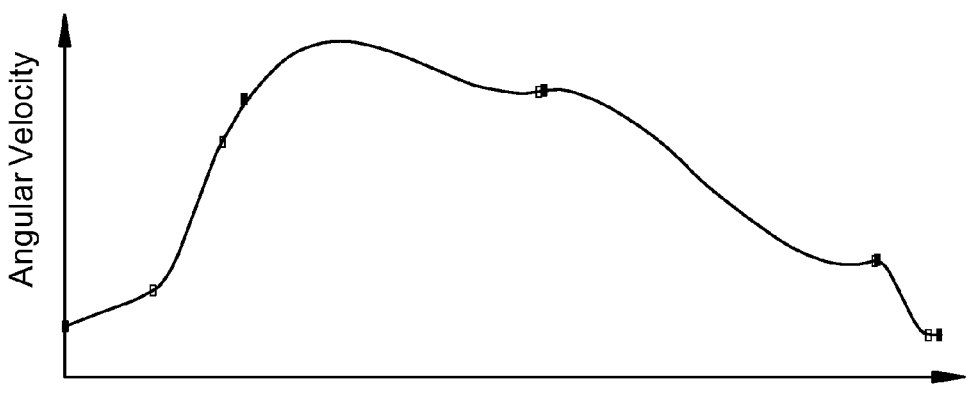
FIGS. 37A-37C are various angular velocity profiles for different IGU sizes shown over time for a single cycle of a butterfly table.
Figure 37B:
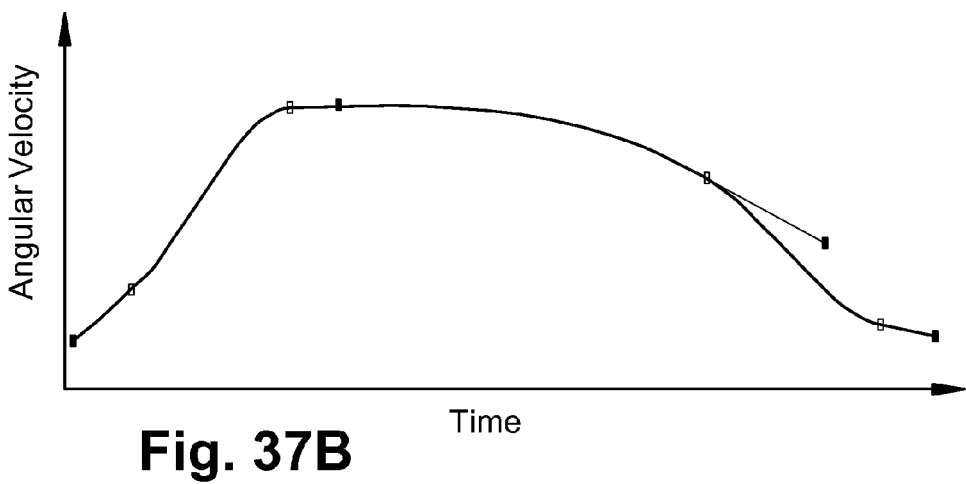
Figure 37C:
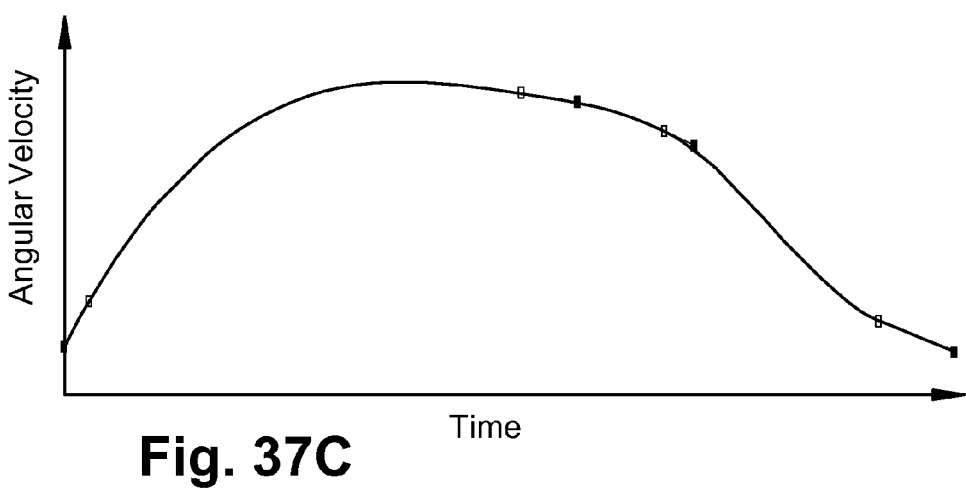

Illustrated in FIGS. 37A-37C are various angular velocity profiles for different IGU sizes shown over time for a single cycle of the butterfly table 380. The profiles in FIGS. 37A-37C illustrate the ability of the assembly line 300 to dynamically change angular velocity of the butterfly table 380 over time as desired for a particular IGU being cycled, increasing both quality and cycle time.

Once the rotation of the tables 404 and 406 is complete and the final layer 386 (FIG. 4) is formed, the tables return to the horizontal position, which is adjustable based on variable stops 424. The final layer 386 is advanced upon return of the tables 404, 406 to the horizontal position via conveyors C11 and C12 into a heating operation achieved by an oven 390, as illustrated in FIG. 14. That is, in an exemplary embodiment, after the triple pane IGU is configured, the IGU is routed by conveyors C11, C12 to the oven 390 where sealant that secures the panes or lites to the spacer frames of the triple pane insulating glass unit is cured. Although operation of the table 380 has been described with regard to a triple pane IGU, the control over speed of rotation of the tables and relative spacing between tables is also used with double pane IGUs that are being pressed together.

Registration Lift Station 350

Figure 18:
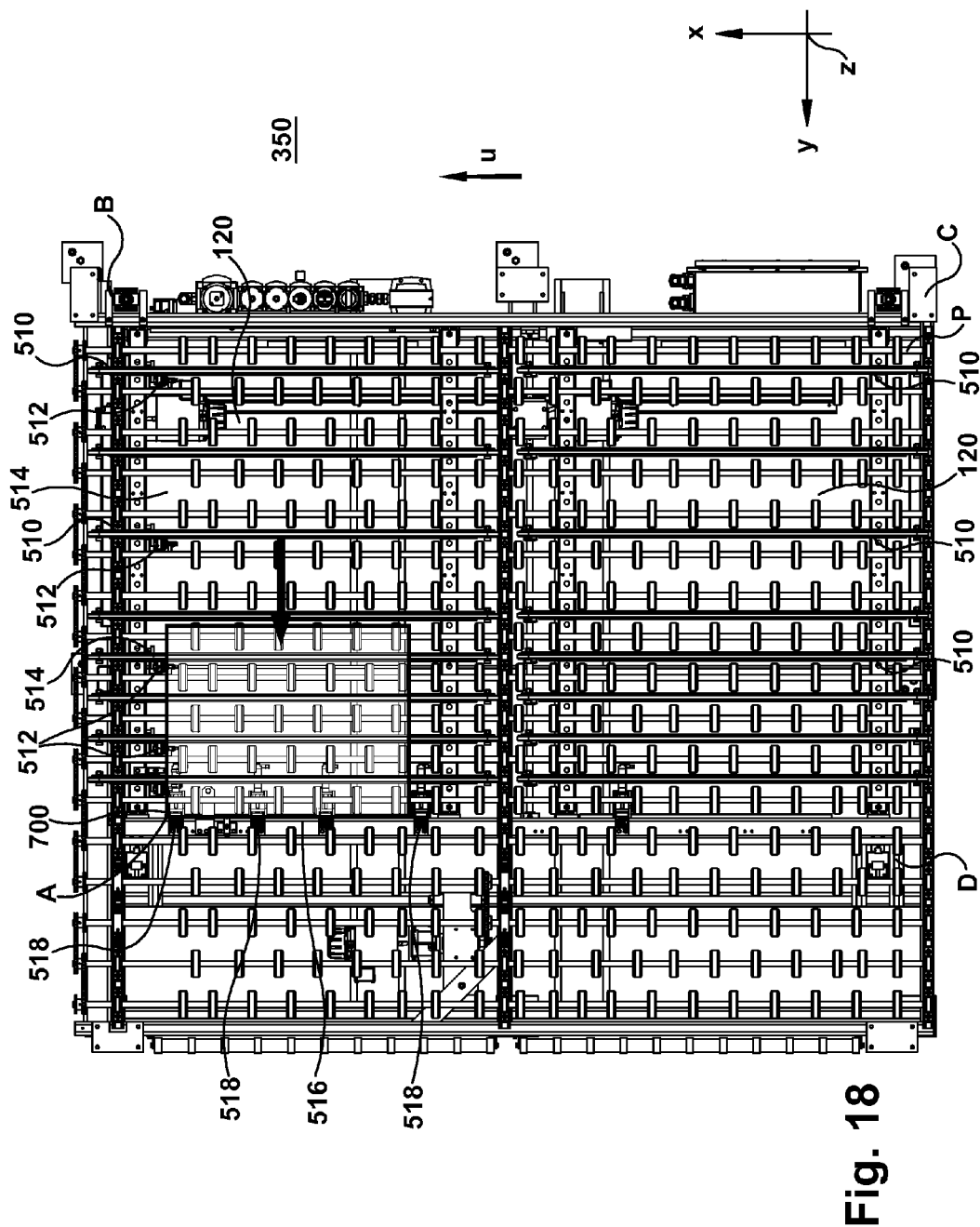
FIG. 18 is a top plan view of a registration station.
Figure 19:
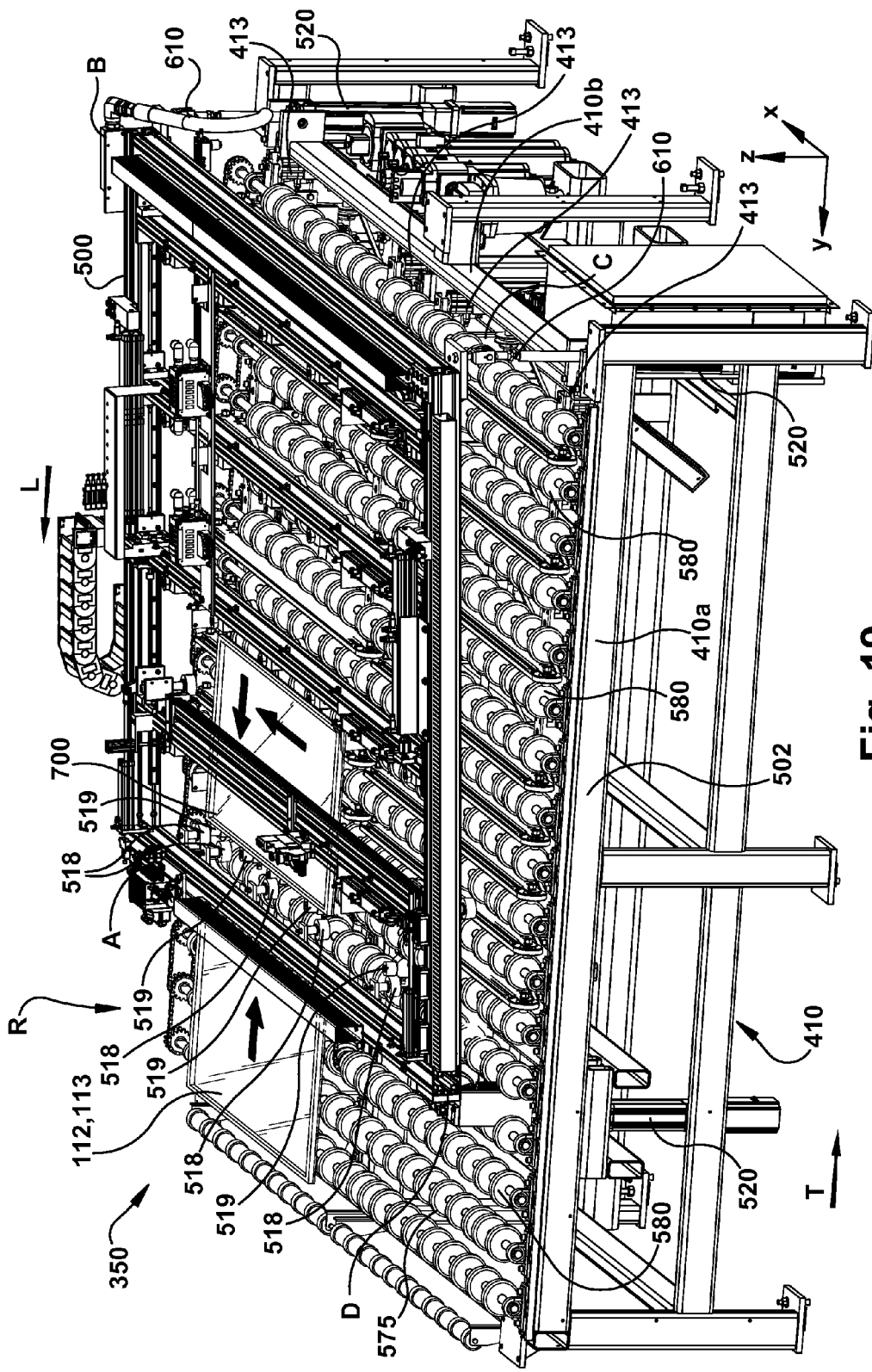
FIG. 19 is a perspective view of a registration lift table constructed in accordance with one example embodiment of the present disclosure.

Turning now to FIGS. 18 and 19, a registration lift station 350 constructed in accordance with one example embodiment of the present disclosure is depicted in greater detail. Registration of the glass lites means that for the IGU, edges of the three lites (for a triple pane IGU) align along all four sides within acceptable tolerances. The lift station 350 includes conveyors C3, C4, and utilize conveyors C5, and C6, as described above for movement of IGU components in the y direction. As described above with regard to FIGS. 15G-15L, the conveyors C3-C6 receive first and third lites 112, 150 and spacer frames 113 and 144 from the assembly station 332. The second or center lite 120 is received at the lift station 350 directly from the glass washer 320 after traversing a region between the washer and the station 350 on belt drives that make up the conveyors C1, C2.

It is important when making triple IGUs as illustrated in FIG. 4, that the center or second lite 120 is not contaminated as a result of contact between the planer surfaces of the glass forming the lite with other members (operator hands for example) which produce smudges, scrapes, smears, dirt, and the like. Advantageously, the second lite 120 is attached to the spacer frame 113 at the lift station 350 without either planer surface of the lite 120 being contacted after leaving the washer by anything other than the belts 990, 510. The belts 990, 510 most preferably move lites in the x direction through the conveyors C1, C2, C3, C4. The belts 510 that provide movement in the x direction are illustrated in FIG. 18 for the two conveyors at the registration lift station 350.

The lift station 350 in the illustrated example embodiment of FIG. 19 comprises a tilt frame 500 and a support base 502. The tilt frame 500 is further illustrated in the perspective view of FIG. 20, the plan view of FIG. 21, and the elevation view of FIG. 22. In one example embodiment, the tilt frame 500 is enclosed within a mezzanine on its upper surface (not shown) covered with Plexiglas access doors for maintenance and to operate as a clean room to the IGU assembly process that takes place below the mezzanine.

The tilt frame 500 is utilized when making triple pane windows as illustrated in FIG. 4. In particular, the tilt frame 500 raises the center lite 120 without contacting its planar surface during a first operation. Once the center lite 120 is raised, it is positioned on a first outer lite 112 and spacer frame 113 that are registered at a registration point 700 below the center lite during a second or subsequent operation. The registered center lite 120 is then lowered into contact with the registered spacer frame 113 (and/or adhesive or sealant located on the spacer frame). FIG. 19 illustrates the movement of the first outer lite 112 and spacer frame 113 assembly forming a triple IGU along the support base 502 for positioning at registration point 700 beneath a suspended center lite 120 held by the tilt frame 500. The suspension of the center lite 120 by the tilt frame 500 in FIG. 19 is not illustrated for purposes of clarity.

Referring again to FIG. 18, the second, center lite 120 is transported along conveyors C1 and C2 from the glass washer station 320 to two conveyors C3, C4 along the x axis in the direction of Arrow U (see also FIG. 14). For conveyors C3, C4, the belt assemblies 510 are raised and lowered by cylinders 413 as further illustrated in FIG. 38 through spaced apart conveyor rollers during advancement of the center lite 120. The second or center lite 120 continues longitudinally along the x axis in the direction of Arrow U until engaging edge stops 512 (FIG. 18) that are actuated by a cylinder above the belt assemblies 510 to approximately register the middle lite 120 along a first edge 514. The edge stops 512 are retracted below the first belt assemblies 510 when the assembly of the first layer 384 is complete.

Figure 38:
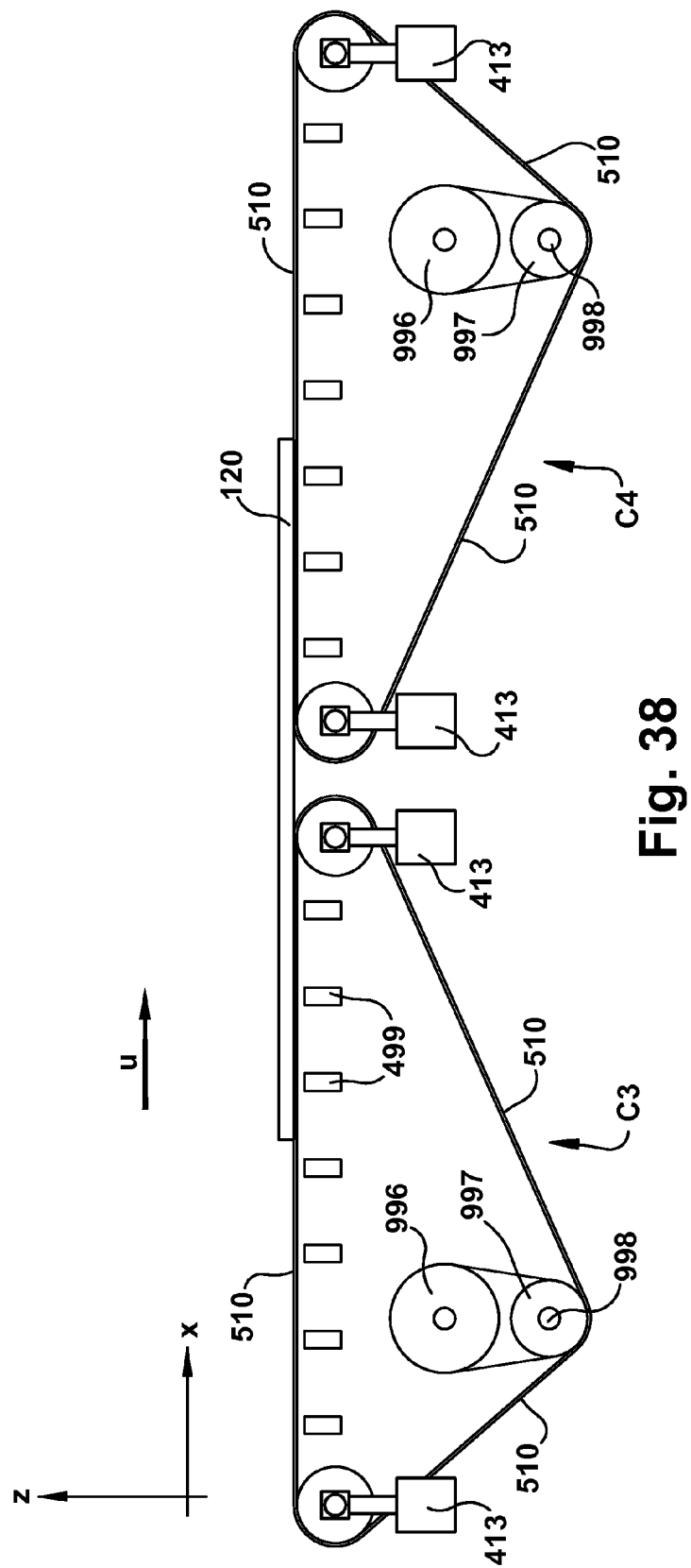
FIG. 38 illustrates belt assemblies raised by pneumatic cylinders above mechanically driven conveyor rollers.

FIG. 38 illustrates the belt assemblies 510 raised by pneumatic cylinders 413 above mechanically driven conveyor rollers 499 such that the center lite 120 is driven along the x axis. The belt assemblies 510 are coupled to one or more motors 996 through gear chain 997 and axle 998, turning the belt assemblies 510 in harmony with each other in direction of arrow U.

Once the second or center lite 120 reaches the first registration point of first edge 514, the tilt frame 500 lowers relative to the support base 502 in the direction of the z axis, that is, four corners A, B, C, and D of the tilt frame uniformly lower toward the second lite 120 at an equal rate such that the tilt frame remains parallel with the planer surfaces of the second lite and support frame 502. Upon reaching a prescribed distance confirmed by one of a plurality of lift assemblies 600 having an encoder 596 (see FIGS. 16, 20 and 27) further described below in detail, all four corners simultaneously raise, away from the support base 502, lifting the second lite 120 off the first belt assemblies 510 without contacting the planer surface of the lite.

The lift assemblies 600 use the Bernoulli principle to prevent contact of the planer surface on the second lite 120. That is, the lift assemblies 600 produce a high speed volumetric flow over the upper planer surface 550 of the second lite 120, which in turn, generates a lower pressure on the upper planer surface than the pressure on the lower planer surface 552, to lift the middle lite without making contact against the lift assemblies 600 (as better seen in FIG. 28) or any other devices associated with the lift table 500 once lifted from belts 510. In the illustrated example embodiment, clearance between the lift assembly 600 and lite 120 is shown by distance d, which is maintained to approximately 0.003" inches between each lift assembly and lite.

Figure 27:
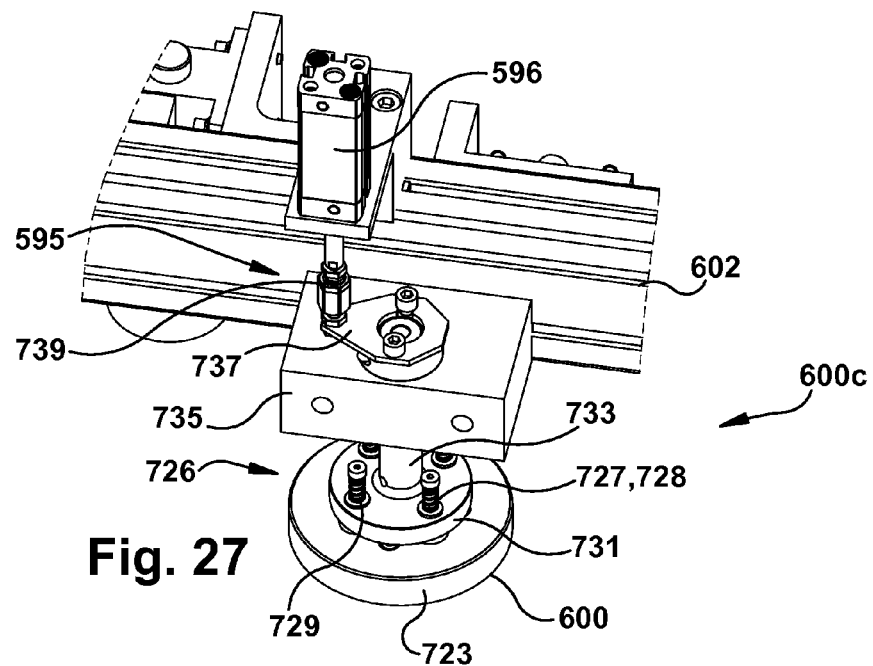
FIG. 27 is a perspective view of an air lift pad used at the registration station of FIGS. 18 and 19.

In one example embodiment, several lift assemblies 600 are used to lift the center lite 120. One lift assembly 600, as seen in FIG. 27 includes an encoder assembly 595 that includes an encoder 596 used during the lifting of the center lite 120, providing a closed-loop control with the computer or PLC 311 at the position of the lift assemblies 600 relative to the demand position and lite. Stated another way, the encoder 596 measures up and down (along the z axis) position of the center lite 120, relative to the support frame 502, as the tilt frame 500 is raised and lowered by mechanical actuators 520 to the desired location. Illustrated by way of the example embodiment of FIG. 33, the lift assembly 600 having the encoder 596 is represented by lift assembly 600c.

The encoder 596 provides a feedback signal, confirming the distances for raising, lowering, lifting, and releasing of the center lite 120. In one example embodiment, the lift assemblies 600 are commercially made by Bosch Rexroth under product number NCT 100-AL, the specification sheet being incorporated herein by reference.

Each of the lift assemblies 600 comprise a lift pad 723 having a lift face 725 that self align through leveling assemblies 726. The leveling assemblies 726 include a plurality of pins 727, each having a corresponding spring 728 retained by the head of the pin 727 and a corresponding washer 729. The pins 727 pass through oversized corresponding openings 743 in a guide plate 731 and fasten into an upper portion of the lift pad 723. The oversized corresponding openings 743 and leveling assemblies 726 allow the lift pad 723 tilt or self-level the lite 120, if the glass is not exactly parallel to the face 725 of the pad, as illustrated by arrows J. The leveling assemblies 726 also prevent resonance between the lite and pad 723, reducing noise associated with the operation of the lift table 500.

Figure 28:
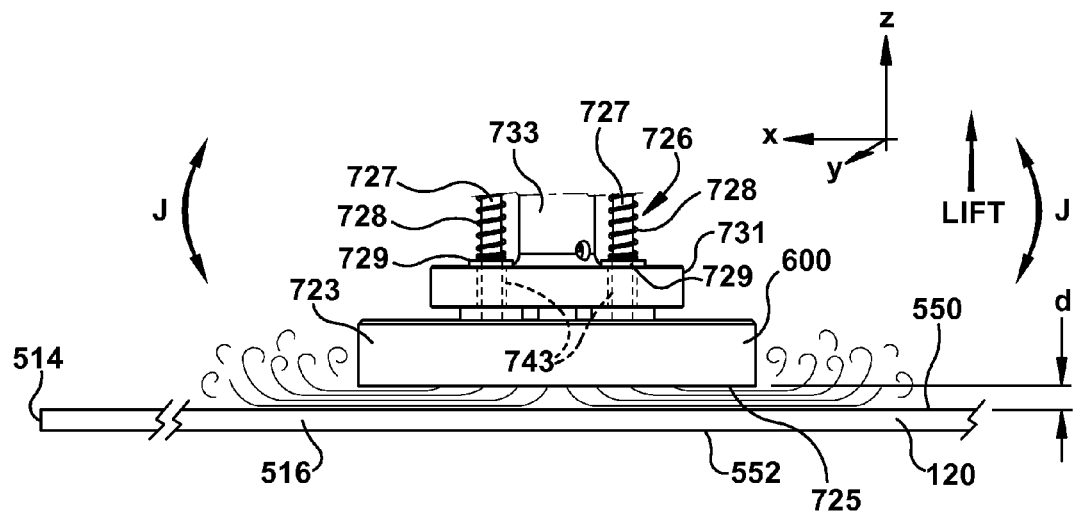
FIG. 28 is a schematic depiction of a air lift pad as it attracts a glass lite to allow controlled registration of the lite at the registration station of FIGS. 18 and 19.

The lift assemblies 600 further comprise a central post 733 that passes through and out the top of a bearing block 735. The bearing block 735 is slidably connected to rails 602 as illustrated in FIGS. 27, 28, and 33. The one lift assembly 600c that includes the encoder assembly 595 as shown in the example embodiment of FIG. 27, further comprises a lift tab 737 that is coupled to both the top of the central post 733 and an encoder rod 739 such that movement occurring in the lift assembly through the central post 733 is equally proportional and concomitant with movement experienced and read by the encoder 596 through the encoder rod. This movement experience and read by the encoder 596 provides a feedback signal, confirming the distances for raising, lowering, lifting, and releasing of the center lite 120 to the PLC 311 or central computer.

Once the tilt frame 500 substantially equally raises all four corners A, B, C, and D to a prescribed uniform height via mechanical actuators 520 (see FIG. 19), the tilt frame unequally raises one or more mechanical actuators 520 and corresponding corners to a desired location to facilitate the movement of the second lite 120 to corner A. In one example embodiment, the mechanical actuators 520 are ball screws coupled to a motor having a built-in gear reduction. In another example embodiment, the actuators 520 associated with corners B and C continue to raise.

Figure 20:
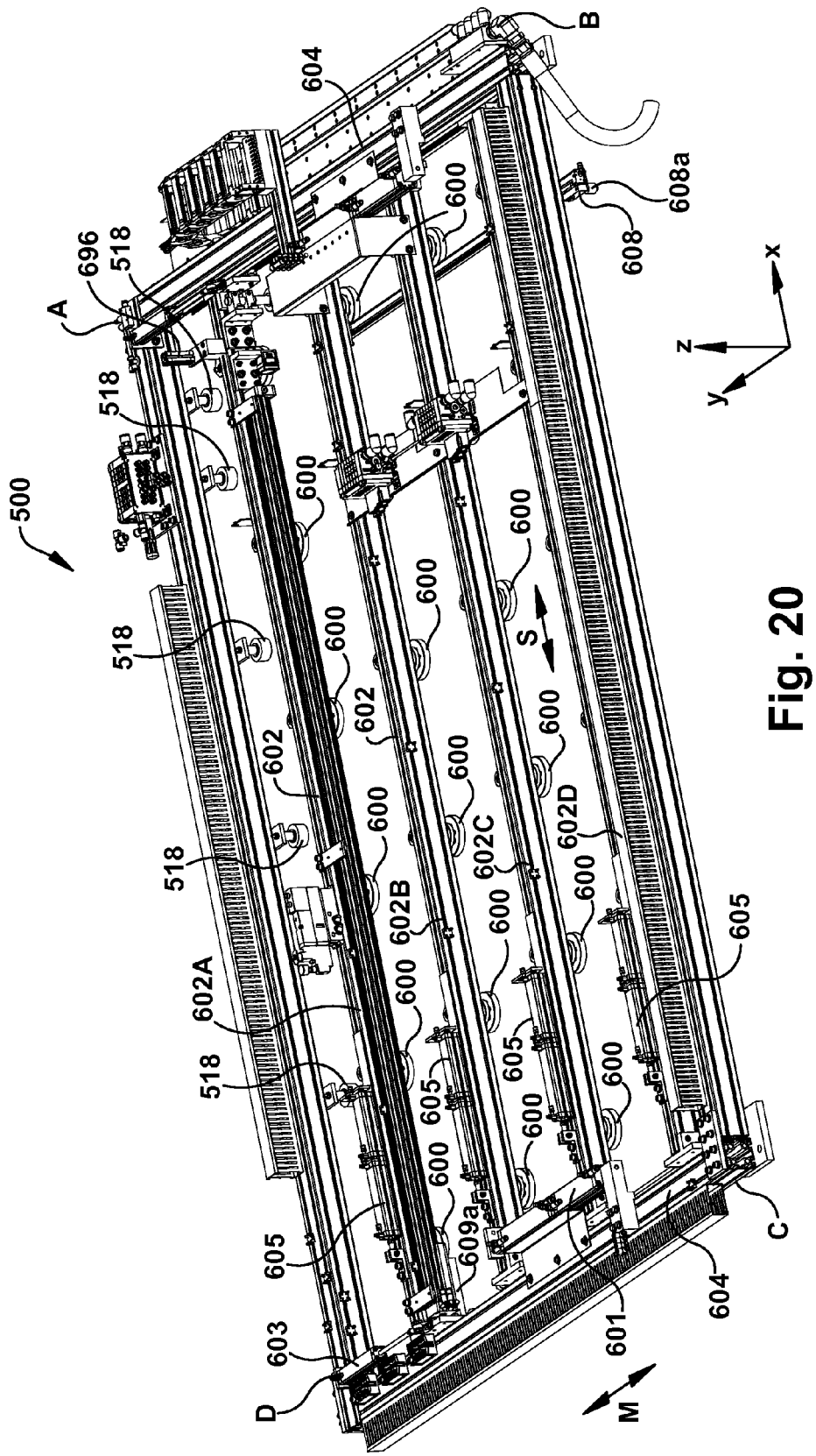
FIG. 20 is a perspective view of a tilt frame constructed in accordance with one example embodiment of the present disclosure.
Figure 21:
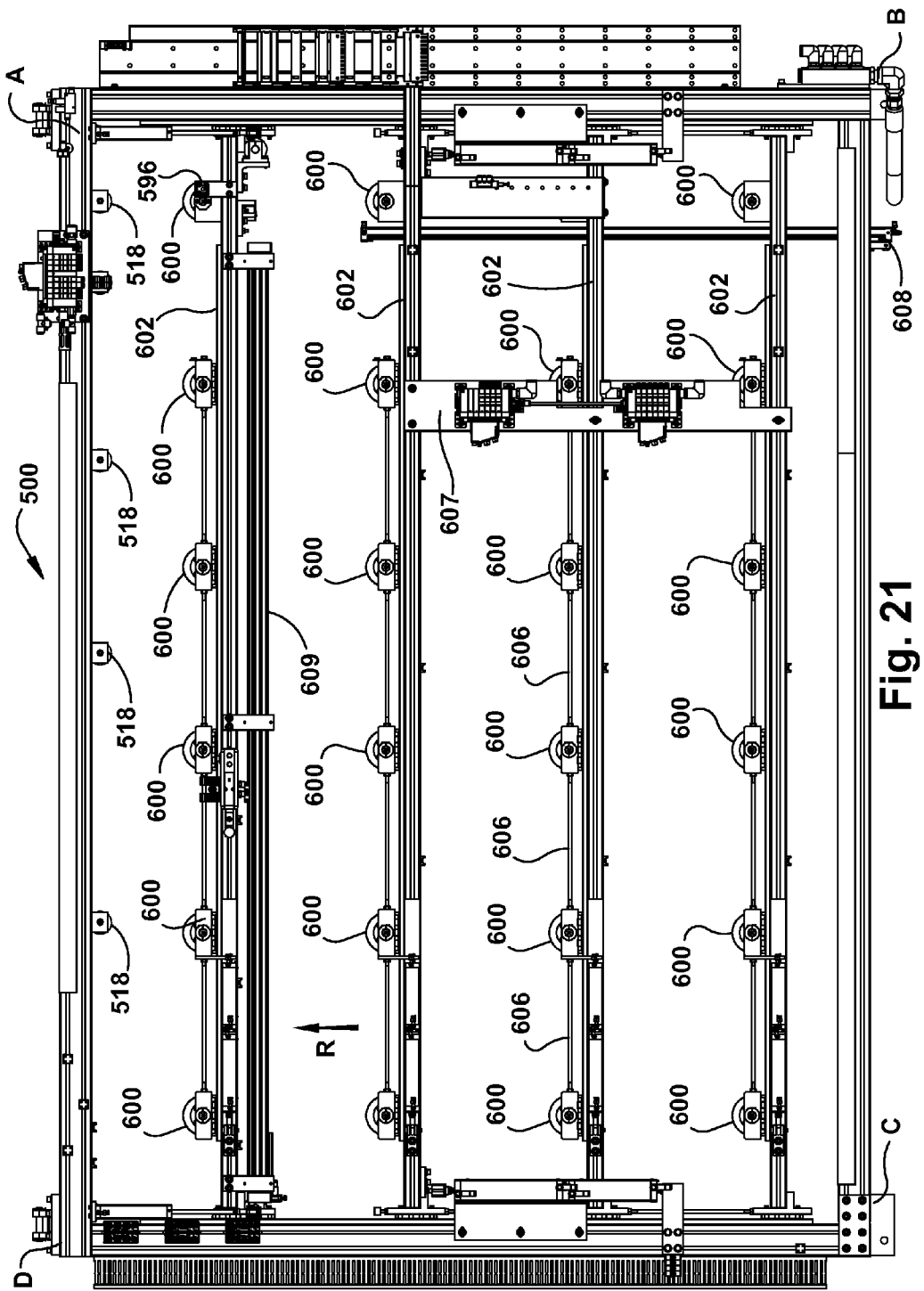
FIG. 21 is a plan view of FIG. 20.
Figure 22:
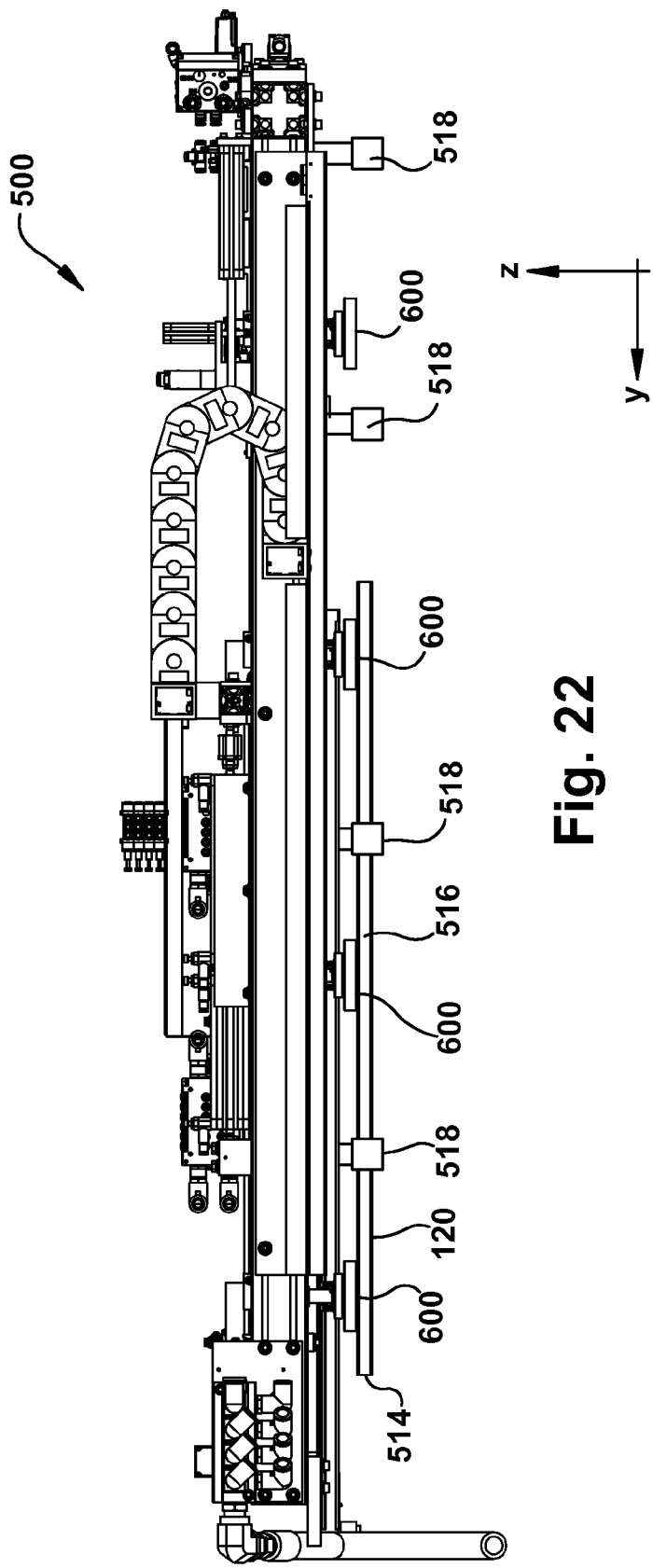
FIG. 22 is an elevation view of FIG. 20 from a longitudinal end.
Figure 32:
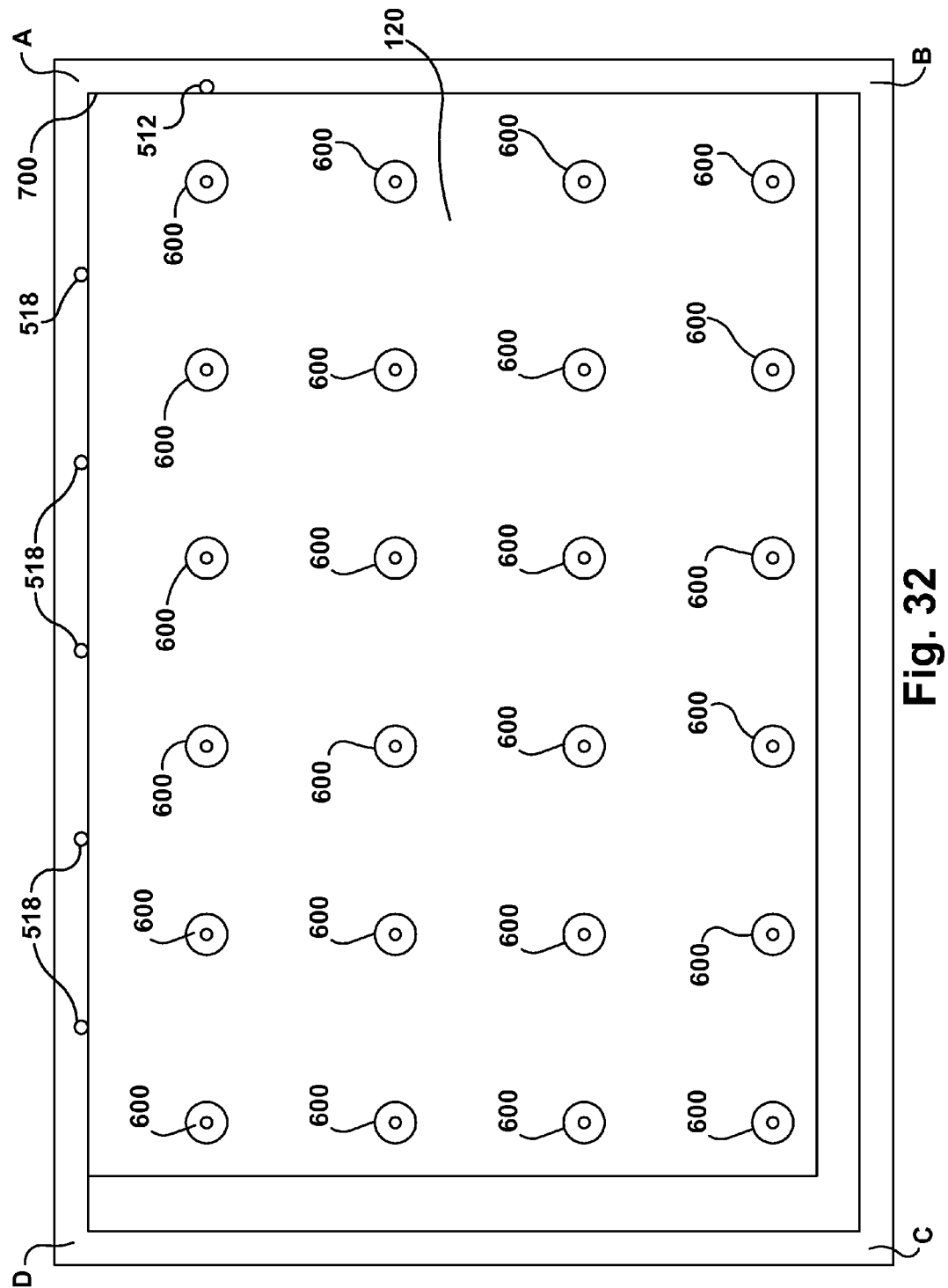
FIGS. 32 and 33 illustrate positioning orientations of the lift assemblies for different size center or middle lites.

As depicted in the perspective view of FIG. 20, four rails 602 support the lift assemblies 600 at spacings across the frame that are dictated by the size of the lite. This is further illustrated in FIGS. 32 and 33. In FIG. 32, a center lite 120 of maximum dimensions (length and width) is supported by all of the plurality of lift assemblies 600. While FIG. 32B illustrates a smaller lite 120 supported by a small number of lift assemblies 600 that are repositioned for supporting the lite.

The rails 602 and lift assemblies 600 are repositioned based on the size of the lite being processed by the PLC 311. In particular, the rails 602B, 602C, and 602D are linearly actuated back and forth along the y axis in the direction of arrows M by cylinder assembly 601 illustrated in FIG. 20. The cylinder assembly 601 is a double action cylinder that is mechanically connected to rails 602B, 602C, and 602D. Rail 602 and its associated lift assemblies are actuated back and forth along the y axis in the direction of arrows M by cylinder assembly 603.

The lift assemblies are organized as a six by four matrix. All six lift assemblies in a given row move back and forth with an associated rail and five of the lift assemblies of a row also move back and forth along the x axis in the direction of the arrows S in FIG. 20. Four cylinder assemblies 605, one per rail, linearly actuate and move all five lift assemblies back and forth along the x axis due to the presence of interconnecting linkages 606 coupled to the cylinder assemblies. Air under pressure is routed through tubing to each assembly from valves mounted to a cross piece 607. A factory air source provides air in the range of 80-100 psi.

Referring again to FIG. 33, lift assembly 600a-600d are fixed along the x axis and y axis as the maximum size lite 120 is positioned toward registration point 700 based on the size of this maximum sized lite. For the significantly smaller lite 120' shown in FIG. 33, readjustment of the lift assemblies 600a-600d (as shown in FIG. 33) is achieved by cylinder assemblies 601, 603, 605, based on instructions received from the PCL 311 that identifies the size and/or type of IGU being processed. Note, the two lift assemblies 600c, 600d remain fixed in the x direction but move by virtue of their associated rails in the y direction.

Tilting of two of the corners of the tilt frame 500, in the illustrated embodiment corners B and C by mechanical actuators 520 causes the rails 602 and their associated lift assemblies 600 to be spaced above the surface of the conveyors at different distances in a lateral direction indicated by Arrow M. In addition, the tilting of corners toward registration point 700, allows the center lite 120 to gravitationally skate or float in a biased-like fashion across the lift assemblies 600 without the lift assemblies ever contacting the planar surface of the center lite. This independent raising and lowering is achieved by universal joint assemblies 610, as illustrated in FIG. 19. In one example embodiment, the universal joint assemblies include a ball joint, yoke and clevis, or trunnion mount assembly.

Because of the tilting of the frame, the middle lite 120 slides on a cushion of air toward the side or edge of the frame defined or bounded by the two corners A, D. This movement brings an edge of the center lite 120 against a second set of registration stops 518 along peripheral edge 516 (see FIGS. 18 and 19). In addition to gravity and the PLC 311 controlled movement of the lift assemblies 600 (shown in FIG. 33) in assisting the second lite 120 toward corner A are downwardly extending fingers 608a, 609a which contact edges of the lite and are coupled to rodless pneumatic cylinders shown as first and second rakes, 608, 609, respectively (see FIGS. 20 and 21) that are mounted on the rails 602 602A, 602B, 602C of the tilt frame 500 and contact other peripheral edges of the second or center lite. In one example embodiment, the rakes 606, 608 are commercially made by Festo Corporation under product numbers DGC-25-2200-G-PPV-A and DGC-12-1200-G-P-A, the specification sheet being incorporated herein by reference. The rake 608 is positioned on the rails 602A, 602B, 602C to be able to contact edges of all size lites and moves the lites toward the stops 518. The rake 609 moves the finger 609a out of the way as the lite is acquired by the assemblies 600 and is then moved into contact with the edge of the lite for moving the suspended lite in the x direction.

The second lite 120 remains suspended once reaching registration point 700 over the corresponding registration point 700 located on the support frame 502 in a position for aligning corners of the middle lite with the first spacer frame 113 and first lite 112. While the second lite 120 is suspended, the tilt frame 500 corners return to a parallel state, that is, the corners A-D are all equally distanced in the z axis direction from the support base 502 and the conveyors C3, C4.

A configuration similar to the FIG. 15J depiction then occurs as also illustrated in the process flow in FIG. 19 of first outer lite 112 and spacer 113. That is, the first spacer frame 113 is positioned above first lite 112 on the conveyor C6. The conveyor C6 is a so called X-Y conveyor since it can move lites (and attached spacers) in both the X and Y direction. When moving lites in the X direction, belts similar to the belts 510 shown in FIG. 18 for the conveyors C3, C4 are in operative position to contact lites placed onto the conveyors C5, C6 by operators at the assembly or topping station. Upon reaching the position of FIG. 15J, however, drive rollers 575 located above the belts 510 (that provide motion along the x axis), contact the lite 112 and when the drive rollers 575 are energized under the control of the controller 311, collectively work to move the lite 112 (and associated frame 113) in the y axis direction. As the rollers 575 move the lite 112 in the y direction, the lite engages rollers 580 (as illustrated in FIG. 19) of the conveyor C4 not covered by the frame in a region R and controlled rotation of these rollers in this region provides further movement of the lite 112 (and its frame 113) in the direction of Arrow T.

Once the lite 112 reaches a position on the conveyor C4 beneath the tilt frame 500, belts 510 raise to move the spacer frame 113 and first lite 112 longitudinally in the x axis direction until engaging pop up stops 512 (see FIGS. 18 and 39-41). After reaching the stops 512, the belts 510 drop back down beneath the level of the rollers 580, as further described with respect to FIG. 38. The PLC 311 now reverse rotation of the rollers 580 to drive the lite 112 and spacer 113 longitudinally in the direction show by Arrow L in FIG. 19 until the first lite 112 and spacer frame 113 reach a second set of pop up stops 519 and the lower registration point 700.

In one example embodiment, the spacer frame 113 includes a prescribed amount of adhesive that will contact the second lite 120 as it is lowered by the tilt frame 500 at the matching upper (FIG. 18) and lower (FIG. 19) registrations point 700. Now that both first lite/spacer and second lite 120 are at equal registration points 700 and corners of the spacer frame 113 are in alignment with the corners of the second lite, the mechanical actuators 520 are lowered a prescribed amount (based on earlier sensed output from the linear transducer 596) and the second lite 120 is released by the elimination of air pressure to the lift assemblies 600 such that the first layer 384 is formed. The first layer 384 is then advanced from the lift station 350 to the butterfly table 380 for mating with a second layer 382 as described previously.

Control Circuit

Many control signals and monitored inputs are coupled to the PLC controller 311 by means of Ethernet communications. A representative controller 311 is commercially available from B&R Automation under the designation X20CP1485. As seen in FIG. 16, a safety PLC controller 720 is included and this controller 720 monitors signals from sensors primarily used to sense an unsafe conditions (such as inappropriate opening of a safety gate) detected along the assembly line 300.

Two voltage distribution boxes 722, 724 distribute high and low voltage power signals to other components depicted in FIG. 16. Control boxes 730, 732, 734, 736, 738 are connected to designated conveyors for controlled actuation of motors that drive IGU components through the assembly line. Additionally two encoders 740, 742 and a linear transducer 744 are coupled by Ethernet connections 746, 748, 750 to monitor positions and movement to confirm and control operation of the assembly line. Additionally, a set of valves 752 controllably deliver air to the Bernoulli lift pads 600.

Figure 24:
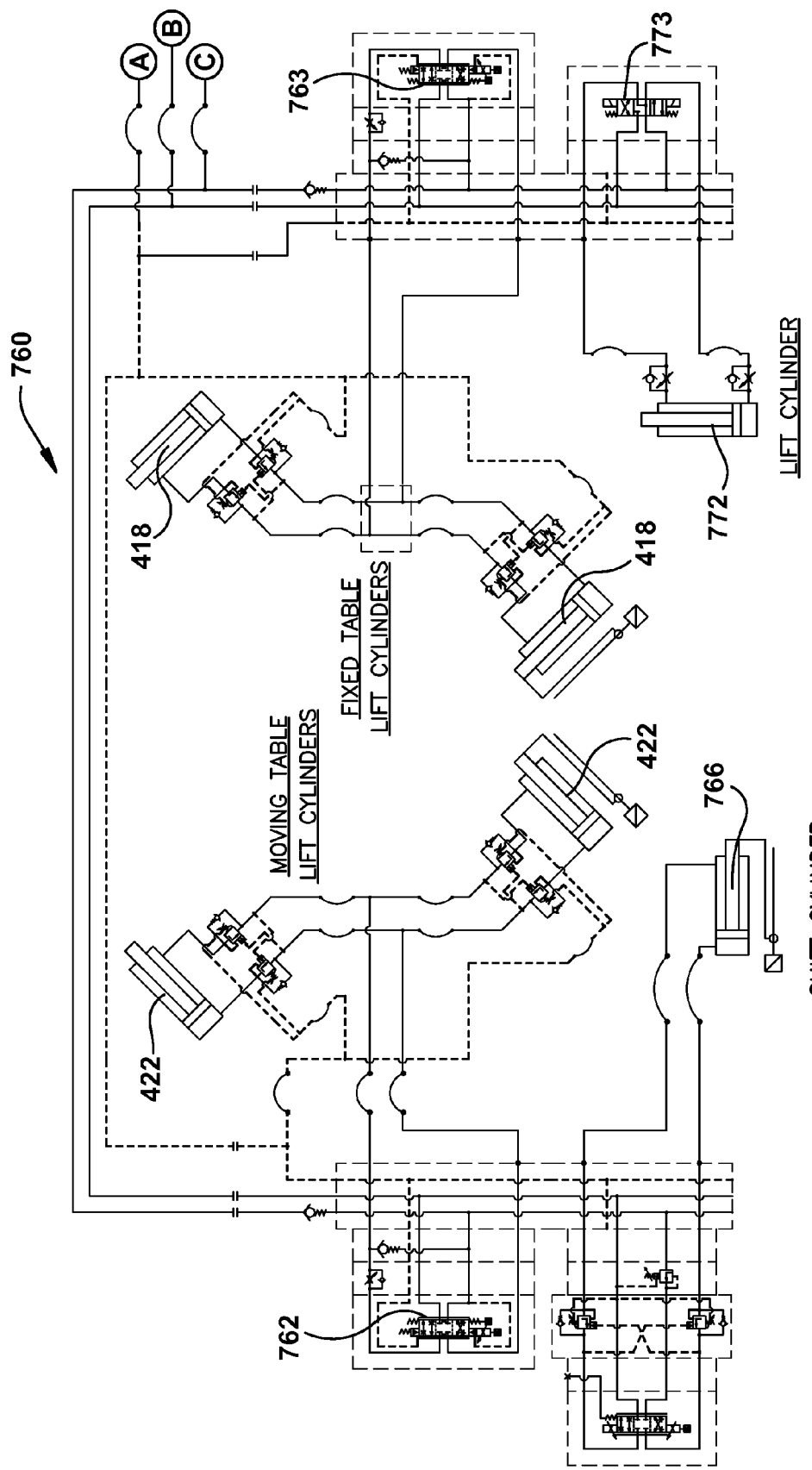
FIG. 24 is a hydraulic schematic having pneumatically actuated drive cylinders.
Figure 25:
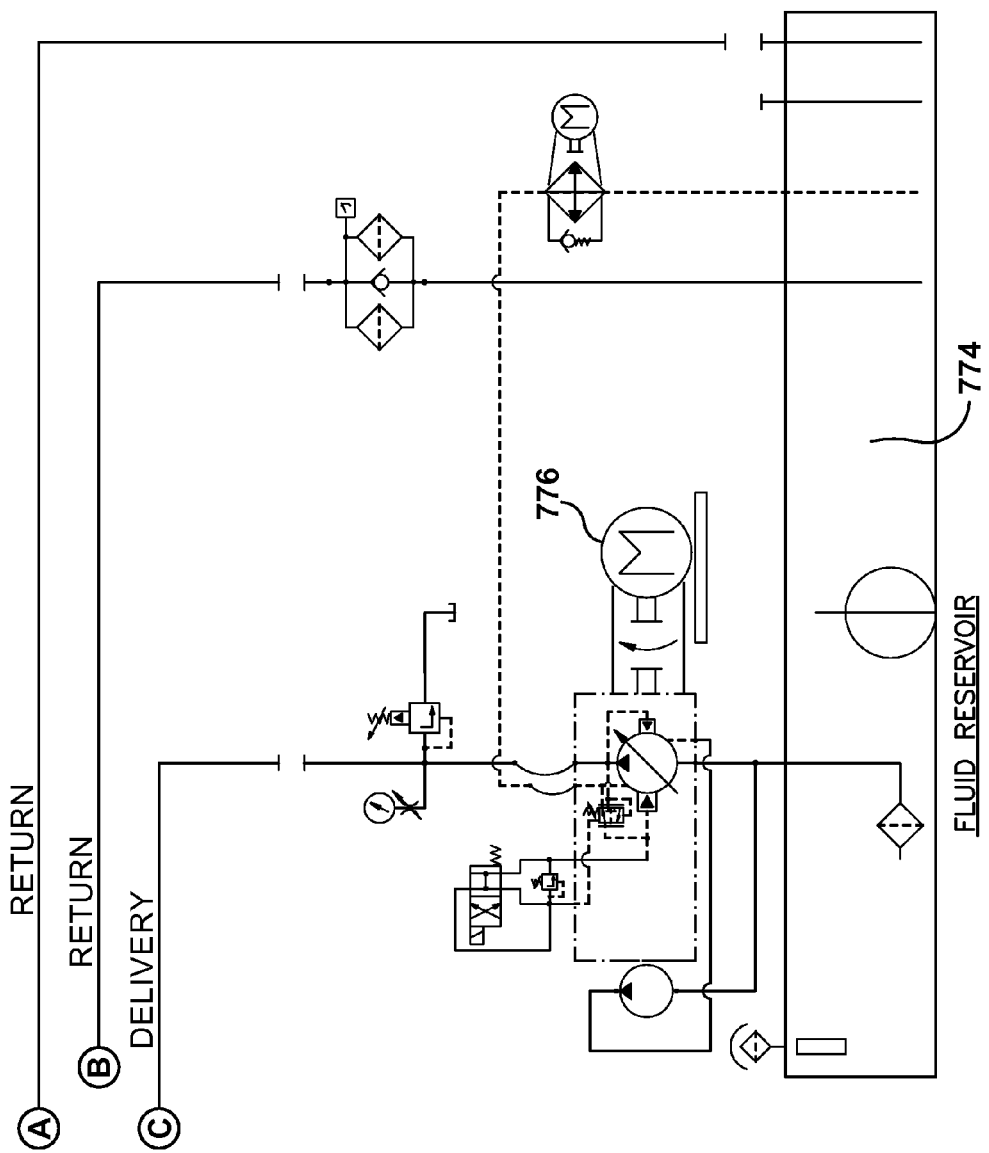
FIG. 25 is a hydraulic schematic showing a fluid reservoir that supplies drive fluid to the drive cylinders of FIG. 24.
Figure 26:
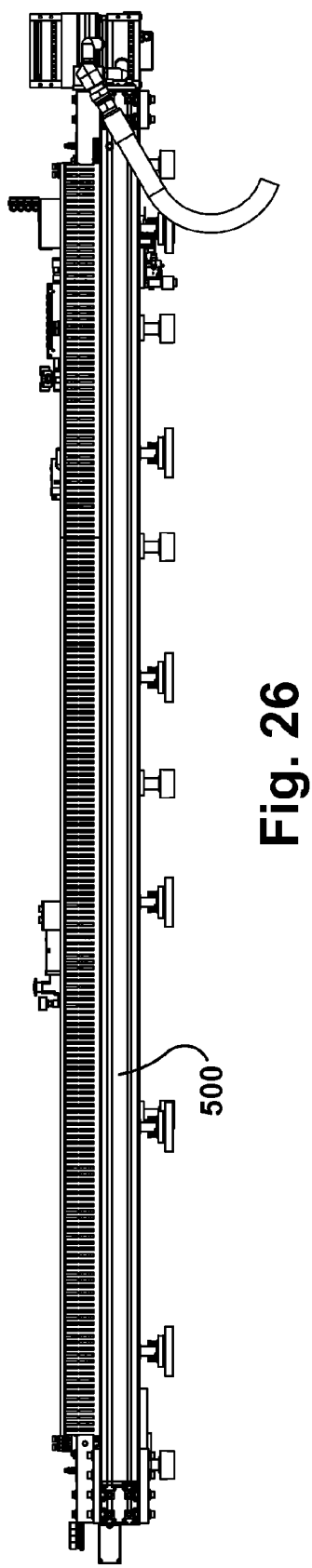
FIG. 26 is a side elevation view of the tilt table.

FIGS. 24 and 25 depict a hydraulic system 760 used in the exemplary system. Six pneumatically actuated, solenoid controlled drive cylinders 418, 422, 766, 772 are coupled to a source 774 of hydraulic fluid that is delivered to the cylinders by a motor driven pump 776. These drive cylinders are commercially available from Hydro-Line as part numbers N5CS2.50x18.50N1.752SHR11.

The invention has been described with a degree of particularity, but it is the intent that it includes all modifications and alterations from the disclosed design falling within the spirit or scope of the appended claims.

The invention claimed is:

1. A method of assembling multi-pane insulating glass units (IGUs) comprising:
  a) creating a manufacturing schedule for assembly of a plurality of insulating glass units from spacer frames and glass lites, said manufacturing schedule including both double pane insulating glass units and triple pane insulating glass units;
  b) providing conveyors for moving glass lites or panes along controlled travel paths to at least two different registration stations where lites are brought into registration with each other; and
  c) if the manufacturing schedule next designates assembly of a triple pane insulating glass unit, then:
    i) moving a first outer glass lite and a first spacer frame registered with the first outer glass lite on a conveyor to a first registration station as a unit and registering a middle lite with the first spacer frame and first outer glass lite to form an intermediate IGU layer;
    ii) moving the intermediate IGU layer to a different registration station other than the first registration station, and
    iii) at the different registration station moving a second, outer lite and second spacer frame into registration with the intermediate IGU layer to form the triple pane insulating glass unit; or
  d) if the manufacturing schedule next designates assembly of a double pane insulating glass unit, then moving a first outer glass lite and a first spacer frame registered with the first outer glass lite to a selected one of the two registration stations where a second outer lite is brought into registration with the first spacer frame to form a double pane insulating glass unit.

2. The method of claim 1 wherein additionally comprising, prior to assembling the lites and spacer frames, washing the lites in a washer and wherein first and second conveyors extend into and through the washer for delivering lites to the registration stations.

3. The method of claim 2 additionally comprising staging a plurality of lites are staged at an entry position to the washer and further prompting a user in accordance with the schedule by a visual indicator as to the order to place a given lite from the plurality of lites on the first and second conveyors that extend into and through the washer.

4. The method of claim 1 wherein one conveyor moves lites to a first position where the first outer lite is attached to the first spacer frame by an adhesive or sealant.

5. The method of claim 4 wherein the said one conveyor diverges downstream from the first position into first and second portions and wherein one portion of said one conveyor leads to one registration station and a second portion of said one conveyor leads to a second registration station.

6. The method of claim 1 wherein a position where the first lite is attached to the first spacer frame includes a visual monitor and wherein a user is prompted by said visual monitor regarding how to orient the first lite and the first spacer frame as they are brought into contact with each other.

7. The method of claim 1 wherein the first registration station of the two registration stations includes a lift assembly that moves an initial lite designated for use as the middle lite of a triple pane IGU to a known position and then wherein a first infeed conveyor to the first registration station moves the first outer glass lite and first spacer frame together into an overlapping position with the initial lite prior to form the intermediate IGU layer by bringing the initial lite into engagement with the first spacer frame.

8. The method of claim 7 wherein a second infeed conveyor to the first registration stations moves the initial lite into the region of the lift assembly in a generally horizontal plane and wherein the lift assembly lifts the entering lite away from the horizontal plane it occupies when entering the region of the lift assembly.

9. The method of claim 8 wherein the second infeed conveyor to the first registration station comprises one or more belt drives and additionally moving the one or more belt drives are moved to an out of the way position prior to moving the first lite and first spacer frame into the region of the lift assembly.

10. The method of claim 9 wherein the lift assembly includes an array of non-contact lift pads supported to a frame and further comprising adjusting a spacing between lift pads based on a size of the initial lite entering the region of the lift assembly.

11. The method of claim 1 wherein one of the two registration stations includes pivoting conveyors and a drive for pivoting each of the conveyors from a generally horizontal orientation to a generally vertical orientation so that IGU components on the two conveyors come into contact with each other in a generally aligned configuration, and additionally adjusting a spacing between the two conveyors based on a thickness of a IGU, wherein the adjusting includes controllably actuating a drive, monitoring changes in spacing between the conveyors in response to the actuating, and adjusting the actuating of the drive to accurately position the conveyors with respect to each other.

12. The method of claim 1 wherein one of the two registration stations includes pivoting conveyors and a drive for pivoting each of the conveyors from a generally horizontal orientation to a generally vertical orientation so that IGU components on the two conveyors come into contact with each other in a generally aligned configuration, and adjusting a pivoting speed based on a physical parameter of the IGU.

13. A method of assembling multi-pane insulating glass units (IGUs) comprising:
creating a manufacturing schedule for assembly of a plurality of insulating glass units from spacer frames and glass lites, said manufacturing schedule including both double pane insulating glass units and triple pane insulating glass units;
providing conveyors for moving glass lites or panes along controlled travel paths to at least two different registration stations where lites are brought into registration with each other; and
if the manufacturing schedule next designates assembly of a triple pane insulating glass unit, then:
moving a first outer glass lite and a first spacer frame registered with the first outer glass lite on a conveyor to a first registration station as a unit and registering a middle lite with the first spacer frame and first outer glass lite to form an intermediate IGU layer;
moving the intermediate IGU layer to a different registration station other than the first registration station, and
at the different registration station moving a second, outer lite and second spacer frame into registration with the intermediate IGU layer to form the triple pane insulating glass unit; or
if the manufacturing schedule next designates assembly of a double pane insulating glass unit, then moving a first outer glass lite and a first spacer frame registered with the first outer glass lite to a selected one of the two registration stations where a second outer lite is brought into registration with the first spacer frame to form a double pane insulating glass unit; and
moving an initial lite that is designated for use as the middle lite of a triple pane IGU to a known position comprising lifting said initial lite with a lift assembly and then moving the first lite and first spacer together into an overlapping position with the initial lite prior to form the intermediate IGU layer by bringing the initial lite into engagement with the first spacer frame.

14. The method of claim 13 wherein the initial lite enters the region of the lift assembly in a generally horizontal plane and wherein the lift assembly lifts the entering lite away from the horizontal plane it occupies when entering the region of the lift assembly.

15. The method of claim 14 wherein the initial lite is moved into the region of the lift assembly by one or more belt drives and wherein the belt drive are moved to an out of the way position prior to movement of the first lite and first spacer frame into the region of the lift assembly.

16. The method of claim 15 wherein the lift assembly includes an array of non-contact lift pads supported to a frame and wherein a spacing between lift pads is adjusted based on a size of the initial lite entering the region of the lift assembly.

17. A method of assembling multi-pane insulating glass units (IGUs) comprising:
creating a manufacturing schedule for assembly of a plurality of insulating glass units from spacer frames and glass lites, said manufacturing schedule including both double pane insulating glass units and triple pane insulating glass units;
providing conveyors for moving glass lites or panes along controlled travel paths to at least two different registration stations where lites are brought into registration with each other; and
if the manufacturing schedule next designates assembly of a triple pane insulating glass unit, then:
moving a first outer glass lite and a first spacer frame registered with the first outer glass lite on a conveyor to a first registration station as a unit and registering a middle lite with the first spacer frame and first outer glass lite to form an intermediate IGU layer;
moving the intermediate IGU layer to a different registration station other than the first registration station, and at the different registration station moving a second, outer lite and second spacer frame into registration with the intermediate IGU layer to form the triple pane insulating glass unit; or if the manufacturing schedule next designates assembly of a double pane insulating glass unit, then moving a first outer glass lite and a first spacer frame registered with the first outer glass lite to a selected one of the two registration stations where a second outer lite is brought into registration with the first spacer frame to form a double pane insulating glass unit; and providing one of the two registration stations with pivoting conveyors and a drive for pivoting each of the conveyors from a generally horizontal orientation to a generally vertical orientation so that IGU components on the two conveyors come into contact with each other in a generally aligned configuration, and wherein a pivoting speed is adjusted based on a physical parameter of the IGU.

* * * * *